US010937018B2

(12) United States Patent
Ballout

(10) Patent No.: US 10,937,018 B2
(45) Date of Patent: *Mar. 2, 2021

(54) KIT, SYSTEM AND ASSOCIATED METHOD AND SERVICE FOR PROVIDING A PLATFORM TO PREVENT FRAUDULENT FINANCIAL TRANSACTIONS

(71) Applicant: Rabih S. Ballout, Burlingame, CA (US)

(72) Inventor: Rabih S. Ballout, Burlingame, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/009,551

(22) Filed: Sep. 1, 2020

(65) Prior Publication Data

US 2021/0004783 A1    Jan. 7, 2021

Related U.S. Application Data

(63) Continuation of application No. 16/882,006, filed on May 22, 2020, now Pat. No. 10,796,296, which is a
(Continued)

(51) Int. Cl.
*G06Q 40/00* (2012.01)
*G06Q 20/32* (2012.01)
(Continued)

(52) U.S. Cl.
CPC ......... *G06Q 20/3223* (2013.01); *G06Q 20/04* (2013.01); *G06Q 20/08* (2013.01);
(Continued)

(58) Field of Classification Search
USPC .......... 705/26, 45, 39, 38, 44; 719/328, 315; 717/108; 709/226, 227, 218, 217, 246;
(Continued)

(56) References Cited

U.S. PATENT DOCUMENTS 5,671,364 A    9/1997 Turk
5,841,118 A    11/1998 East et al.
(Continued)

OTHER PUBLICATIONS

Wallet Based E-Cash System for Secured Multi-hop Cash Exchange; 2008 3rd International Conference on Information and Communication Technologies: From Theory to Applications (pp. 1-5); H. Kreft, W. Adi; Jul. 4, 2008 . . . (Year: 2008).*
(Continued)

*Primary Examiner* — Tien C Nguyen
(74) *Attorney, Agent, or Firm* — Sheppard, Mullin, Richter & Hampton LLP

(57) ABSTRACT

A system and associated method and service for providing a platform that enables members to transfer, receive, or otherwise exchange cash in various international denominations and commodities, such as precious metals (e.g., gold, silver, etc.), in a mobile highly secured telecommunications environment. The system is capable of delivering cash instantly between two or more users by allowing the exchange of secure transactions between system and cash dispensing machines (ATMs). Users may pay, receive, exchange, deposit, transfer, pay bills, exchange currency, retrieve cash, deposit cash and create accounts based on the mobile phone number or a system generated code.

14 Claims, 45 Drawing Sheets

Related U.S. Application Data continuation of application No. 15/786,470, filed on Oct. 17, 2017, now Pat. No. 10,733,593, which is a continuation-in-part of application No. 14/691,499, filed on Apr. 20, 2015, now abandoned, which is a continuation of application No. 13/974,837, filed on Aug. 23, 2013, now abandoned, which is a continuation-in-part of application No. 13/185,432, filed on Jul. 18, 2011, now Pat. No. 8,554,671.

(51) Int. Cl.

| | |
|---|---|
| G06Q 30/02 | (2012.01) |
| G06Q 20/38 | (2012.01) |
| G06Q 20/10 | (2012.01) |
| G07F 19/00 | (2006.01) |
| G06Q 20/40 | (2012.01) |
| G06Q 20/08 | (2012.01) |
| G06Q 20/04 | (2012.01) |
| G06Q 20/22 | (2012.01) |
| G06Q 40/02 | (2012.01) |

(52) U.S. Cl.
CPC .......... *G06Q 20/10* (2013.01); *G06Q 20/108* (2013.01); *G06Q 20/1085* (2013.01); *G06Q 20/22* (2013.01); *G06Q 20/3221* (2013.01); *G06Q 20/3224* (2013.01); *G06Q 20/381* (2013.01); *G06Q 20/40* (2013.01); *G06Q 20/405* (2013.01); *G06Q 20/4016* (2013.01); *G06Q 30/02* (2013.01); *G06Q 30/0241* (2013.01); *G06Q 40/02* (2013.01); *G07F 19/211* (2013.01)

(58) Field of Classification Search
USPC .............. 715/704, 753, 700; 726/9, 1, 2, 25; 703/22; 706/46, 45, 25; 358/1.14; 235/375, 880, 379, 380; 700/245, 236; 606/130; 318/611; 446/268, 431; 463/25, 20; 707/793
See application file for complete search history.

(56) References Cited

U.S. PATENT DOCUMENTS

| | | | | |
|---|---|---|---|---|
| 6,149,055 | A * | 11/2000 | Gatto | G06Q 20/10 235/379 |
| 6,612,488 | B2 * | 9/2003 | Suzuki | G06Q 20/02 235/380 |
| 7,013,286 | B1 * | 3/2006 | Aggarwal | G06Q 20/045 705/14.26 |
| 7,344,066 | B1 | 3/2008 | Ramachandran | |
| 7,447,656 | B2 | 11/2008 | Parthasarathy | |
| 7,544,545 | B2 * | 6/2009 | Chen | H01L 27/0629 438/141 |
| 7,577,614 | B1 | 8/2009 | Warren | |
| 7,637,420 | B2 * | 12/2009 | Haley | G06Q 20/1085 235/379 |
| 7,844,545 | B2 * | 11/2010 | Michelsen | G06Q 30/06 705/39 |
| 8,321,346 | B2 | 11/2012 | Celi, Jr. et al. | |
| 2002/0062285 | A1 * | 5/2002 | Amann | G06Q 20/102 705/43 |
| 2002/0119752 | A1 | 8/2002 | Bates et al. | |
| 2002/0123359 | A1 | 9/2002 | Wei | |
| 2002/0152163 | A1 * | 10/2002 | Bezos | G06Q 20/12 705/40 |
| 2003/0056113 | A1 * | 3/2003 | Korosec | G06Q 30/018 726/28 |
| 2003/0139994 | A1 * | 7/2003 | Jones | G06Q 40/06 705/36 R |
| 2004/0030601 | A1 | 2/2004 | Pond | |
| 2004/0122771 | A1 * | 6/2004 | Celi, Jr. | G06Q 20/1085 705/43 |
| 2005/0097046 | A1 * | 5/2005 | Singfield | G07F 19/202 705/42 |
| 2006/0206709 | A1 * | 9/2006 | Labrou | H04L 63/083 713/167 |
| 2007/0175978 | A1 | 8/2007 | Stambaugh | |
| 2008/0010117 | A1 | 1/2008 | Oliveira et al. | |
| 2008/0010191 | A1 | 1/2008 | Rackley, III et al. | |
| 2008/0167017 | A1 | 7/2008 | Wentker et al. | |
| 2008/0313079 | A1 | 12/2008 | Van Bosch | |
| 2009/0063312 | A1 | 3/2009 | Hurst | |
| 2009/0068982 | A1 | 3/2009 | Chen et al. | |
| 2009/0090783 | A1 | 4/2009 | Killian | |
| 2011/0031310 | A1 | 2/2011 | Wilson | |
| 2011/0060684 | A1 * | 3/2011 | Jucht | G06Q 20/108 705/42 |
| 2013/0240622 | A1 * | 9/2013 | Zhou | G06Q 20/105 235/379 |
| 2016/0371659 | A1 * | 12/2016 | Berry | G06Q 20/202 |

OTHER PUBLICATIONS

A Secure Operational Model for Mobile Payments; The Scientific World Journal, 2014, 626243; Chang, Tao-Ku; Oct. 20, 2014 . . . (Year: 2014).*

Combating Double-Spending Using Cooperative P2P Systems; I. Osipkov, E.Y. Vasserman, N. Hopper, Yongdae Kim; 27th International Conference on Distributed Computing Systems (ICDCS '07) (p. 41); Dec. 1, 2008 . . . (Year: 2008).*

International Application No. PCT/US2012/046952, International Search Report and Written Opinion dated Sep. 28, 2012.

Chang, Tao-Ku, "A Secure Operational Model for Mobile Payments", The Scientific World Journal, 2014, 626243; Oct. 20, 2014 (Year : 2014), 10 pages.

Guynn, Jessica, "Square's Keith Rabois talks about the mobile payments start-up's new funding," Los Angeles Times, Technology: The business and culture of our digital lives, published at: http://latimesblogs.latimes.com/technology/2011/01/square-keith-rabois-mobile-payments.html, Jan. 10, 2011.

"Isis to launch pilot program in Salt Lake City," MM&T Mobile Marketing and Technology, published online at: http://www.mobilemarketingandtechnology.com/2011/toppost/isis-to-launch-pilot-program-in-salt-lake-city/, Jul. 18, 2011.

Kreft, H., et al., "Wallet Based E-Cash System for Secured Multi-hop Cash Exchange", 2008 3rd International Conference on Information and Communication Technologies: From Theory to Applications, Jul. 4, 2008 (Year: 2008), pp. 1-5.

"MobilePayUSA announces private beta for its mobile wallet," Mobile Payments Today: Technology, Trends & Insights, published online at: https://www.mobilepaymentstoday.com/news/mobilepayusa-announces-private-beta-for-its-mobile-wallet/, Jun. 29, 2011.

"Pizza Pizza launches new mobile app," Pizza Marketplace.com, published online at: https://www.mobilepaymentstoday.com/news/pizza-pizza-launches-new-mobile-app/, Apr. 3, 2011.

"Sprint and Amex to offer Serve mobile wallet," Mobile Payments Today: Technology, Trends & Insights, published online at: http://www.mobilepaymentstoday.com/research/600/Carriers-Card-Schemes, Jul. 18, 2011.

"Square—Start accepting credit cards today," published online at: https://squareup.com/, Jul. 18, 2011.

"Webinar will discuss mobile's impact on retail, dining," Mobile Payments Today: Technology, Trends & Insights, published online at: http://www.mobilepaymentstoday.com/research/597/Mobile-Apps, Jul. 17, 2011.

Osipkov, I., et al., "Combating Double-Spending Using Cooperative P2P Systems", 27th International Conference on Distributed Computing Systems (ICDCS '07) (p. 41), Dec. 1, 2008. (Year: 2008), 11 pages.

* cited by examiner

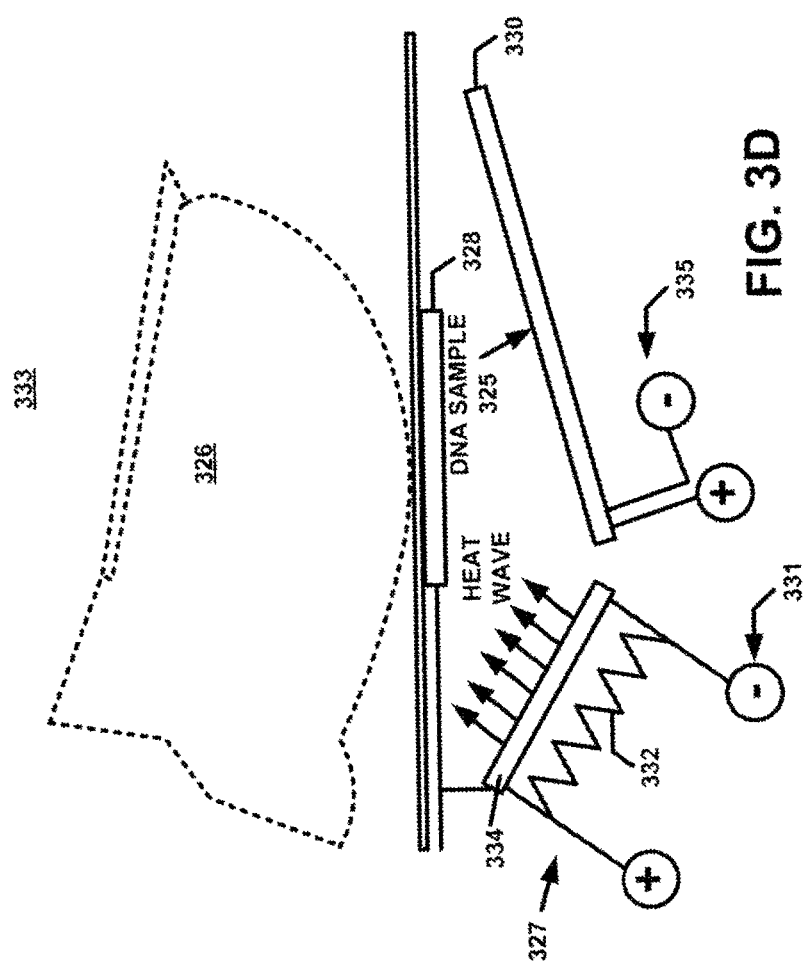

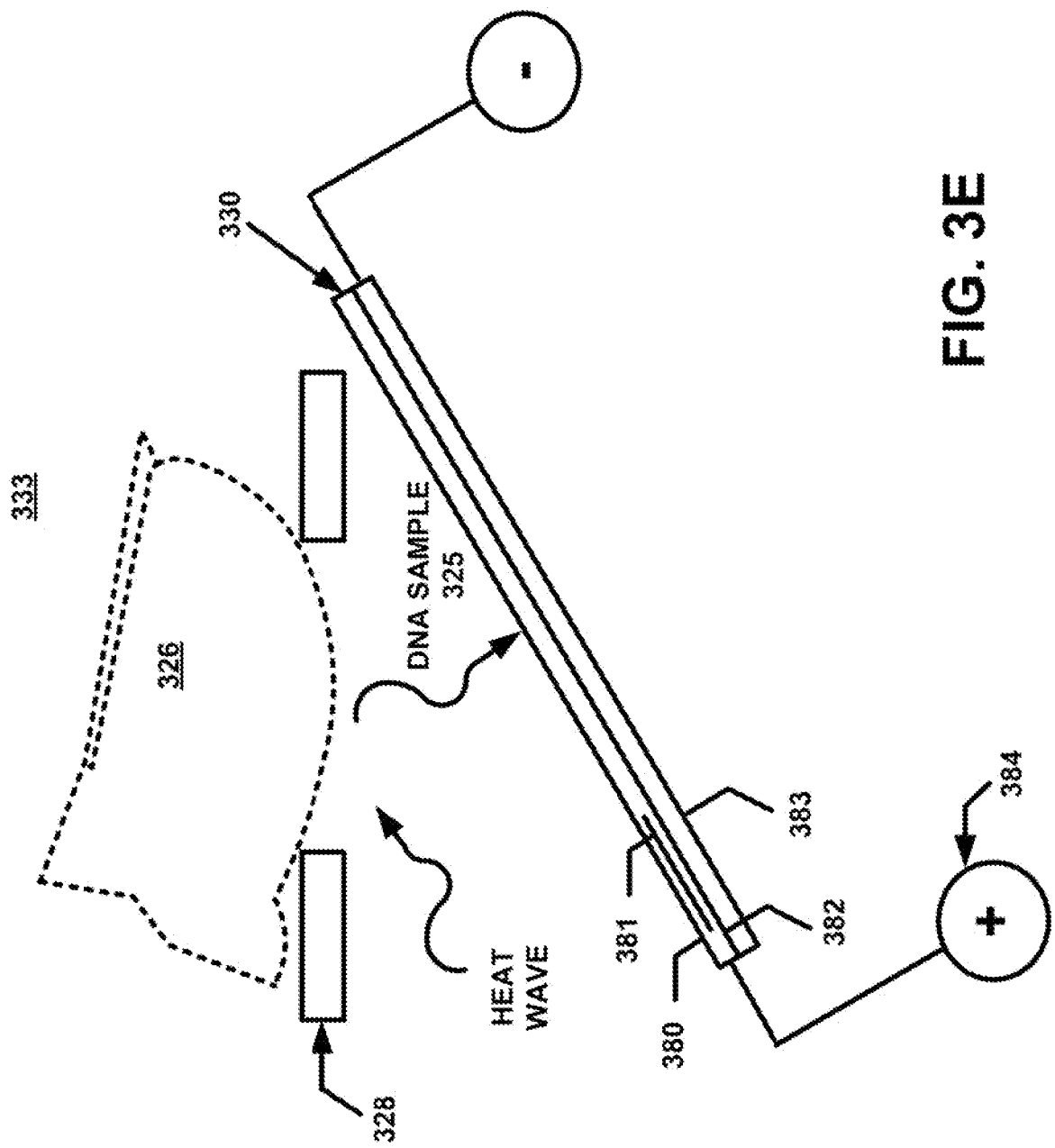

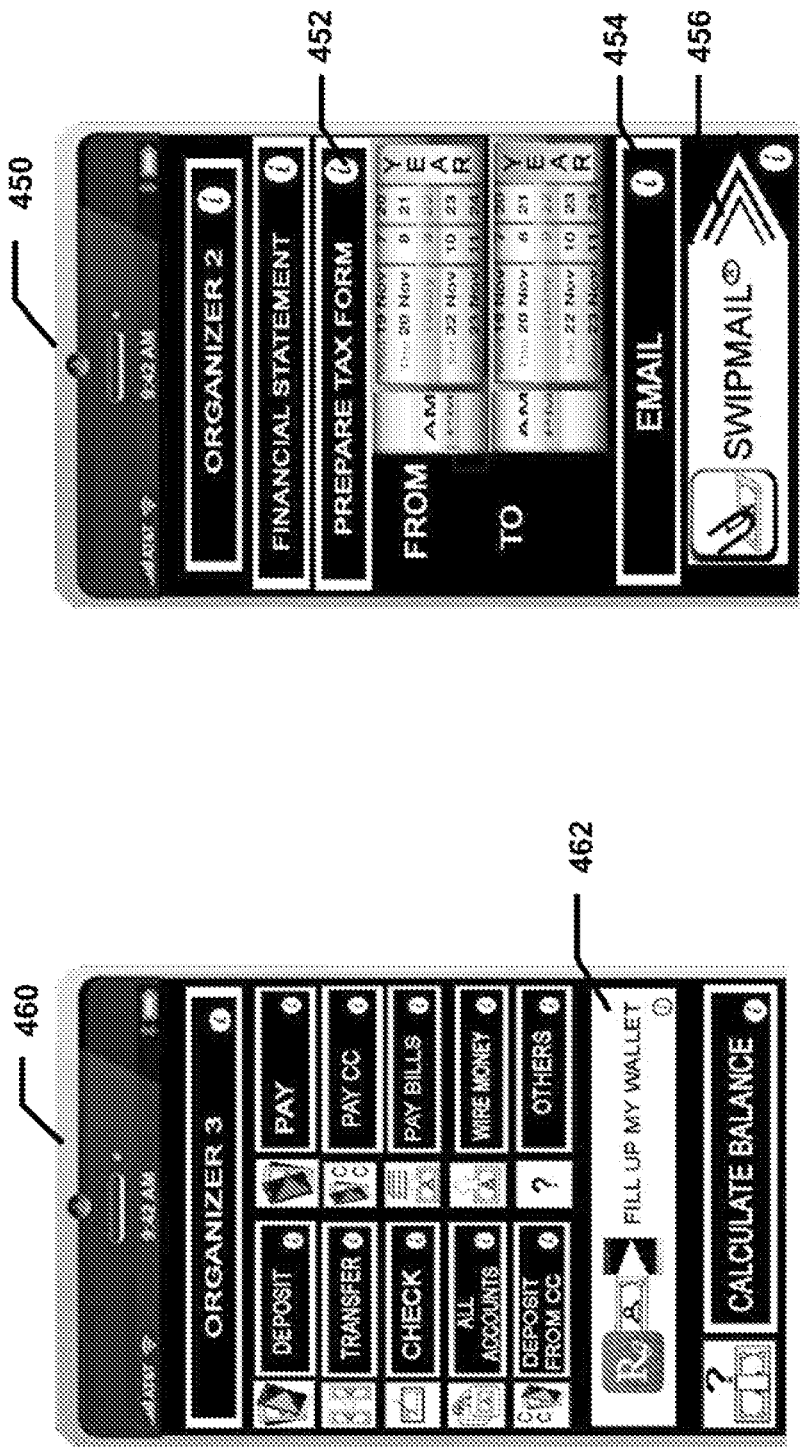

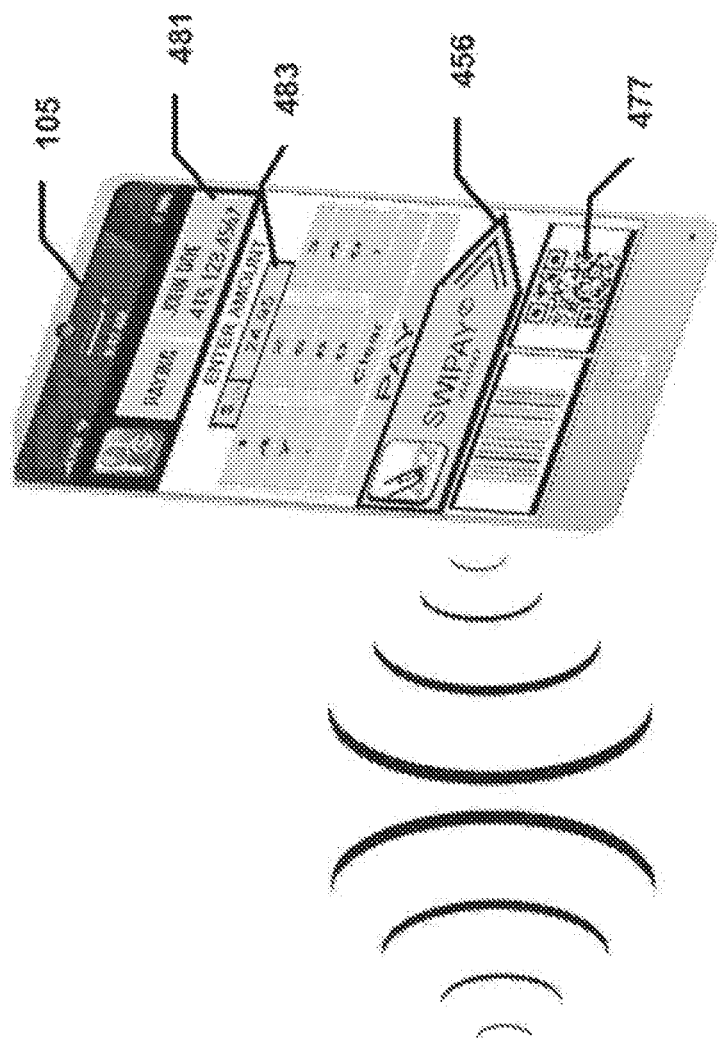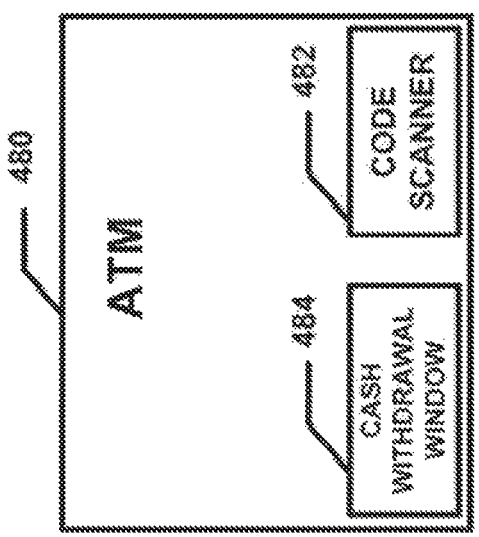
FIG. 41

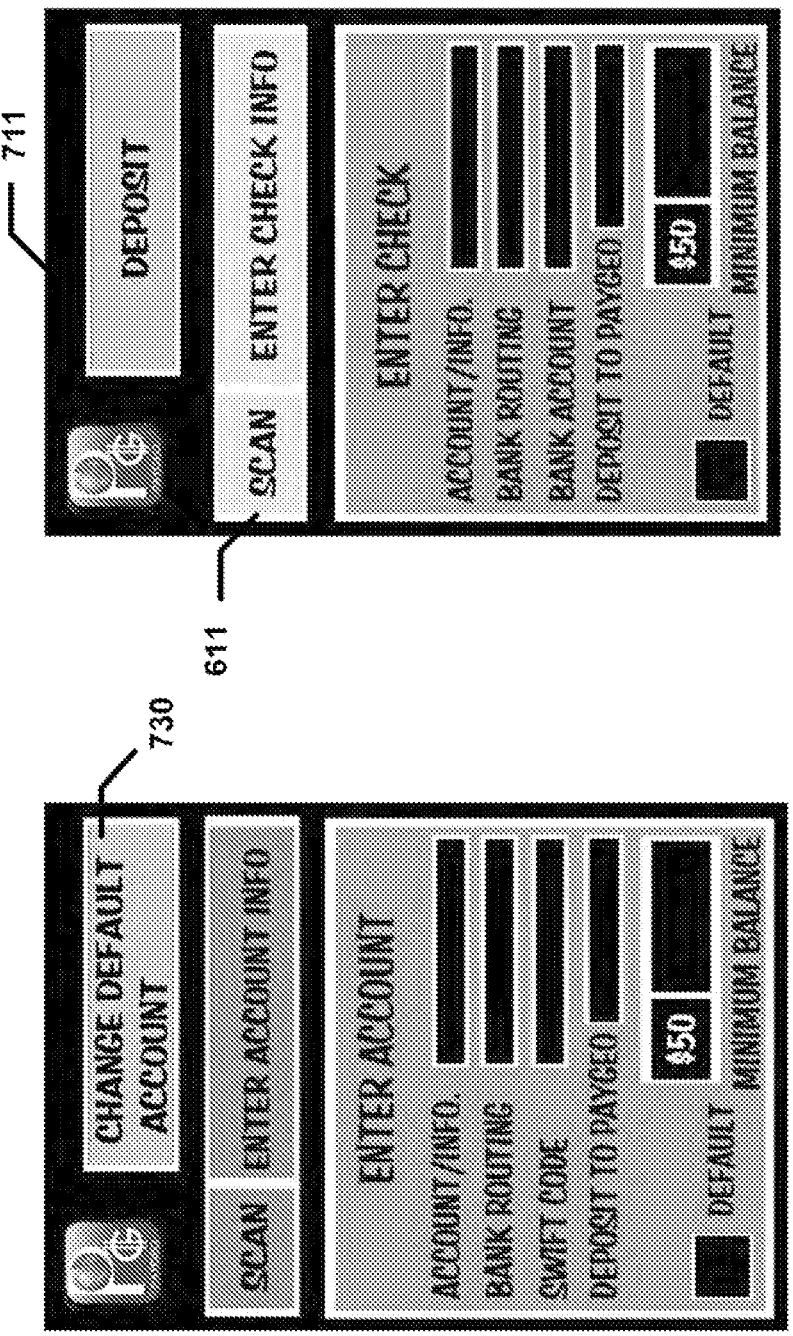

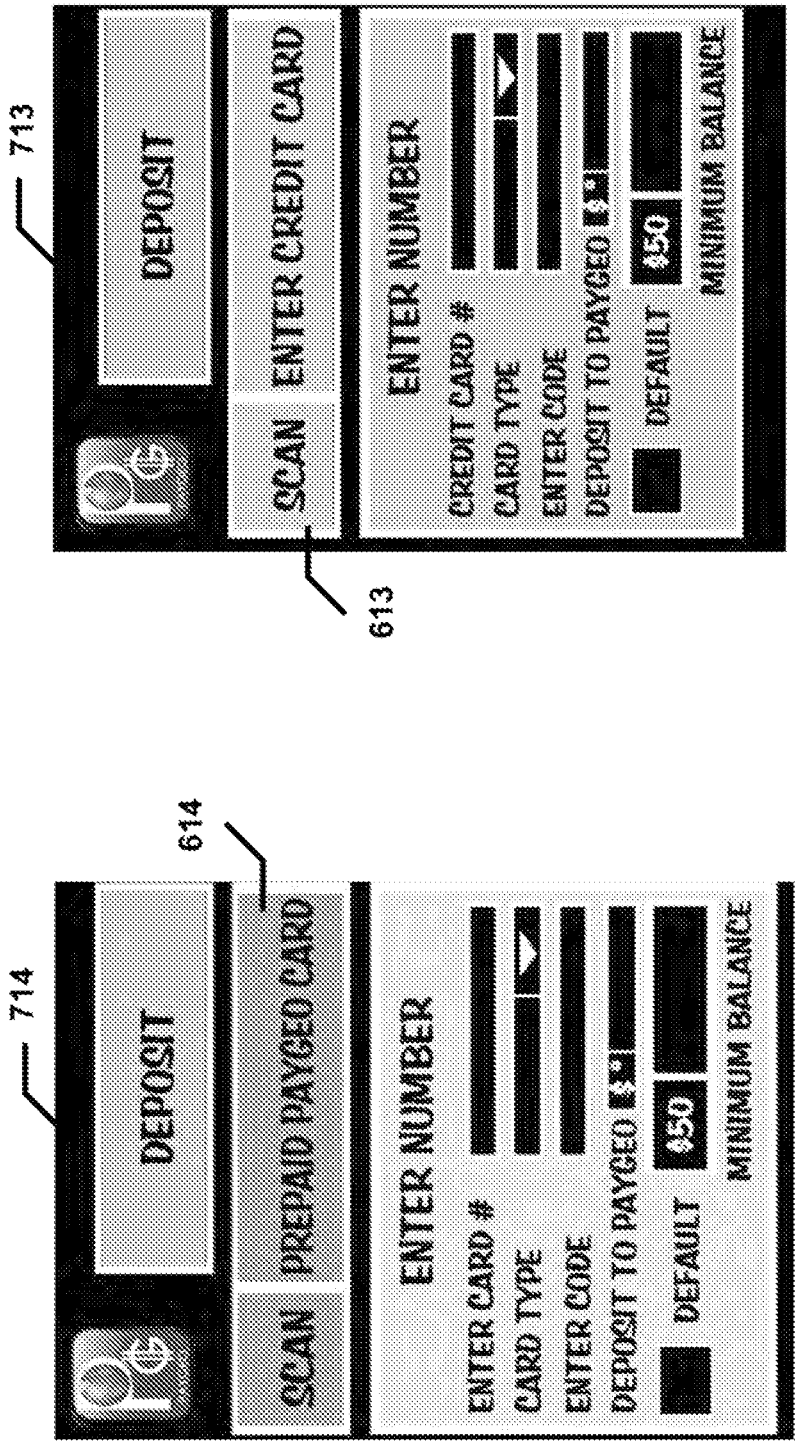

KIT, SYSTEM AND ASSOCIATED METHOD AND SERVICE FOR PROVIDING A PLATFORM TO PREVENT FRAUDULENT FINANCIAL TRANSACTIONS

CROSS-REFERENCE TO RELATED APPLICATIONS

The present application is a continuation of U.S. patent application Ser. No. 16/882,006, filed May 22, 2020 and entitled "Kit, System and Associated Method and Service for Providing a Platform to Prevent Fraudulent Financial Transactions," now U.S. Pat. No. 10,796,296, which is a continuation of U.S. patent application Ser. No. 15/786,470, filed Oct. 17, 2017 and entitled "Kit, System and Associated Method and Service for Providing a Platform to Prevent Fraudulent Financial Transactions," now U.S. Pat. No. 10,733,593, which is a continuation-in-part of U.S. patent application Ser. No. 14/691,499, filed Apr. 20, 2015 and entitled "Kit, System and Associated Method and Service for Providing a Platform to Prevent Fraudulent Financial Transactions," now abandoned, which is a continuation of U.S. patent application Ser. No. 13/974,837, filed Aug. 23, 2013 and entitled "Kit, System and Associated Method and Service for Providing a Platform to Prevent Fraudulent Financial Transactions," now abandoned, now abandoned, which is a continuation-in-part of U.S. patent application Ser. No. 13/185,432, filed Jul. 18, 2011 and entitled "System and Associated Method and Service for Providing a Platform that Allows for the Exchange of Cash Between Members in a Mobile Environment," now U.S. Pat. No. 8,554,671.

The present application includes the same subject matter as U.S. patent application Ser. No. 13/185,432, now U.S. Pat. No. 8,554,671, and is effectively a continuation thereof. U.S. patent application Ser. No. 13/185,432 is hereby incorporated by reference herein.

FIELD OF THE INVENTION

The present invention relates in general to the field of financial transactions. More particularly, this invention relates to a system and associated method and service for providing a platform that enables members to transfer, receive, or otherwise exchange cash and digital currency in various international denominations and hard or soft commodities in a mobile telecommunications environment.

BACKGROUND OF THE INVENTION

Mobile communications have been rapidly expanding and is increasingly becoming a staple commodity in conducting financial transactions. As used herein, mobile communications devices include such electronic devices as the personal digital assistants (PDAs), cellular, mobile, and satellite telephones (collectively referred to as cell phones), portable computers also referred to as tablets, and other similar devices that are known or will be become available, and that allow remote access to financial and other accounts, without necessarily tying down the users to their desktop computers or to a specific locale.

These mobile communication devices are progressively transforming our societies, worldwide, into mobile societies. In these mobile societies, consumers tend to carry, on their persons, a variety of personal effects, such as wallets, purses, checkbooks, keys, and mobile communications devices. These personal effects tend to clutter the consumers and hamper their mobility.

As a result, there have been concerted efforts and proposed solutions to minimize alleviate the consumers from redundant clutters so as to facilitate their mobility. Two such exemplary conventional solutions are generally described in U.S. patent application Nos. 20090068982 and 20080010191.

U.S. patent application No. 20090068982 to Chen et al., generally describes a system or a method that aim at facilitating the securing of a wireless digital transaction. A terminal component receives payment data for goods or services. A mobile device includes a mobile payment card (m-card) that is created by establishing a link to an account associated with a form of currency. The mobile device employs public-key cryptography (PKC) to securely and wirelessly transmit the payment to the terminal component utilizing the m-card and linked account.

U.S. patent application No. 20080010191 to Rackley III et al., generally describes methods and systems for providing a financial payment to a payee (or recipient) utilizing a mobile device or a wireless connected personal digital assistant (PDA). The user inputs information into the mobile device identifying a payee, a payment source for the payment, and a payment method. The mobile device generates a mobile payment instruction comprising information corresponding to the identified payee, the payment source, and the payment method, and wirelessly communicates the mobile payment instruction to a mobile financial transaction system (MFTS). The MFTS generates an MFTS payment instruction to a payment instruction recipient. The MFTS payment instruction includes information identifying the payment source, an amount, information corresponding to the identified payee, and information indicating the payment method. The MFTS communicates the MFTS payment instruction to a payment instruction recipient. In response to receipt of the MFTS payment instruction, the payment instruction recipient effects a payment to the identified payee without any required action by the payee.

While the solutions that are proposed in the foregoing two patent applications address electronic payments, they do not dispense with the use of cash. Although these solutions profess to describe cashless transactions, they still require the consumers to carry cash in order to complete a cash transaction.

Cash has developed along with the human evolutions. The oldest coins are assumed to be the Aegina Chelone coins that were minted circa 700-550 BC, either by the local Aegina people or by Pheidon king of Argos (who first set the standards of weights and measures). The Bibliotheque Nationale in Paris contains a unique electrum stater of Aegina. This coin is dated to 700 BC.

The Ancient Levantines on the Eastern Mediterranean spread the practice to Greek Anatolia and extended it to commerce and trade. Coinage followed Greek colonization and influence first around the Mediterranean and shortly thereafter to North Africa and the Balkans.

Money in the form of ingots, rings, coils, and other pieces of precious-metal bullion, such as silver, emerged as civilization with the emergence of the Mesopotamian and Egyptian civilizations, although these semi-coins had no mark of authority. Some adhered to a weight standard and had a fixed exchange value, while other did not.

Precious and semi-precious metals were made into coins and used to negotiate and settle trades. On the other hand, banknotes offer an alternative bearer form of money. The advantages and disadvantages of these two forms of bearer money vary with the circumstances of use.

Paper money, cash, or banknote was first developed in China during the Tang and Song dynasties, starting in the 7th century. Its roots were in merchant receipts of deposit during the Tang Dynasty (618-907 AD), as merchants and wholesalers desired to avoid the heavy bulk of copper coinage in large commercial transactions. During the Yuan Dynasty, banknotes were adopted by the Mongol Empire. In Europe, the concept of banknotes was first introduced during the 14th century.

Currently, various unseen costs are associated with the use of bearer money, as follows:

1. Manufacturing or issue costs. Coins are produced by industrial manufacturing methods that process the precious or semi-precious metals, and require additions of alloy for hardness and wear resistance. By contrast, bank notes are printed paper (or polymer), and typically have a lower cost of issue, especially in larger denominations, compared to coin of the same value.

2. Wear costs. Banknotes do not lose economic value by wear, since, even if they are in poor condition, they are still a legally valid claim on the issuing bank. However, banks of issue have to pay the cost of replacing banknotes in poor condition, as paper notes wear out much faster than coins.

3. Cost of transport. Coins can be expensive to transport for high value transactions, but banknotes can be issued in large denominations that are lighter than the equivalent value in coins.

4. Cost of acceptance. Coins can be checked for authenticity by weighing and other forms of examination and testing. These costs can be significant, but good quality coin design and manufacturing can help reduce these costs. Banknotes also have an acceptance cost, the costs of checking the banknote's security features and confirming acceptability of the issuing bank.

5. Security. Counterfeiting paper notes seems to be relatively easier than forging coins, especially because of the proliferation of color photocopiers and computer image scanners. Numerous banks and nations have incorporated many types of countermeasures in order to insure the security of their paper notes.

However, while the digitization of credit and debit transactions is increasingly expanding by means of computerization and networking, cash remains one of the last hurdles toward full conversion to a true electronic wallet that replaces the actual wallet. As of the present time, there is no alternative to retaining at least some cash or coins in one's wallet, particularly in certain societies that prefer cash over credit or check transactions.

In addition, while most, if not all the current ATM machines accept check and cash transactions, including the dispensation of cash, to the corresponding bank customers, they do not necessarily accept cash or check transactions from non-customers and particularly from individuals who are non-bank account holders. These individuals might thus be left with less than optimal or convenient options, including the option to cash the checks at designated institutions.

Wherefore, there still remains an unsatisfied need for a new system, method, and associated service ("system") that enable the consumers to transfer, receive, or otherwise exchange cash amongst themselves and the merchants. This system is further usable to facilitate transactions using various international denominations and commodities, such as precious metals (e.g., gold, silver, etc.), in a mobile telecommunications environment. This system should be capable of saving rebate or discount coupons and receipts, while keeping track of points that accumulate for future use or redemption. The system should also enable the use of ATM's for accepting check and cash transactions from customers, non-customers, and non-bank account holders.

SUMMARY OF THE INVENTION

The present invention satisfies this need, and presents a system, method, network, and associated service (collectively referred to herein as "the invention," "the present invention," "the present system," "PayGeo service," "PayGeo," or a similar designation), for executing financial transactions. More particularly, this invention provides a platform that enables members to transfer, receive, or otherwise exchange cash in various international denominations and (hard or soft commodities) commodities.

Hard commodities include basic resources and agricultural products such as iron ore, crude oil, coal, salt, sugar, coffee beans, soybeans, aluminum, copper, rice, wheat, gold, silver, palladium, platinum, etc. Soft commodities include for example, goods that are grown. Another important commodity that may be traded by the present system is in the class of energy, which includes electricity, gas, coal, oil, etc.

The present system provides a platform that enables members to transfer, receive, or otherwise exchange cash and digital currency in various international denominations and commodities, such as precious metals (e.g., gold, silver, etc.), in a mobile telecommunications environment.

Furthermore, the present system generates confidence in a new digital currency "Good Money" that is backed by commodities, such as a precious metal "Gold" standard as opposed to F.I.A.T (government set unsecured value). This Good Money can be used for commerce and every day trades and purchases.

The present system further enables individuals to retrieve (withdraw) or deposit cash in an ATM (cash dispensing machine) environment using various code generation methods or SMS. The codes appear on the mobile screen and allow recognition of the sender and receiver parties, and adjust account balances accordingly.

The present system further allows the creation of a mobile account by allowing cash deposits to become part of the digital payment platform system with all its features.

In addition, the present system is capable of saving rebate or discount coupons and receipts, while keeping track of points that accumulate for future use or redemption.

The user can store contacts or create new ones from PayGeo members or from a phone book. When a payment is sent to a non-PayGeo member, a "prompt" will alert the recipient of the fund of the impending transfer. A new user can then download and create an account and receive the transferred fund to his/her PayGeo account.

If a user elects to receive an actual paper check mailed to the user's address, or if the user requests a transfer to a different banking institution, PayGeo can comply with the user's request and changing conditions and environments.

The PayGeo service provides a "Good Deal" application, which is a payment platform that is designed to work in a mobile digital wallet environment, on mobile devices, such as smart phones, smart pads. Its main purpose is to facilitate monetary transactions made between individuals or companies. Users may pay each other using NFC (Near Field Communication) type frequency by simply swiping a finger pointed at the other instrument (Swipay or Swipmail function).

The Swipay or Swipmail function may be used by users in close proximity to each other or who are remotely distanced, to pay and/or receive money with instruments.

This platform allows hosting for receiving/paying bills from and to vendors or individuals. It allows individuals to pay or borrow with or without interest amongst themselves or other users.

PayGeo's mobile digital wallet technology (software or application) provides coupons, discount codes, special offerings, based on: location, product type, product name, vendor name, interest or hobby, from data uploaded by vendors or individual advertisers on the PayGeo service.

The PayGeo service uses an integrated ultra secure technology that enables cash-less transactions and eliminates the need to carry credit cards, cash, thus replacing all the contents of a physical wallet, and completely supplanting the physical wallet with a digital wallet.

The PayGeo service includes a "Good Money" function that may be turned 'ON' and which would be equivalent to the user's choice of currency or country's denomination. Good Money may then be used in commerce with the backing of Gold or precious metal (or commodities) standards.

PayGeo service allows user to upload his or her smart phones to host and store all information that is normally stored in a wallet or purse by means of, for example scanning, swiping, manual entry, and voice recognition, of various items such as: credit cards, identification cards, mileage-accumulating cards, points accumulating cords, insurance cards, membership cards, etc.

PayGeo service allows the transactions to be coded in 2D or 3D bar/matrix/QR/maxi codes, SMS etc., so that the resulting codes may be read by, for example: smart phones, scanner, cashier scanners, instruments with compatible software, etc.

PayGeo service provides a private label platform to the banking community, and facilitates private entities that wish to use the system by creating an escrow-like platform for transactions. The transactions may be fulfilled in a wireless 'wire transfer' or ACH (Automated clearing house) in the U.S. or similar environments. Transactions are fulfilled if certain conditions are met and agreed upon by the sending and/or receiving parties, institutions.

PayGeo services also provide a platform to host and work with existing credit cards companies and/or banking institutions, users and vendors needs such as:

Access immediate cash from ATM.
Deposit cash to an ATM to create an account.
Withdraw cash from ATM with secure code recognition features.
Generate secured SMS or encrypted codes readable by mobile phone scanners, ATMs, and various types of vendor's cashier scanners.
Recognizing account holders based on phone numbers.
Recognizing like software users in proximate vicinity.
Offer incentives to use with similarly positioned (or grouped) users.
Turn Good money function ON.
Use Good money in all commerce.
Locate Good Deals.
Redeem coupons.
Transfer coupons.
Calculate the balance of various financial accounts.
Find the total spent per payment method.
Search amount spent within a predetermined period of time or date.
Preparation of Financial statements.
Preparation of tax returns or statements for different countries.
Swipmail or Swipay transfers data, funds, or an instrument) from one user device (e.g., a smart phone) to another.
Set allowance for individual users.
Pay from a specific credit card.
Pay to/from PayGeo account.
Charge a transaction.
Transfer to another credit card.
Transfer money to another account.
Transfer funds from one financial account to another.
Pay from a previously identified bank account.
Withdraw from a credit card to convert to cash.
Withdraw from a bank account to convert to cash.
Transfer points into payments (e.g., pay with points instead of cash).
Transfer mileage into payment.
Pay with credit cards points that accumulate based on usage of the PayGeo service.
Pay with mileage points that accumulate based on usage of the PayGeo service.
Convert/exchange funds to another currency/denomination.
Convert to "Good Money."
Issue digital debit or credit cards that are stored on the user mobile station.
Use or redeem gift cards.
Issue/send credit cards to contact.
Add money to the user's wallet (replenish the user's account).
Swipay an individual and/or a vendor by account number or name.
Swipay or Swipmail a payment or a document to a scanner.
Pay bills from one or more specified accounts.
Pay bills from one or more specified credit cards.
Pay bills from the user's wallet money (in user's PayGeo account).
Receive bills online.
Use Swipmail to send bills online.

The user can locate "Good Deals" on a GPS map showing the merchants' locations, names, phone numbers, websites, based on a search choice made earlier and proximity to user. Once a choice is made, the user can use the user mobile station to exchange goods/services, by paying directly from: a PayGeo account, other credit cards, points accumulated on PayGeo, points accumulated on other Credit cards, "Good Money" which represents cash that is withdrawn directly from the user's PayGeo account.

Vendors and/or individuals may post ads for goods and services on PayGeo's platform directly from the user mobile station or on PayGeo's website. These ads can be rich media format: video, audio, data, or simply images containing a message. Advertisements may also be in coupon format such as various types of barcodes QR codes and read and understood by PayGeo software. Barcodes are translated into common currency and are used by a swiping action (Swipmail or Swipay) to another user mobile device, or to a scanner. The barcodes on the user mobile station may also be scanned by a scanner.

The user may decide on an amount to pay, with or without exchanging goods or services. The user simply types the amount desired, decides from which account, e.g., credit card, redemption points, etc., the money will be debited and simply makes the payment with a swiping motion. The user may also use the Swipmail function of the user mobile station to send the funds to an individual, a contact name from the address book, a vendor, an institution, or to wire transaction in the form of a coded email or SMS. Receiving a payment or making a payment can be made by direct swipe towards a compatible device.

PayGeo service also provides usage-based credit points accumulation. PayGeo will accumulate points in the user's account based on the volume of transactions, time and locale of the transactions, and other factors. The user can accumulate further points by searching advertisements and by logging to vendors' or individuals' ads, etc.

A user has the choice of redeeming points when purchasing goods and services. The PayGeo platform allows transfer of points between many users. The user can consolidate points that accumulate from different sources, such as: one or more credit card points, mileage points, etc., and transfer the consolidated points into PayGeo's Good Money points, to redeem purchases or to obtain a discount on transactions.

PayGeo service also provides a profile-based custom advertisement push. PayGeo service may profile users and pass to vendors and individuals the option to target advertisements based on, such factors as: location, search interest, age, gender, product purchases, product visited, time zones, geographic location, etc. These matrixes can help individuals and advertisers to special target users based on the criteria that fit their product or service needs.

PayGeo service also provides an interactive and flexible search advertisement pull. The user can automatically see a map within a range showing "Good Deals" participants on a GPS map with locations, names, phone numbers, website info, by touching a pin (on the map) of any good deal in his surrounding area. The user may alternatively create a search based on a choice that was made earlier.

Users can interact with other users based on: location, targeted matrix of choice, or other criteria of choice.

Individuals may use PayGeo to choose any type of search based on: location, product type, product name, vendor name, interest or hobby, from data uploaded by vendors or individual advertisers on PayGeo.

PayGeo service also provides a dedicated around the clock media-rich commercial channel network. Users can view advertisements circulating in various shapes using a PayGeo online channel.

PayGeo service also provides users and vendors with advanced usage data management and analysis. The user mobile station understands the users (prepares a user profile) by tracking transaction matrix such as: amount transferred, received, cash spent, cash transferred, items purchased, originating transaction location, destination transaction location, currency type, commodities exchanged, commodities sold, commodities purchased, spending habits, the number of visitors to the ads, total visits and pages consumed on site, monitoring user engagement metrics such as the length and depth of each visit, identifying the location of visitors and the mobile operators and devices used to access PayGeo's service.

PayGeo analyzes traffic, enables users to compare the quality of traffic by analyzing visitors and usage information's through the following traffic sources:

Advertising partner or specific advertising campaign.

Search provider with detailed information on top keywords.

Referrals from other mobile sites.

Direct traffic to mobile sites.

PayGeo analysis improves site usage by monitoring the performance and usage of individual pages on mobile sites that will help optimize the needs of mobile audience:

Analyze page views, visit duration, and bounce rate for each page on site.

Identify which pages the visitors previously visited prior to arriving to a particular site.

Determine which pages have the highest exit rates.

PayGeo service achieves advertisers' goals and allows users to measure the goals that are specific to their mobile sites or campaigns. For example, PayGeo can track the following metrics:

The percentage of visitors who downloaded an item from a site.

Conversion rates for all advertising or marketing partners.

Percentage of visitors who logged into an account.

PayGeo service enables targeting audience to become more dynamic, and use all targeting technologies on a single platform, thus enabling users to combine targeting methodologies in order to reach highly specific audience segments. PayGeo further enables users to identify and target a large number of consumers.

PayGeo can provide the following additional services:

Demographic prediction technology that enables advertisers to target their precise demographic markets with accuracy and to eliminate wasted impressions.

Behavioral targeting Index that converts online behaviors into actionable data for advertisers by scoring each online consumer's interest and purchase intent based on their recent online behavioral patterns.

Dynamically segments web content into a large number of categories (e.g., more than a thousand categories), and assigning a real-time content relevancy score, which ensures that the advertisers' ads are highly relevant to the immediate content.

Enables marketers to target consumers by geographic locations and customize messaging for optimal relevance.

Enables advertisers to target their past website visitors or to retarget consumers who have previously seen their ads in category placements outside the PayGeo service.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

Figure 1:
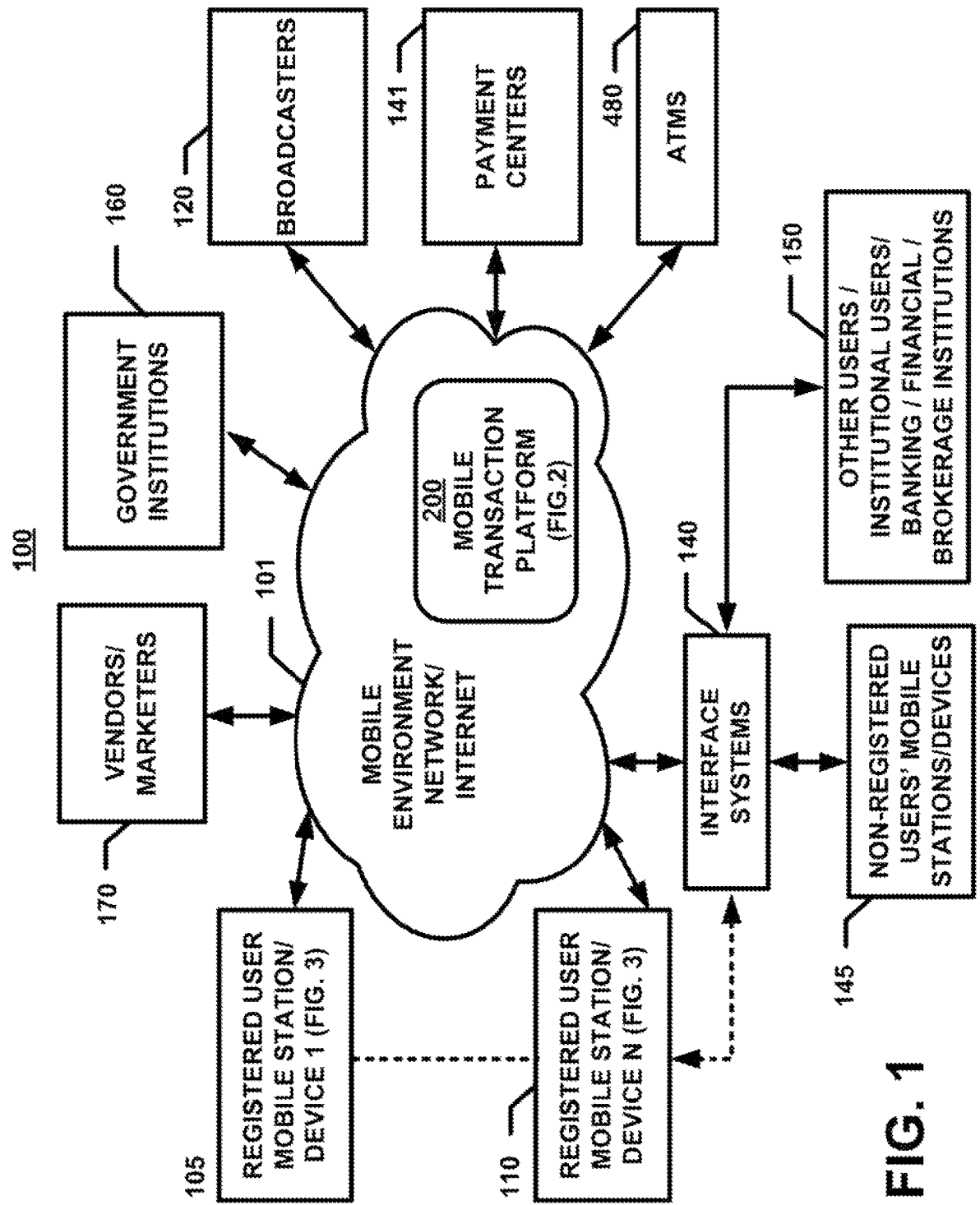
FIG. 1 is a schematic illustration of an exemplary operating environment in which a platform for allowing the exchange of cash, commodities (such as gold, silver, etc.), or other valuables, between members (or non-members), in a mobile environment may be used according to the present invention, wherein this platform is also referred to herein as "mobile transaction platform," "PayGeo," or "PayGeo platform"

FIG. 1 illustrates an exemplary operating environment 100 in which a mobile transaction platform 200 for allowing the transfer or exchange of cash, commodities (such as gold, silver, etc.), or other valuables, between members (or non-members) in a mobile environment, may be used according to the present invention. This platform 200 is also referred to herein as "the platform 200," "PayGeo service," or "PayGeo platform 200." As it will be described later in greater detail, the platform 200 selectively communicates with a plurality of users, such as the registered users 105, 110, non-registered users 145, other users, institutional users, banking or financial institutions, or brokerage institutions 150, government institutions 160, and vendors/marketers 170, and allows them to selectively communicate amongst each other and with the platform 200 (FIG. 2), via, for example a plurality of corresponding interface systems 140. As used herein, the term "user" may contextually refer to any one of the foregoing users.

Figure 2:
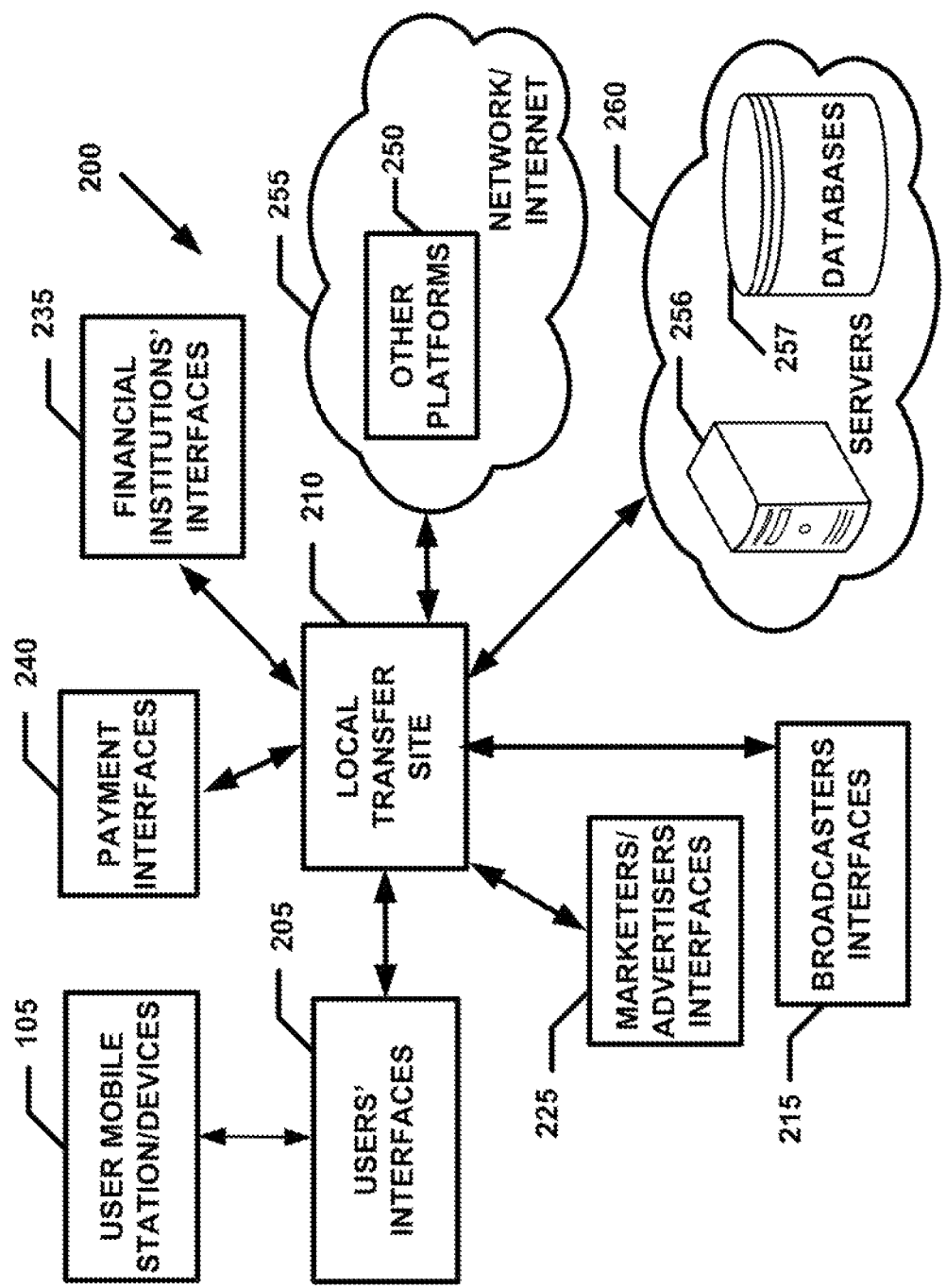
FIG. 2 is a schematic illustration of the mobile transaction platform of FIG. 1, along with its operating environment.

Referring now to FIG. 2, it further illustrates the mobile transaction platform 200, along with its operating environment. More specifically, the mobile transaction platform 200 generally includes at least one local transfer site 210 that may be connected to other mobile transaction platforms 250 via a local, centralized, or decentralized network 255. The mobile transaction platform 200 further includes a plurality of local, centralized, or networked servers 256 and databases 257 that are interconnected via a network 260.

The mobile transaction platform 200 also includes a plurality of interfaces that enable access to the local transfer site 210. As used herein, the term "interface" includes a hardware, a software, a service, and/or a computer program product that is typically embedded within, or installed on a computer, a server, or otherwise a dedicated auxiliary device. Alternatively, the interface can be saved on a removable storage medium such as a diskette, a CD, a DVD, a hard drive, or another known or available memory device.

In a preferred embodiment illustrated in FIG. 2, the mobile transaction platform 200 includes a plurality of representative user station interfaces 205 that enable the user stations 105, 110 to access the local transfer site 210; a plurality of broadcasters' interfaces 215 that enable the broadcasters (or broadcasting stations) 120 to access the local transfer site 210; a plurality of advertisers' interfaces 225 that enable the advertisers 125 to access the local transfer site 210; a plurality of marketers' interfaces 235 that enable the marketers 135 to access the local transfer site 210; and a plurality of payment interlaces 240 that enable access to the payment centers 141 and ATMs 480 (FIG. 1), either directly or through the local transfer site 210.

Referring now to FIG. 3, it comprises FIGS. 3A-3K, and represents a flowchart 300 (FIG. 3A) and associated exemplary screen shots (FIGS. 3B-3K), that illustrate a method 300 of setting up and activating a user mobile device (or station) 105, for use with the mobile transaction platform 200 of FIGS. 1 and 2.

Figure 3A:
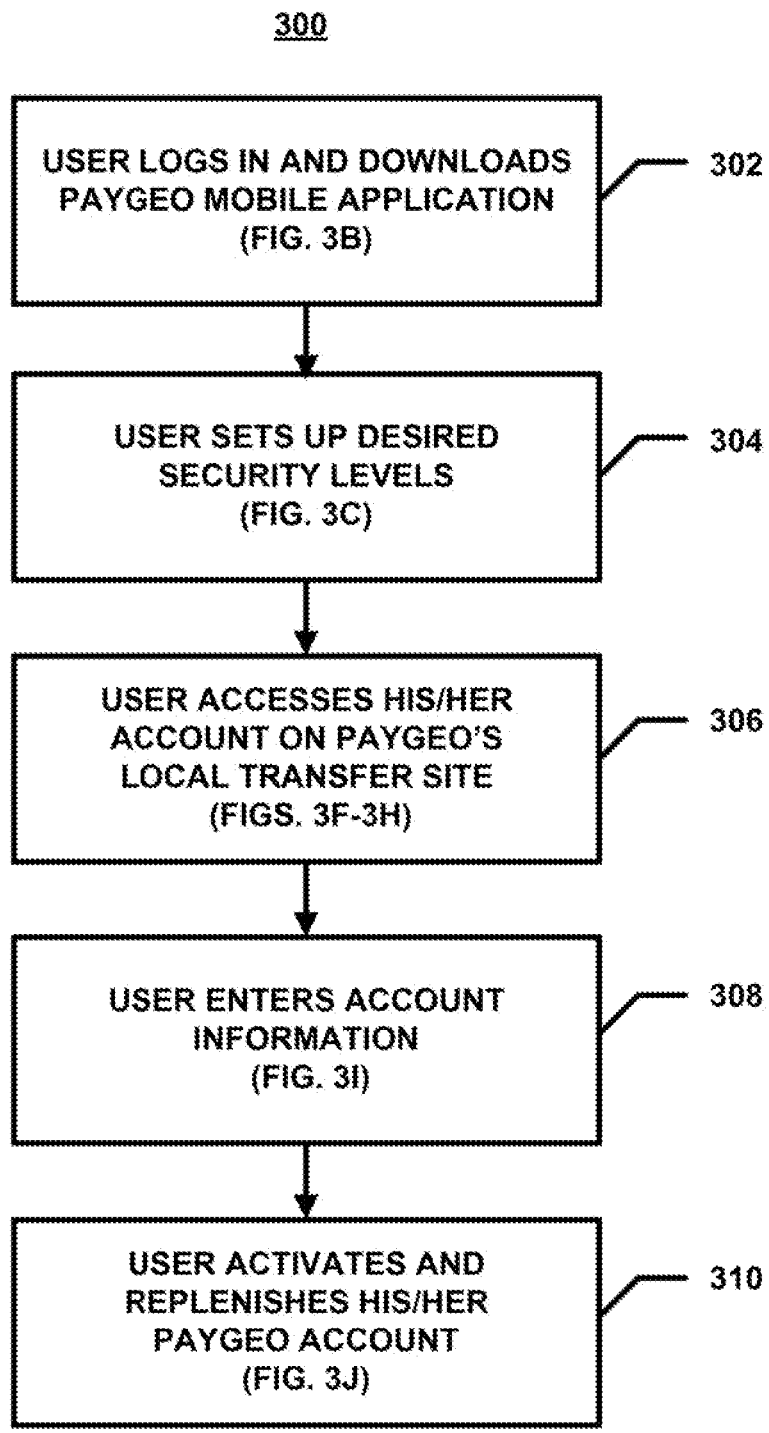
FIG. 3 comprises FIGS. 3A-3K, and represents a flowchart and associated exemplary screen shots, that illustrate a method of setting up and activating a user mobile device for use with the mobile transaction platform of FIGS. 1 and 2.

A user using a mobile station or device, e.g., 105, starts the process 300, at step 302 of FIG. 3A, by logging in to the local (PayGeo) transfer site 210, and downloading a mobile application (PayGeo application) 320 (FIG. 3B) to the mobile device 105. The user may then start, at step 304 of FIG. 3A and its corresponding screen shot of FIG. 3C, the PayGeo application 320, by setting up the desired security level or levels for the user station 105.

Figure 3B:
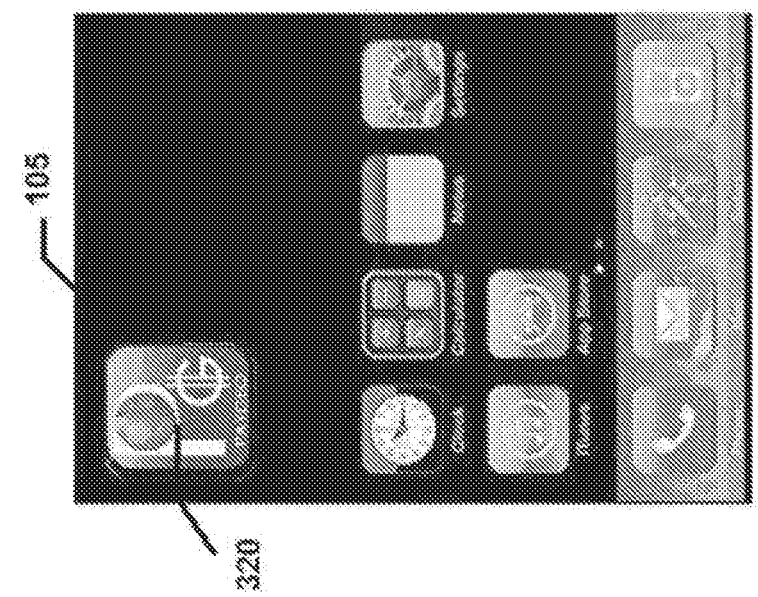
Figure 3C:
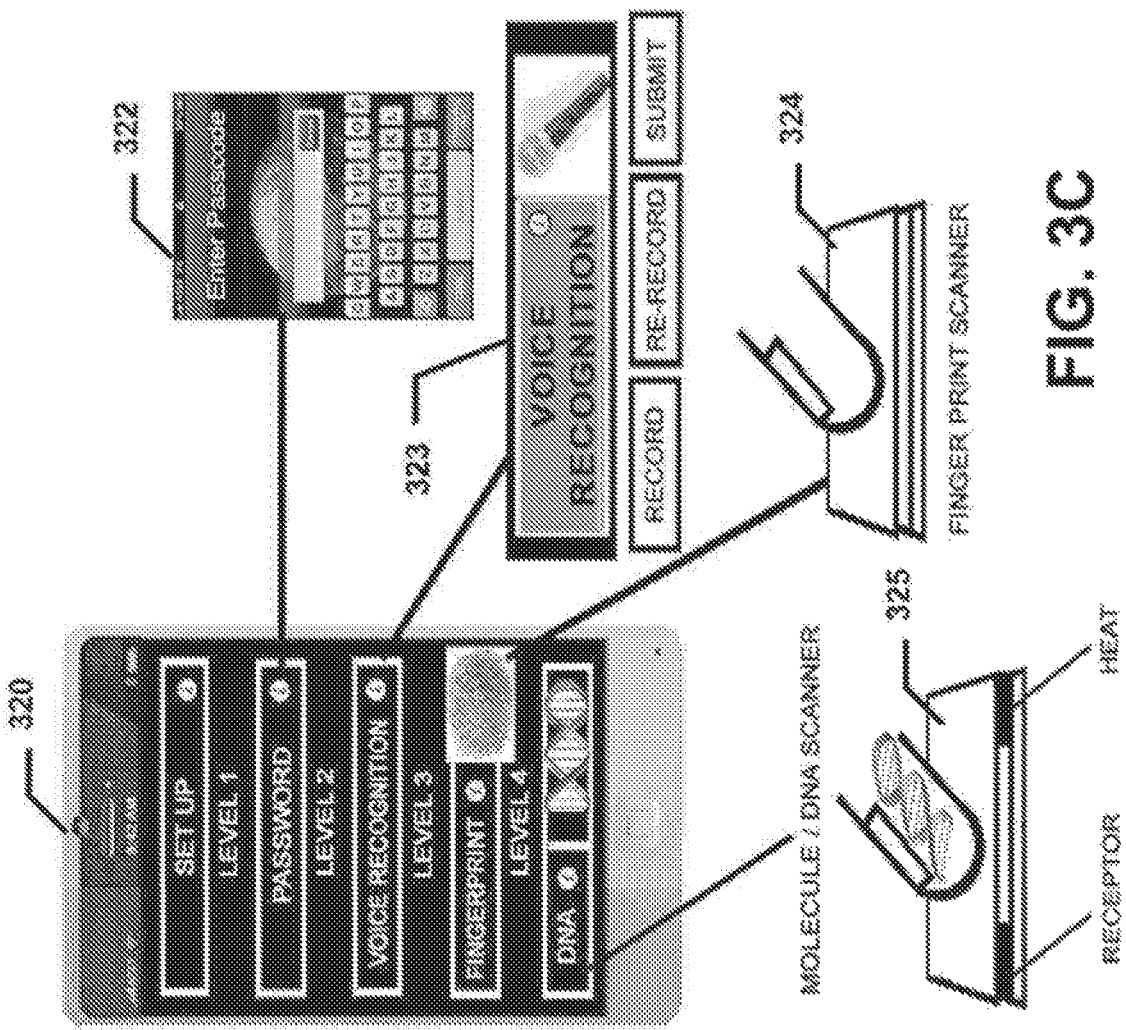
Figure 3F:
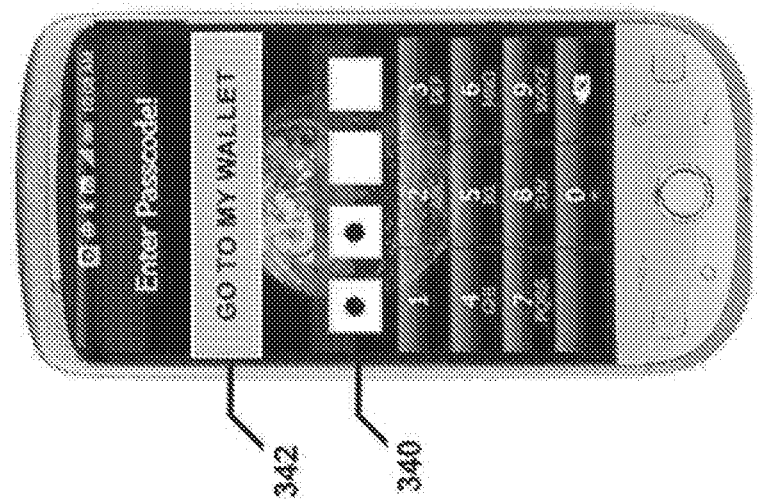

In the embodiment illustrated in FIG. 3B, the user has the option to select at least one of four security levels. It should be clear that other security levels or measures are conceivable and possible according to the present invention. The first security level is set by entering a user-selected password 322. The second security level is set by recording a voice recognition password, signature, or template 323, that identifies the user. The third security level is set by entering a user-selected fingerprint 324 that identifies the user. The fourth security level is set by providing a user DNA sample 325 for identification. The information collected or entered for these security levels may be stored in the user mobile station 105, and allows the user to access his/her account on PayGeo's local transfer site 210.

FIGS. 3D and 3E further explain the details of the fourth security level. FIGS. 3D and 3E illustrate a DNA molecular switch (or DNA switch) 333 that collects the DNA sample 325 from a DNA source, such as for example, a user's finger 326 (shown in dotted lines to indicate non-inclusion as part of the invention). The DNA molecular switch 333 generally includes a heat source 327 (FIG. 3D), a contact plate 328, and a DNA sample collection plate 330.

In use, the heat source 327 generates a heat wave that travels toward the contact plate 328 and the DNA source 326. In this exemplary embodiment, the heat source 327 is shown to include a power source 331, a heating element 332, and a heat diffuser 334. It should be understood that other heat sources can alternatively be used, such as light emitting diodes (LEDs), etc., that generate sufficient heat to extract the DNA sample 325 from the DNA source 326.

As the heat wave reaches the DNA source contact plate 328, it forces the extraction of DNA molecules and the binding on a carbon nanotube or polymer 381, which in turn is heated in a micro "denaturation" process to duplicate and form on the second nanocarbon tube or polymer 382. In the initial setting stage, and while the switch is being "programmed" the secondary current heat source 384 is turned OFF, and the DNA random molecules will stick tightly, reforming a double-stranded DNA 383 that only complementary strands can come together. This process is called "annealing" or "hybridization" with a very specific current measured value (a closed passing current). The resulting value is stored on the receptor as part of switch circuitry 333.

Subsequent use of the switch will not necessitate a secondary heat source, therefore "annealing" or "hybridization" is not performed on the second test sample. The second DNA sample 325 is extracted with a heat source 335 and binds on a new temporary nanocarbon tube or polymer 380. This nanocarbon tube or polymer 380 is then subjected to a current generated by the power source 384 that results a specific value that may match the original stored current value and the switch is closed, or may result in a different current value which indicates a different sample origin.

The completion of the setup steps 302 and 304 and the entry of other user-specific information, enable the user to log in to his/her account on PayGeo's local transfer site 210, at step 306 of FIG. 3A. Once the user is ready to login to his/her account, the user selects the preferred identification security levels that were previously set up at step 304. In the example illustrated in FIG. 3F, the user has selected to access his/her account by entering his/her password 340, and then pressing the "Go To My Wallet" function 342.

Figure 3G:
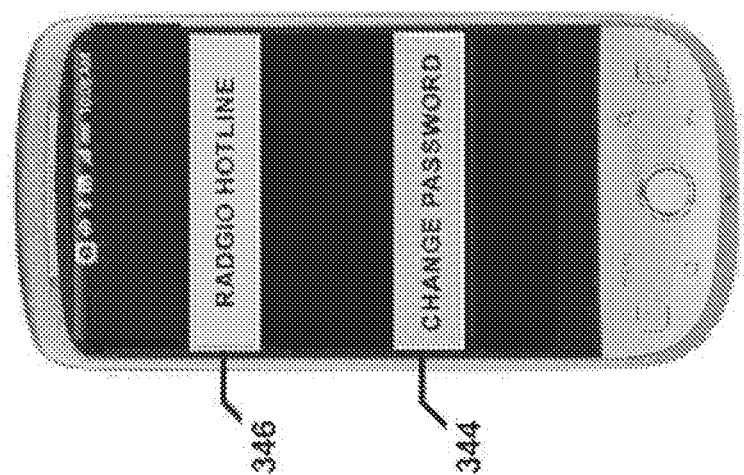
Figure 3H:
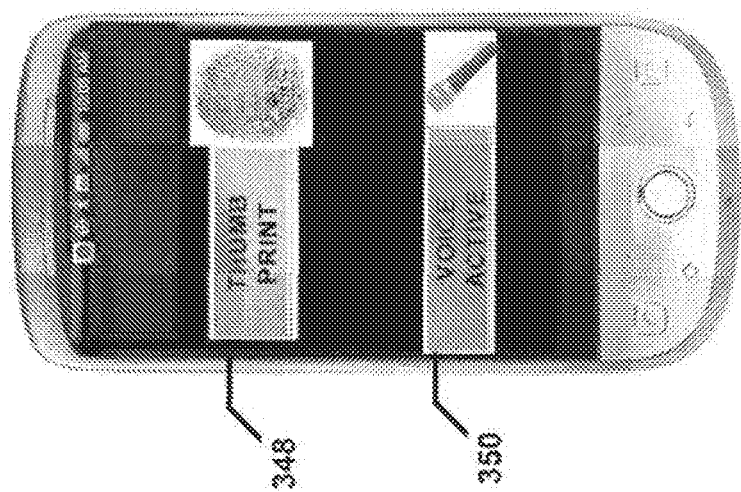

Once the user is logged in to his/her PayGeo account, he/she is able to change his/her password 344 or to contact PayGeo's customer (or technical) support 346 (FIG. 3G). Alternatively, or in addition to the first security level (e.g., password), the user may elect to enter alternative or additional security levels as illustrated in FIG. 3H, such as a thumb print 348 or a voice print 350.

Figure 3I:
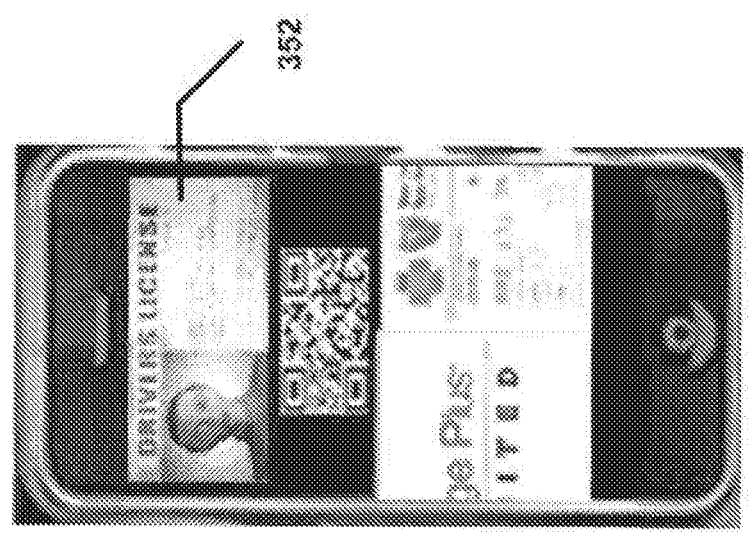

As illustrated at step 308 and the corresponding FIG. 3I, the user may enter various account information that would otherwise be conventional available on cards and carried by the user in his wallet or her purse, or stored on his/her computer. For example purpose only, and without intent to limit the types of information inputted by the user, the user may enter different financial institutions, such as bank cards, credit cards, and debit cards, and to set spending limits therefor. The user may choose to manually enter the information, or to scan a photo ID (e.g., driver's license) 352, credit cards, ATM cards, point accumulating cards, health, car, and home insurance cards, etc. The entered items or information may then be securely stored on the user mobile device 105 and/or the mobile transaction platform 200.

Figure 3J:
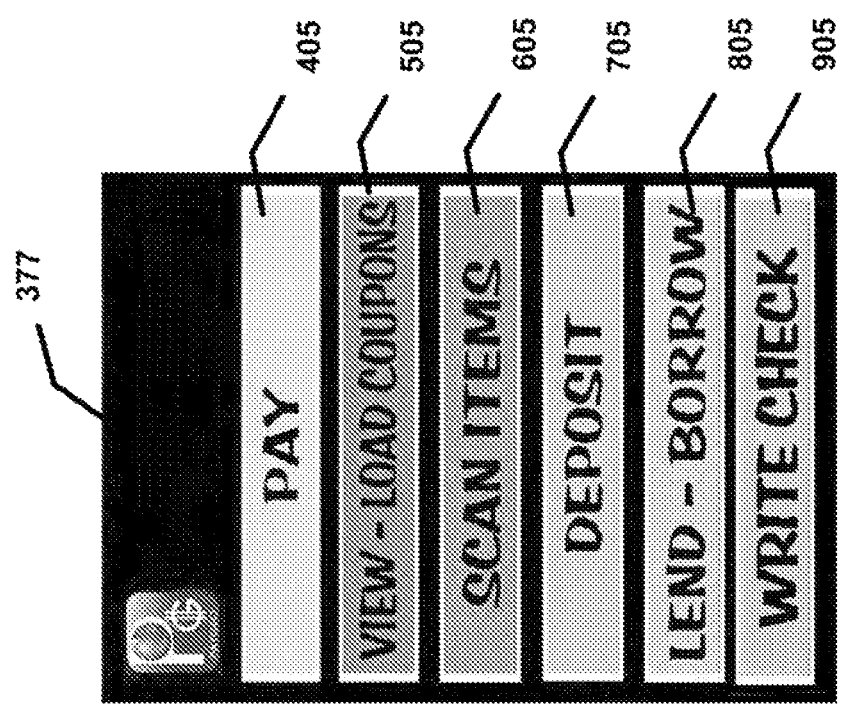

As further illustrated at step 310, the user also may continue his/her PayGeo account creation and complete the set up process by opening an account that can be created with a zero (or a minimal) balance, which can be readily replenished by various methods, as it will be explained later in greater detail in connection with FIG. 3J.

Upon proper login, the user mobile station 105 provides the user with a function selection screen 377 (FIG. 3J), which allows the user to select at least of several functions that are supported by the mobile transaction platform 200. In this exemplary illustration, the user mobile station 105 enables the following six functions:

A PAY function 405, which will be further detailed in connection with FIG. 4.

A VIEW-LOAD COUPONS function 505, which will be further detailed in connection with FIG. 5.

A SCAN ITEMS function 605, which will be further detailed in connection with FIG. 6.

A DEPOSIT function 705, which will be further detailed in connection with FIG. 7.

A LEND-BORROW function 805, which will be further detailed in connection with FIG. 8.

A WRITE CHECK function 905, which will be further detailed in connection with FIG. 9.

Figure 3K:
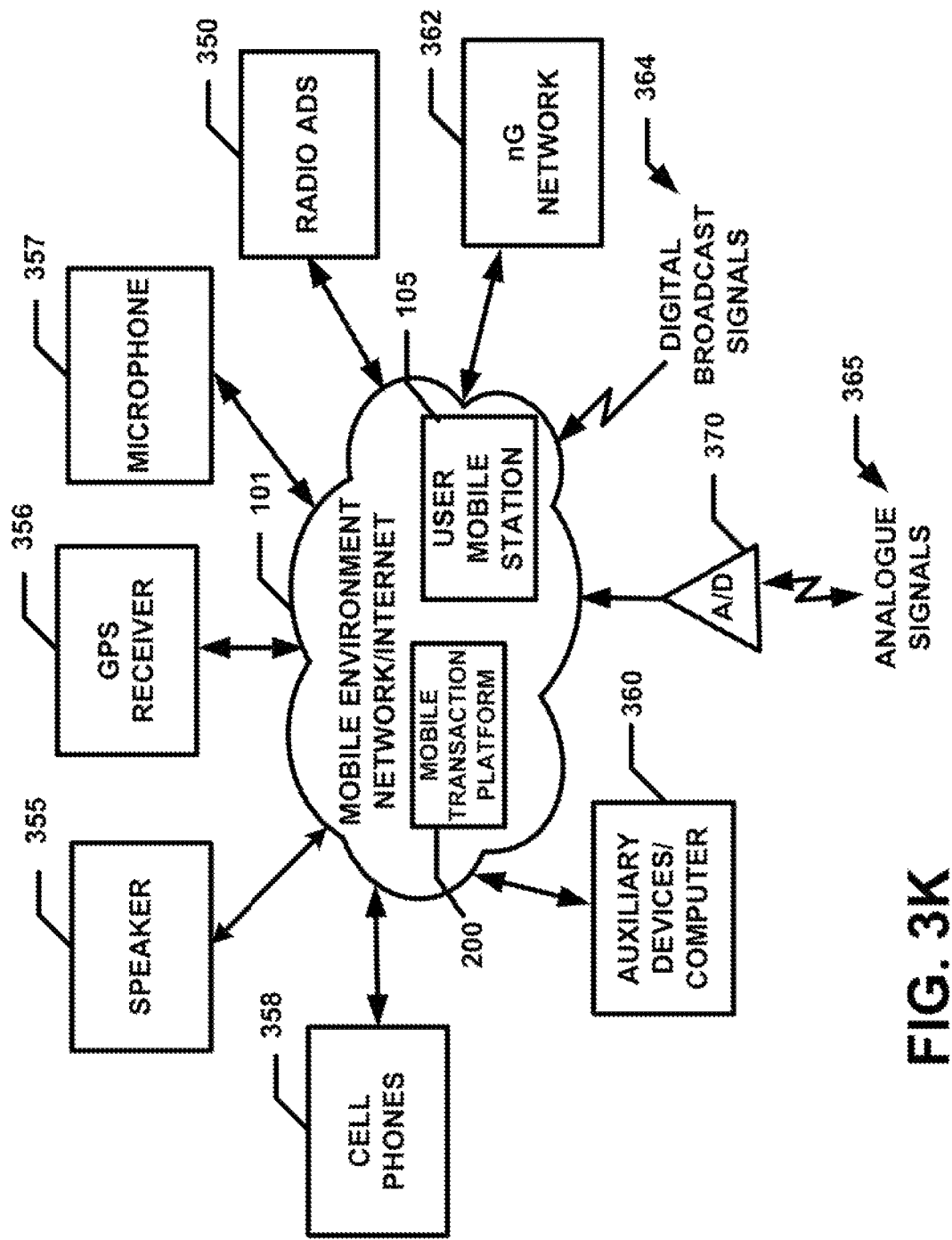

With further reference to FIG. 3K, it is a schematic illustration of the exemplary user station 105 along with its operating environment. As explained earlier, the user mobile station 105 communicates with the mobile transaction platform 200 via the network 101. The user station 105 can be a standalone device, such as a mobile phone, tablet, or computer, or it can be used with other auxiliary devices, such as an external speaker 355, a GPS receiver 356, a microphone 357, a cellular (mobile or satellite) phone 358, or any other available compatible device 360. The user mobile station 105 may also various signals, including video, audio, and/or data signals over an nG communication network (e.g., 3G, 4G, etc.) 362, WIFI or other digital broadcast signals 364, or analogue broadcast signals 365 that are digitized by means of an analogue-to-digital converter 370.

Figure 4A:
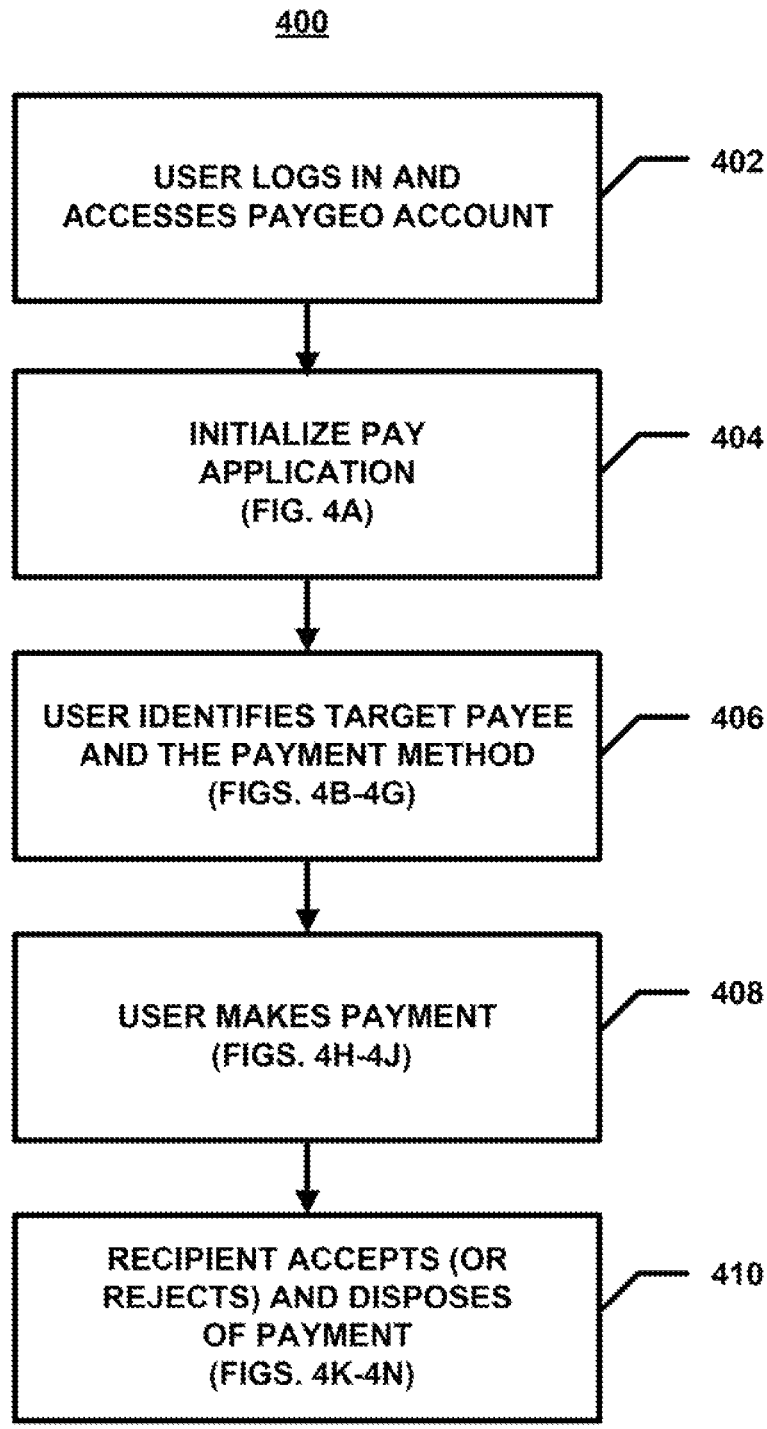
FIG. 4 comprises FIGS. 4A-4P, and represents a flowchart and associated exemplary screen shots, that illustrate a PAY function for enabling the user mobile device to execute payments, using the mobile transaction platform of FIG. 1.
Figure 4B:
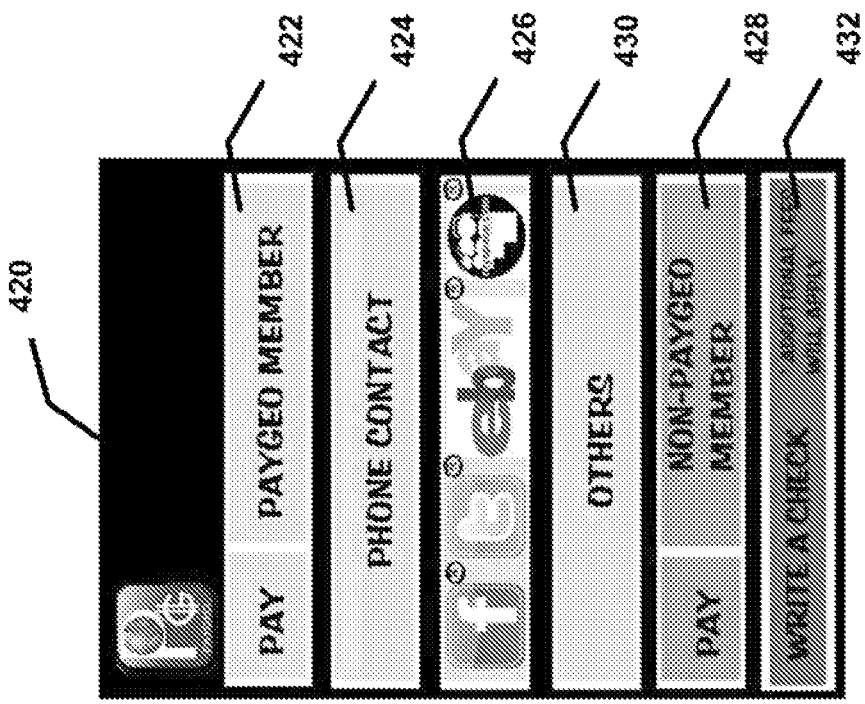
Figure 4C:
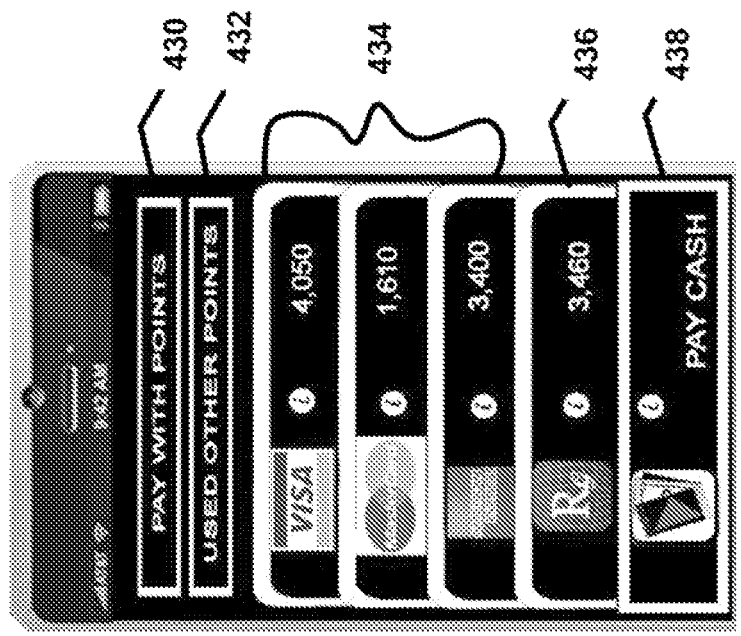
Figure 4D:
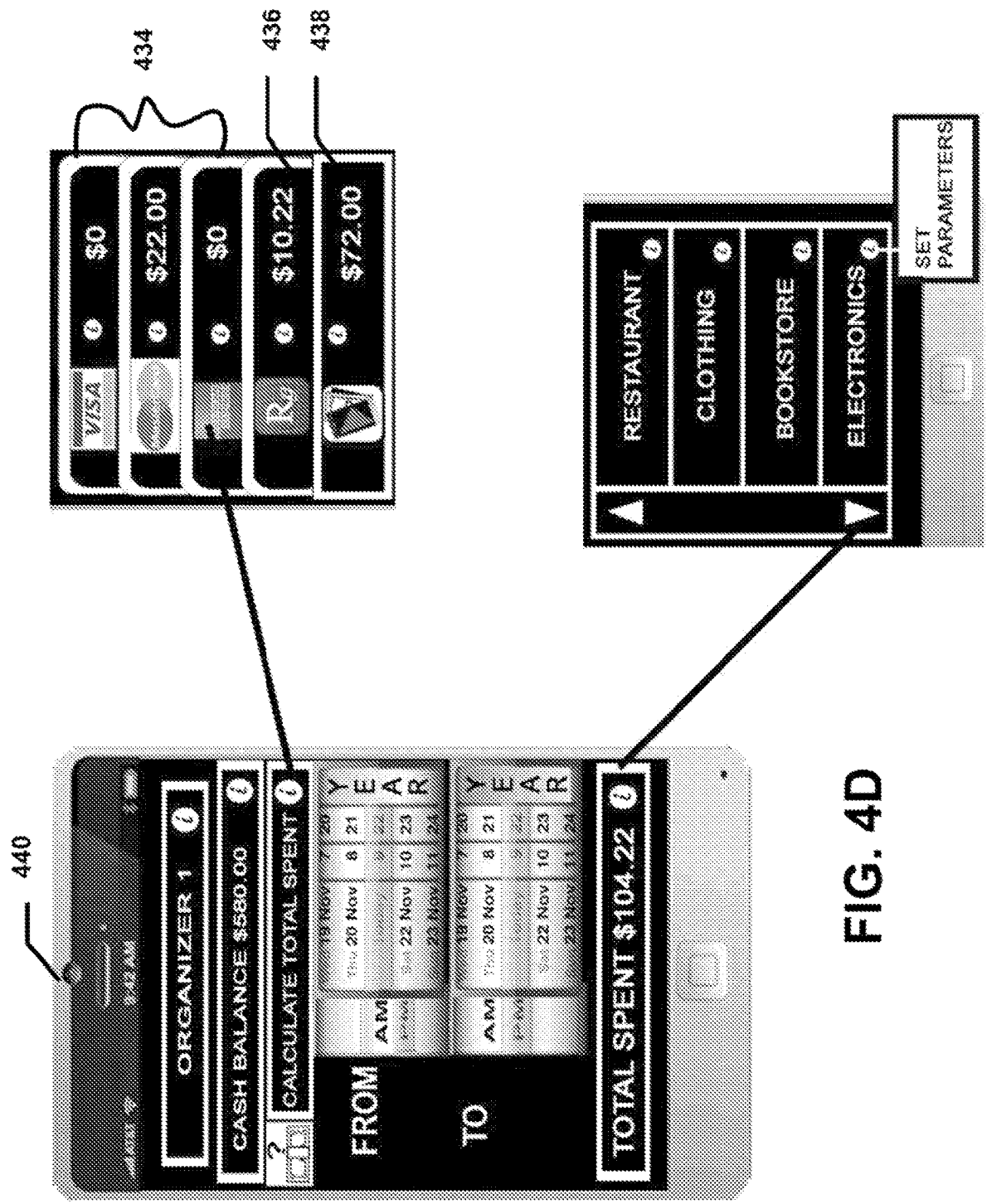
Figure 4G:
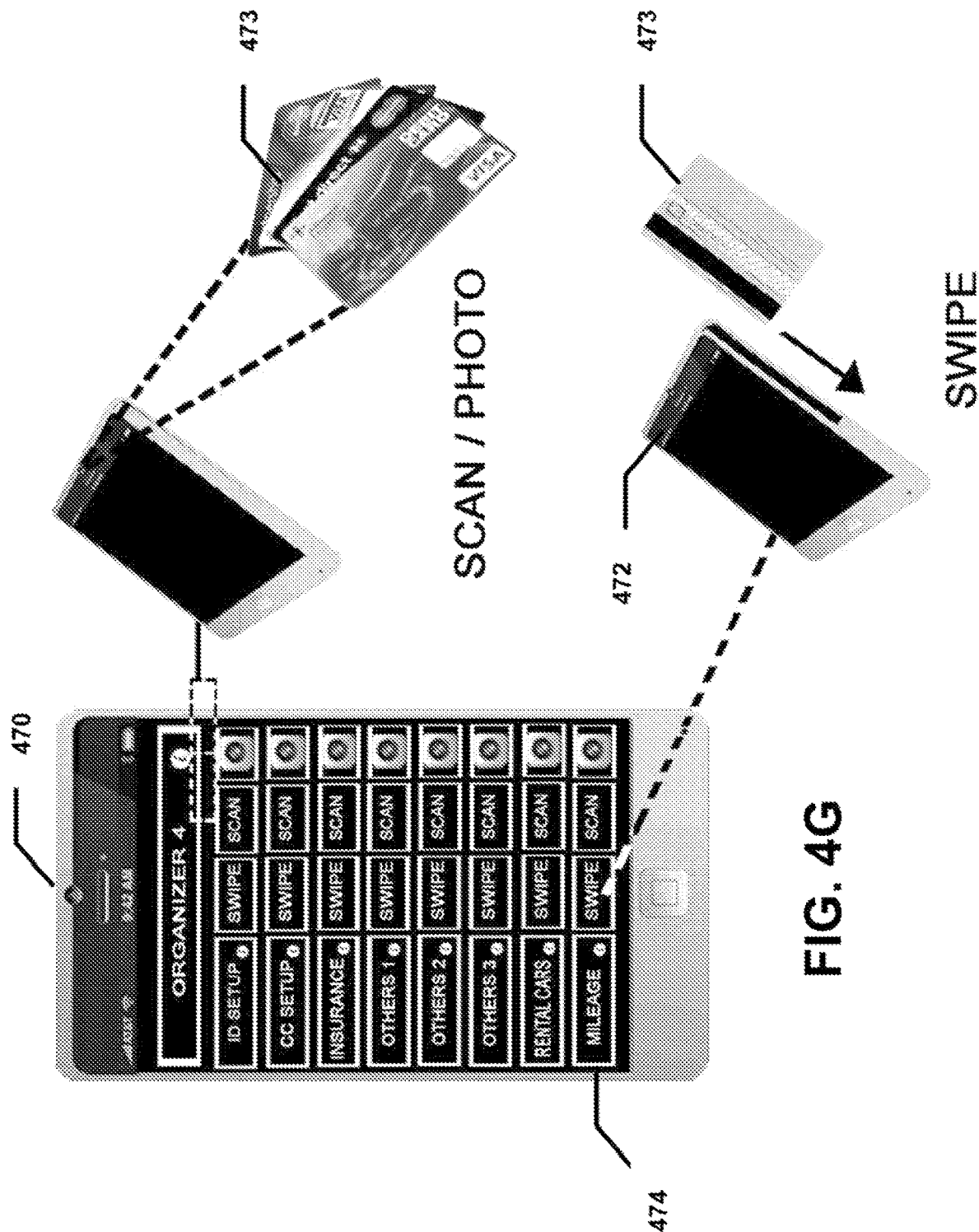
Figure 4H:
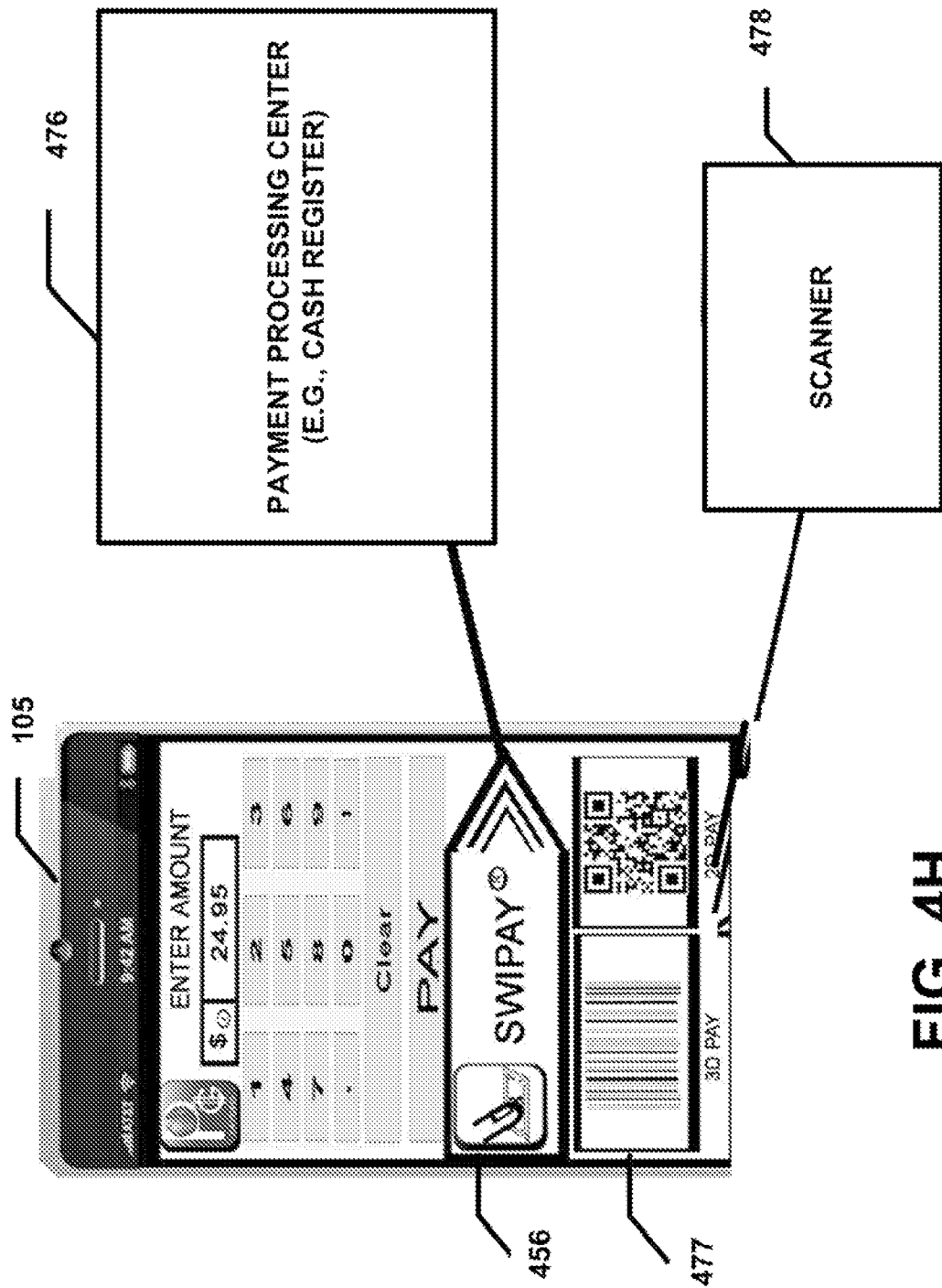
Figure 4J:
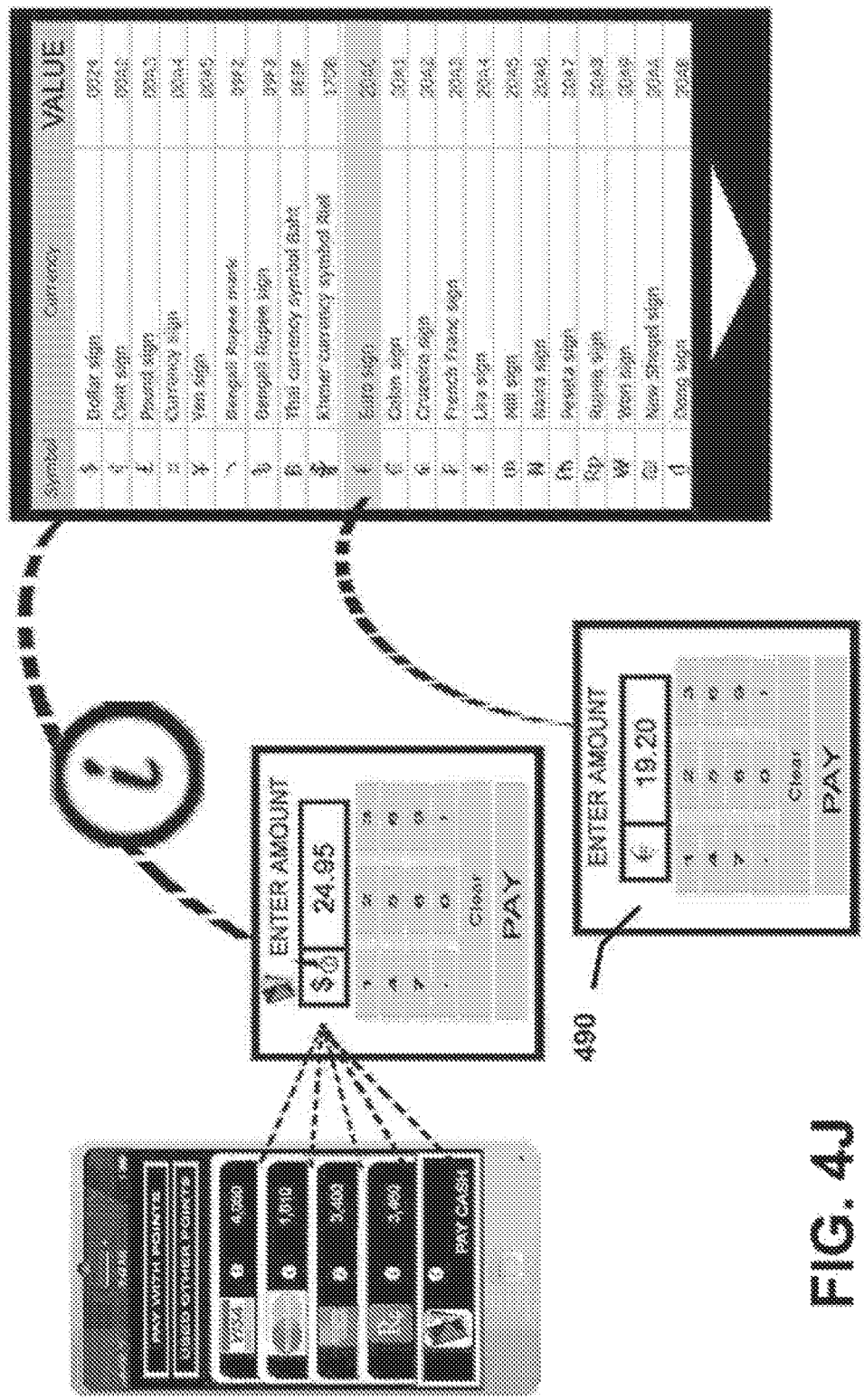
Figure 4K:
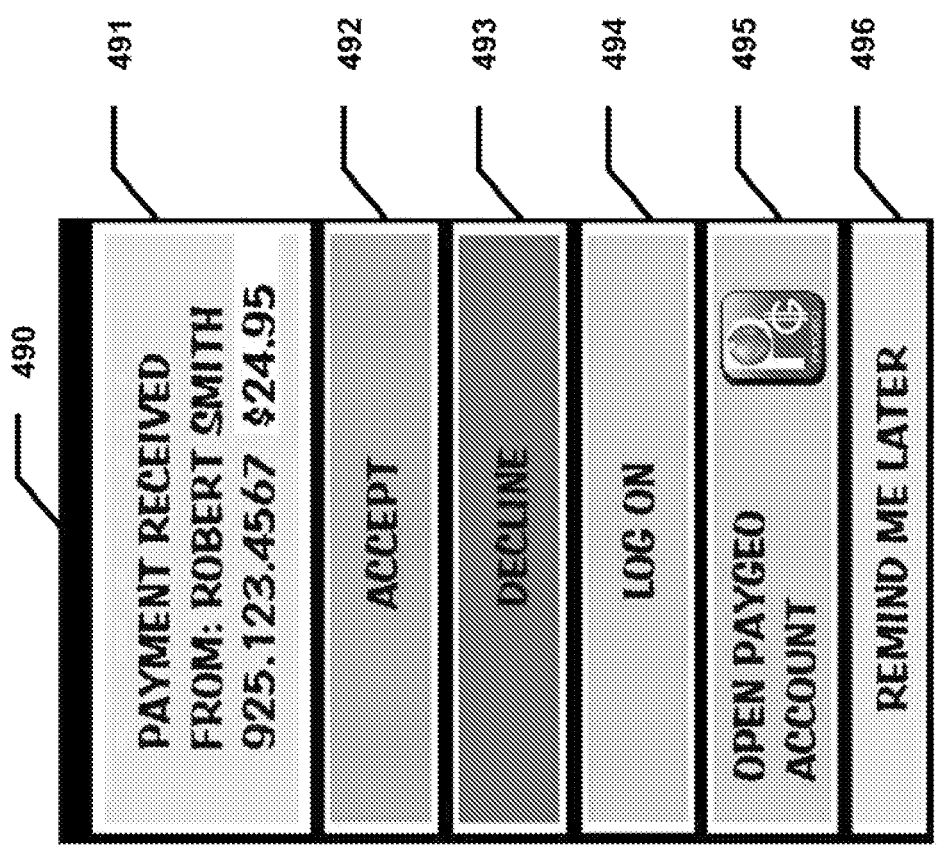
Figure 4L:
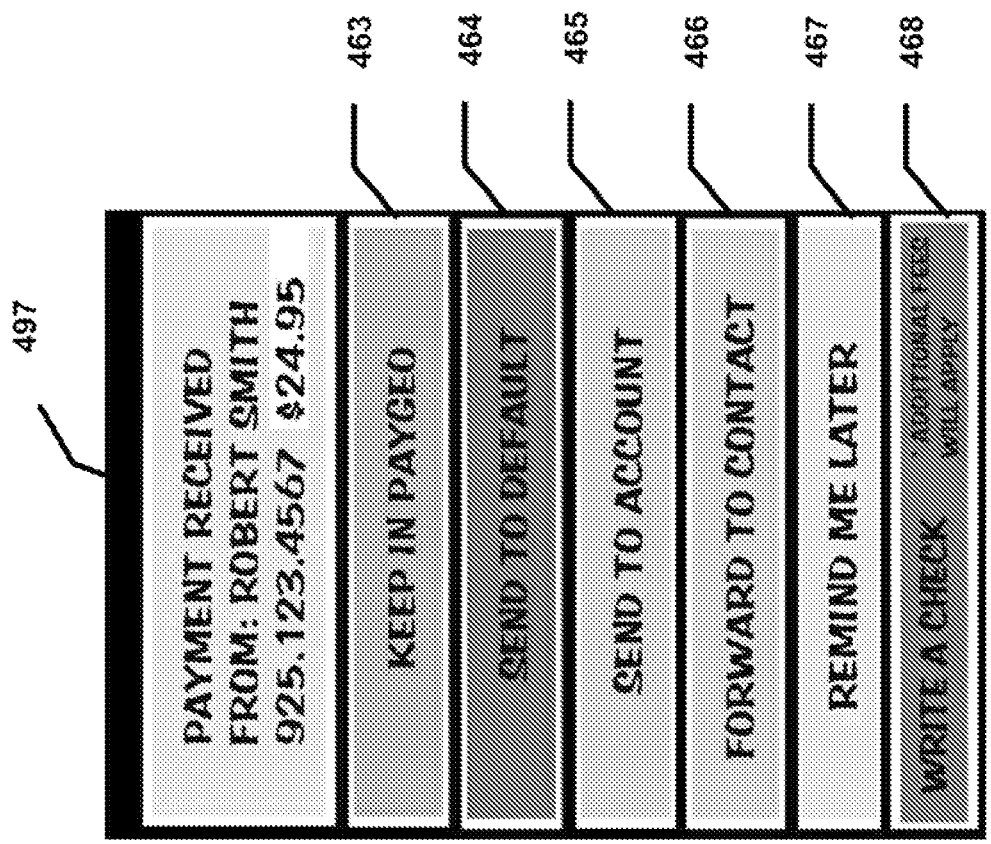
Figure 4M:
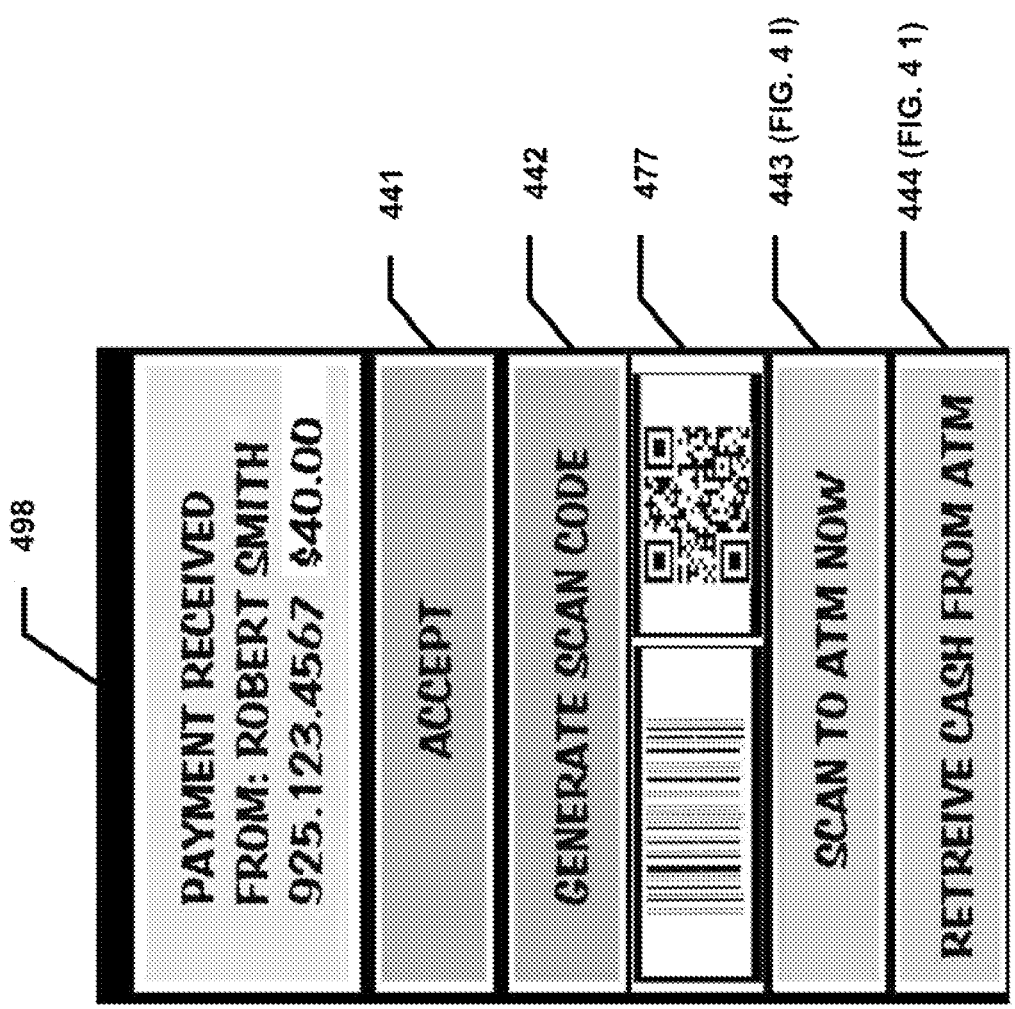
Figure 4N:
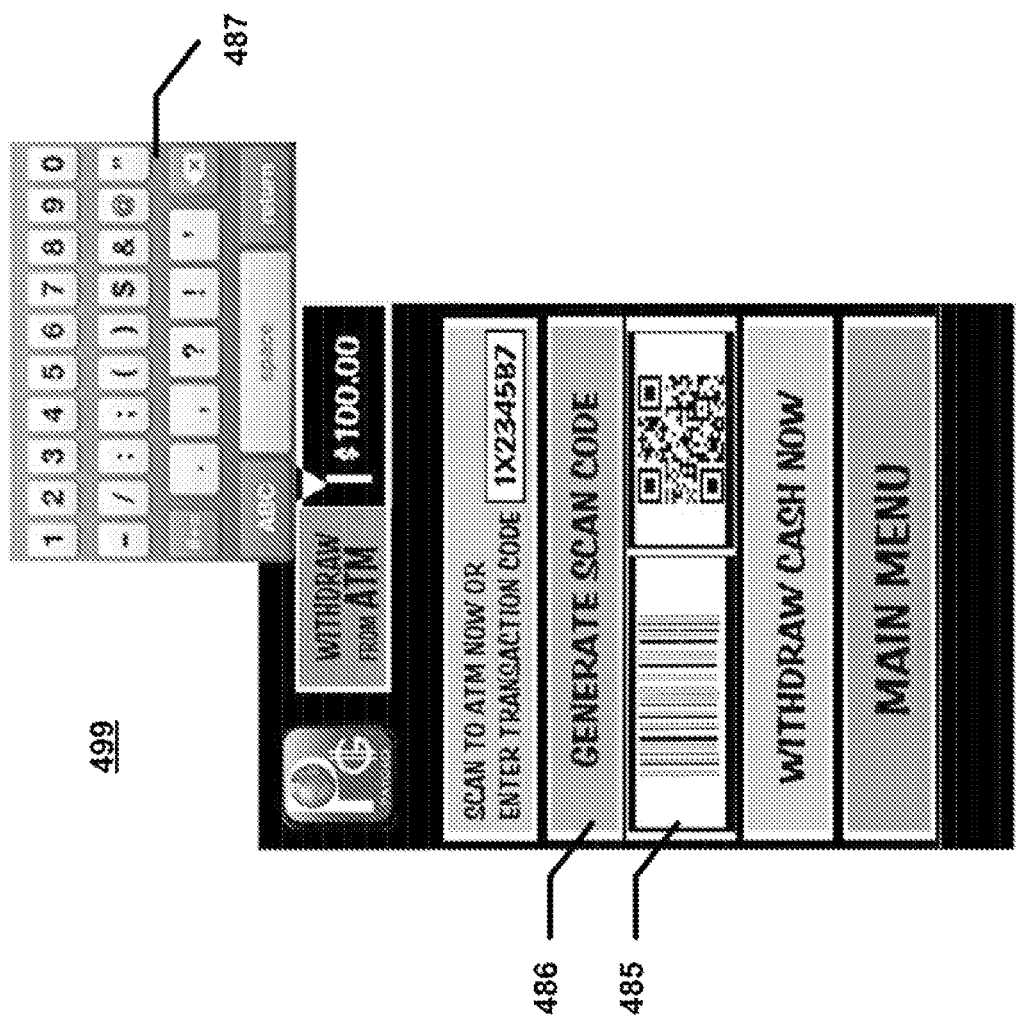
Figure 4O:
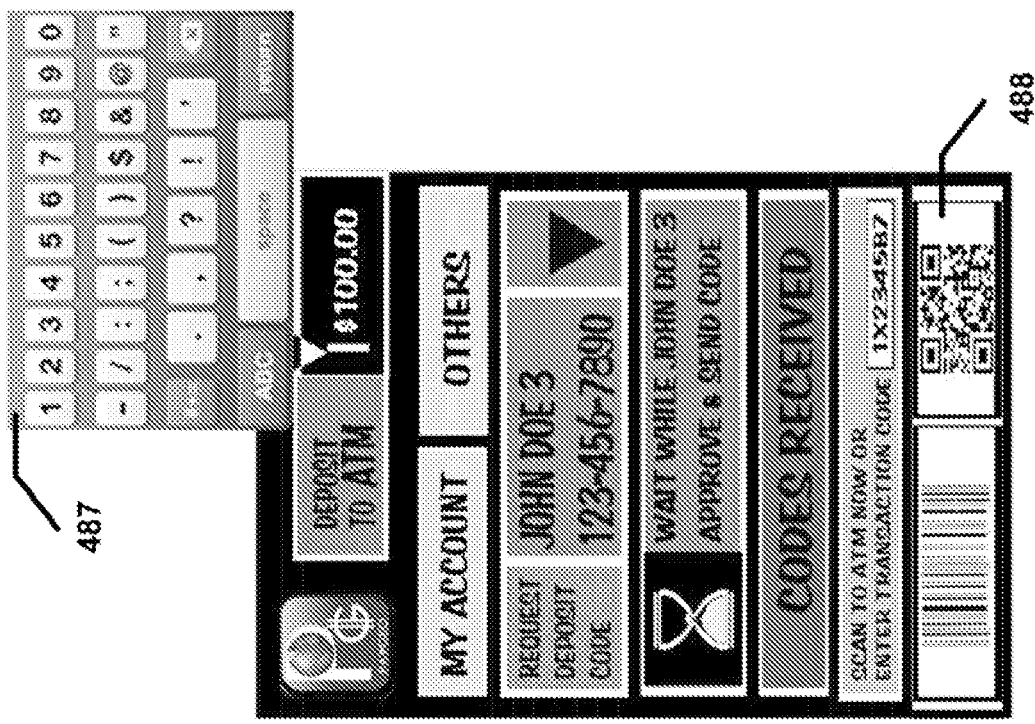
Figure 4P:
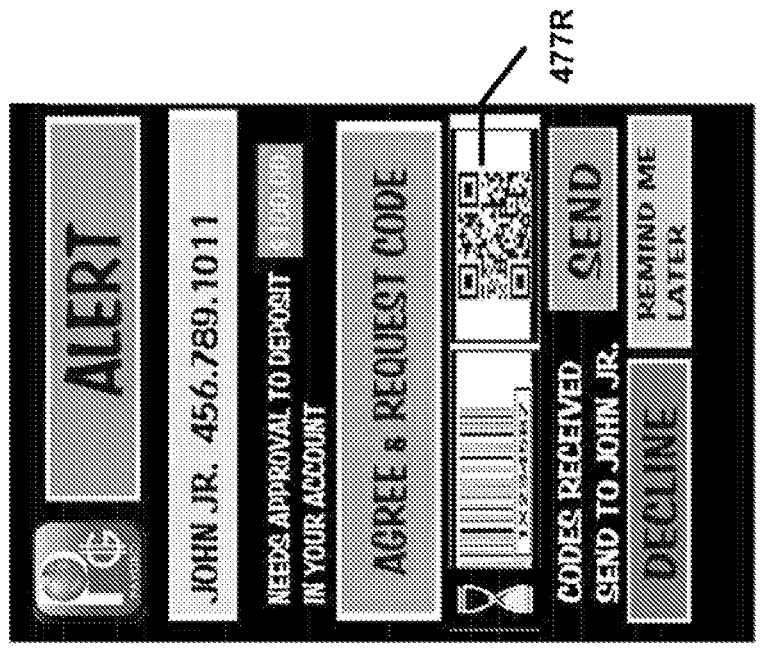

FIG. 4 comprises FIGS. 4A-4P, and represents a process 400 (FIG. 4A) and associated exemplary screen shots (FIGS. 4B-4P) that illustrate a PAY function 405 (FIG. 3J), for enabling the user mobile device 105 to execute payments, using the mobile transaction platform 200 of FIGS. 1 and 2.

A user using a mobile station or device, e.g., 105, starts the process 400, at step 402 of FIG. 4A, by logging in to his/her PayGeo user account, using any one or more security levels, as preset by the user in the activation process that was explained earlier in connection with FIG. 3. The user may then, at step 404 of FIG. 4A, initialize the PAY application 420 of FIG. 4B, by selecting the PAY function 405 of the function selection screen 377 (FIG. 3J).

At step 406, the PAY application 420 provides the user with a means of identifying the target payee and the desired payment method. As an example, the target payee may be the user's own PayGeo account or another account at another institution. With further reference to FIG. 4B, the target payee may be another registered PayGeo member (or registered institution) 422, a contact from the user's phone list (or address book) 424, a user of a network such as a social network 426, and/or a non-registered person or institution 428.

The user may also make a payment using other available or suitable methods. For example, the user may make a payment directly in a desired cash (national or foreign currency), a commodity, or a coupon to a person, a cashier, a booth, or an institution. The PAY application 420 may also enable the user to make a payment to a third party, using a legal tender that is defined by PayGeo and that corresponds to, and that is equivalent to the balance (or replenishment) in the user's PayGeo's account. Alternatively, the user may make a payment to a third party, using credit (or loan) that is extended to this particular user by PayGeo service.

More specifically, and with further reference to FIG. 4C, the PAY application 420 enables the user to make a payment with PayGeo points that accumulated based on the user's use of the PayGeo service (430), or points that were transferred to the user from another member's (or non-member's) account (432). Alternatively, the user may make a payment using a credit card 434, a PayGeo legal tender 436, or in cash (or commodity) 438. The PAY application 420 further allows the user to write a check 432 (FIG. 4B), as it will be explained later in more detail, in connection with FIG. 9.

FIGS. 4D, 4E, 4F, and 4G illustrate four exemplary organizers 440, 450, 460, and 470, respectively, which are provided on the user mobile station 105 by PayGeo service on the mobile transaction platform 200. These organizers provide financial organization and support to the user, and assist the user is selecting the financial accounts from which the payment is to be made (or received) and the amount of payment to be made from (or received by) each financial account. It should be clearly understood that these organizers are shown for illustration purpose only and that other organizers are anticipated by the present invention.

More specifically, the organizer 440 of FIG. 4D provides the user with the option and ability to make a payment using the credit card 434, the PayGeo legal tender 436, or cash (or commodity) 438. The organizer 440 further allows the user to write a check 432 (though not shown in this particular figure). The organizer 440 also provides a financial breakdown of the user's various receipts, payments, spending, and account balances.

The organizer 450 of FIG. 4E further provides the user with the ability to prepare, fill out, and file tax forms 452, the ability to email the payments (or to receive payments by email) 454, and the ability to make payment directly with a directional swipe of a finger (referred to herein as Swipay or Swipay 456). With regard to the Swipay feature 456, once the user selects the payment (or receipt) details, he/she swipes a finger in the direction of the arrow (or in another direction). This Swipay motion enables the user to make a payment efficiently by sending the payment directly to the target payee's address or account. A "handshake" is prompted on the receiver end and the transaction is allowed to proceed (e.g., online).

With regard to the organizer 460 of FIG. 4F, if the user determines that additional funds are needed, then he/she can make a direct deposit with PayGeo service by filling up My "virtual" Wallet 462 on PayGeo service. Additionally, the organizer 460 allows the user to make various deposits, payments, and other functions, including the calculation of the user's balances in his/her accounts.

The organizer 470 of FIG. 4G enables the user to scan or swipe the data 472 that is stored on a magnetic (or other) strip of, for example, a credit card or an identification card. The organizer 470 further enables the user to perform other functions such as to setup his/her ID, or to enter information related to the user's account, such as the frequent flyer account 474, etc., for future use or processing.

Upon completion of the identification of the target payee and the payment method, at step 406 of FIG. 4A, the user mobile station 105 enables the user to make the actual payment at step 408 of FIG. 4A and the corresponding FIGS. 4H-4J. FIG. 4H illustrates the situation where a user wishes to make a direct cash payment to, for example, a cash register, a toll both, or any other payment processing center 476. The user may make the payment with the Swipay function 456 enables the user to connect wirelessly to the payment processing center (i.e., cash register) 476 and to automatically effect a direct transfer of funds from the user's PayGeo account on the mobile transaction platform 200, to the cash register 476 with a single swipe of a finger.

It should be understood that, in order to prevent a non-authorized transfer, the Swipay function 456 may be provided with o security level that authenticates the authorized user prior to effect the transfer of funds. For example, the Swipay function 456 may scan the user's fingerprint or DNA, before allowing the transfer of funds.

Another feature of the PAY function screen of FIG. 4H is that it enables the user mobile station 105 to generate a scannable code 477. The scannable code 477 can be scanned by a scanner 478 at the locale of the payment (such as a shopping center), in order to effect the automatic transfer of the funds from one or more payments methods that have been authorized by the user at step 406.

The user may scan the desired items, save the scan on the user mobile station 105, and proceed to pay for the items using the user mobile station 105 and the PayGeo service. When the shopping total has been tabulated or calculated at checkout, the user can convert, from his/her PayGeo account, the exact amount into a bar code that can be scanned by the cashier, in order to credit the vendors' accounts. This barcode represents actual money that is debited from the user's PayGeo account. The user has the option of using various credit cards, debit cards or direct withdrawals from accounts that are setup on the user mobile station 105. The PayGeo service may charge a processing fee for each or selected transaction using this service. The user mobile station 105 allows scanners that compatible with the Swipay function 456 (described herein) to synchronize with the user mobile station 105 to effect financial transactions, in lieu of generating a barcode.

For vendors or users who have the PayGeo software installed on their receiver stations, the sender mobile device 105 will recognize the presence of these receiver stations, and allows a prompt to confirm the identifications of the vendors or users (similarly to a WIFI prompt). Once a receiver station is confirmed, the sender mobile device 105 will allow the option of the transaction to continue seamlessly with higher speed and far less origination charges than other choices. For vendors who do not have the PayGeo software installed, a compatible code is generated from a list that has been compiled and stored by PayGeo. Once the proper connection is made between the sender and receiver stations and the compatibility is confirmed, a code is generated by the PayGeo application (or server). This code may be scanned or entered manually and will automatically deduct the amount of money agreed upon from the user's PayGeo account and deposit it on the vendor's side to an account of the vendors' choice.

Another important feature of the present invention is the ability of the user mobile station 105 to communicate with an automatic banking user interface (system or dispenser), such an automated teller machine (ATM) 480 (FIG. 4I). To this end, the user selects the target payee 481 (including himself) on the user mobile station 105, and further enters the payment amount 483. The user then has more than one option to withdraw cash from the ATM 480 or to make a payment to a third party.

One exemplary option would be to use the Swipay function 456, as explained above, in order to establish direct communication with the ATM 480. The Swipay function 456 may prepare the login information, such as the user's password to the ATM 480, in advance, and transmit the information wirelessly (or via wire, if needed for a specific application), to the ATM 480. The user then withdraws the funds from a cash withdrawal window 484.

Alternatively, upon entry of the target payee 481 and the payment amount 483, the user may instruct the user mobile station 105 to generate a scannable code 477 that contains all the relevant financial and login information for the transaction. The code 477 may then be scanned and recognized by an ATM code scanner 482 for cash withdrawal.

Considering as an example, that the user is a PayGeo registered user and that he/she wishes to make a cash payment to another person who is not a PayGeo registered user and who does not have an account with the financial institution operating the ATM. The user may then elect to use the Swipay function 465 to transfer (e.g., either by Blue Tooth or by email) the scannable code 477 to the payee's mobile phone with a previously downloaded PayGeo application. The payee may then scan the code 477 at the ATM code scanner 482, and the cash is now available for withdrawal, deposit, forwarding, etc., by the payee. Once this transaction is effected, the ATM 480 generates a cancel order instruction to the payee's mobile phone, in order to prevent unauthorized duplications of the payment or the user's information. Alternatively (or additionally for added security), the ATM 480 can generate an internal cancel order instruction, including the payment identification number, to prevent the duplication of the payment.

It should be understood that the ATM 480 is used herein to illustrate the capability of the present invention and is in no way intended to limit the scope of the present invention. Rather, the ATM 480 is a representative illustration of numerous application, including for instance, medical applications, wherein a patient's user mobile station 105 transmits the user's medical information to a data collection unit, such as an X-Ray machine control unit for confirming the identity of the patient and/or for making direct payments as medical services (or other services or products) are being rendered.

Referring now to FIG. 4J, it illustrates the ability of the mobile transaction platform 200 and the user mobile station 105 to effect payments in foreign currency or denominations. As an example, if the user were travelling overseas and wishes to make a payment in a different denomination than his home, or default denomination, then the PayGeo service provides an on-the-spot conversion rate and converts the funds to the desired denomination, thus making the payment with the desired denomination 490. It should be understood that the same or similar concept could be used to transfer or exchange commodities between users of the PayGeo service.

Upon completion of the payment by the user at step 408, the recipient can either accept or reject the payment at step 410, and as further illustrated in the corresponding FIGS. 4K-4P. FIG. 4K illustrates a recipient's screen 490 that illustrates the originating user/payor including the amount to be paid 491. The recipient's screen 490 further provides the recipient with the option to accept the transfer by selecting the Accept function 492. The acceptance of the transfer is forwarded to the user mobile station 105 in order to complete the transaction.

Alternatively, the recipient's screen 490 provides the recipient with the option to decline the transfer by selecting the Decline function 493. The decline of the transfer is forwarded to the user mobile station 105 to cancel the transfer.

The recipient's screen 490 also provides the recipient with the option to log in to his/her PayGeo account 494, or to open a PayGeo account 495. The recipient's screen 490 also enables the recipient to delay his/her decision to a later time regarding the fund transfer 496.

With reference to FIG. 4L, and once the acceptance of the transfer is automatically or manually acknowledged by the user mobile station 105, the user mobile station 105 sends a confirmation (or permission) signal to the recipient's mobile station and (optionally automatically) changes the recipient's mobile screen to another screen 497 that allows the recipient to dispose of the transferred funds.

For illustration purpose only, once the recipient accepts the fund transfer (FIG. 4K), he/she needs to dispose of the transferred fund. To this end, the screen 497 provides the recipient with several options, among which are the following: to keep the fund in the user's PayGeo account 463; to send the fund to a default account 464, which has been preset and preselected on the recipient's mobile device; to send the fund to the recipient's account at either PayGeo or at a financial institution 465; to forward the fund, in part or in full, to one or more contacts 466; to remind the recipient to delay his/her decision for the disposition of the fund 467; and to write a check 468, as it will be explained later in greater detail in connection with FIG. 9.

FIG. 4M complements FIG. 4L and illustrates additional options that are available to the recipient, as exemplified by screen 498. The recipient can accept the fund 441 and then generate a scannable code 442, 477. As further illustrated and described earlier in connection with FIG. 4I, the recipient can scan the code 477 and retrieve cash 444 (a check or another legal tender) from the ATM 480.

FIG. 4N also complements FIG. 4L and illustrates more options that are available to the recipient, as exemplified by screen 499. The recipient is now given the option to deposit the transferred fund to his/her ATM account. The recipient logs in to his/her PayGeo account or opens a new PayGeo account. PayGeo service then generates a new scannable transaction code (or account code) 485 on the user mobile station 105, using the "Generate Scan Code" function 486. The recipient requests his/her mobile station to generate a scannable code 485. The transaction code 485 is scanned by the ATM 480, and the transfer is deposited in the recipient's account. The ATM 480 generates a confirmation receipt, acknowledging the deposit of the fund.

More specifically, the ATM 480 may recognize the transaction code 485 generated by the PayGeo software on the user mobile station 105. This transaction code 485 includes data that reflects the financial transaction, i.e., cash deposit, withdrawal, transfer, etc., the transaction amount, i.e., $1,000, which can be entered manually, using for example, a popup numeral (or regular) keyboard 487. The transaction code 485 is scanned to the ATM 480 or manually entered on the ATM 480.

As illustrated in FIG. 4O, a reverse code generation is also possible where an ATM transaction code 488 is generated by the ATM (480) network and scanned by, or manually entered on the user mobile station 105 (by means of a popup keyboard 487). In the illustrations of FIGS. 4N and 4O, a validation and consolidation of all accounts involved is done through the PayGeo software. This software may be embedded on the local operating ATM (480) level or through cloud or wireless connection trough master server(s) using encrypted transmission.

With further reference to FIG. 4P, a PayGeo user may deposit cash at an ATM in someone else's account using the "GENERATE SCAN CODE" function 486 (FIG. 4N) from user1 to user2. The PayGeo service generates a scannable deposit code 477 which is sent to, and appears on the mobile device of user2 as screen shot 489. In turn, upon request by user2, the user mobile station of user2 generates a confirmation code 477R and sends it to user1, in order to enable user1 to effect the deposit on the ATM. The confirmation code 477R is scanned on the ATM or manually entered, and will appropriate the deposit to user2 account. A reverse code generation is also possible where user2 can request a "DEPOSIT CODE" from an ATM in different local to be used by user1. The deposit code then appears on the mobile device and may be sent to user1 for use on a different ATM. That code is generated by the ATM network and may be scanned or manually entered on the mobile device. In both cases a validation and consolidation of all accounts involved is done through PayGeo software.

The screen 499 of FIG. 4N can be similarly used to enable a user to deposit funds in his/her ATM account using the user mobile station 105. To this end, the user selects the PayGeo account from which to withdraw the fund, generate a scannable code 442, 447, and then effect the fund transfer from the PayGeo account to the ATM account following the method described earlier in connection with FIG. 4I.

The user can also use the PayGeo service to make an exchange or refund. Since all the receipts and barcodes are stored in the user mobile station memory, the user will no longer need to carry paper receipts, and thus may present the items returned with a related barcode item number generated by the user mobile station 105, showing the details and purchase price.

Money can be transferred between one or more users of the user mobile stations 105, which transfer can be done when the users are in close proximity to each other, with a "handshake" secure transfer. The users can also exchange money from global distances using user mobile stations 105 that are connected, for example, via the mobile transaction platform 200.

Figure 5A:
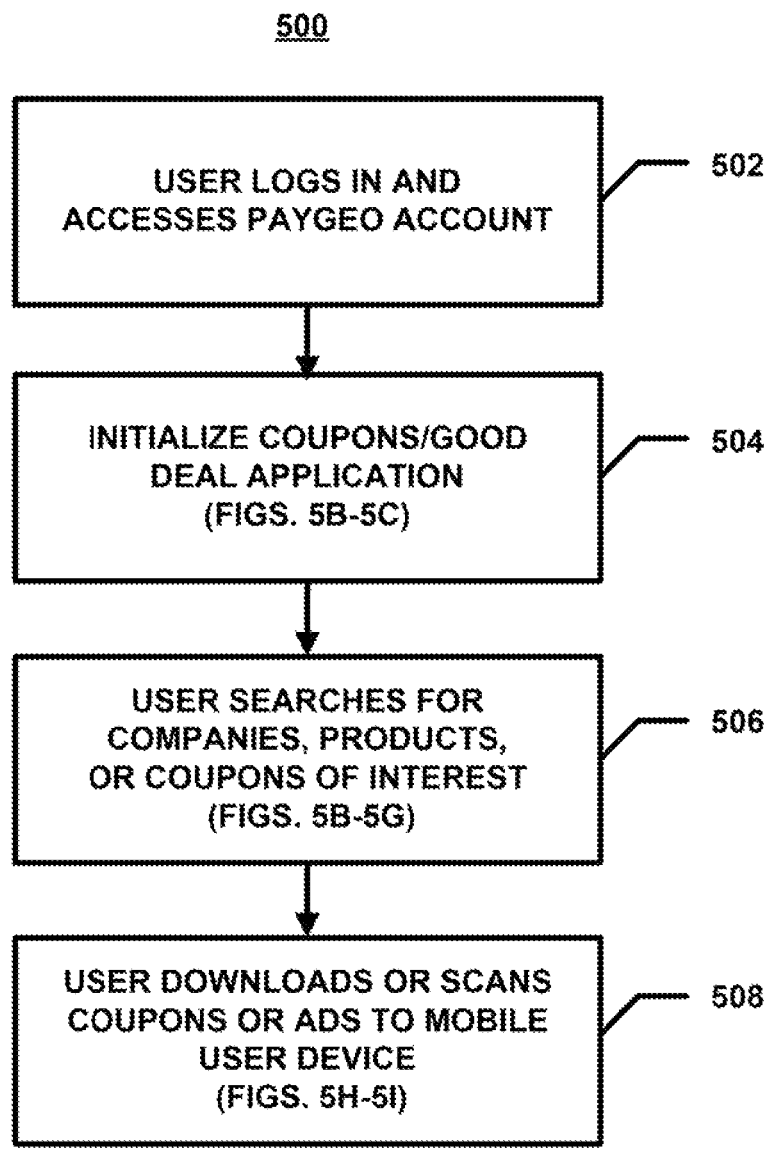
FIG. 5 comprises FIGS. 5A-5I, and represents a flowchart and associated exemplary screen shots, that illustrate a COUPONS function for enabling the user mobile device to retrieve and claim coupons, using the mobile transaction platform of FIG. 1.
Figure 5B:
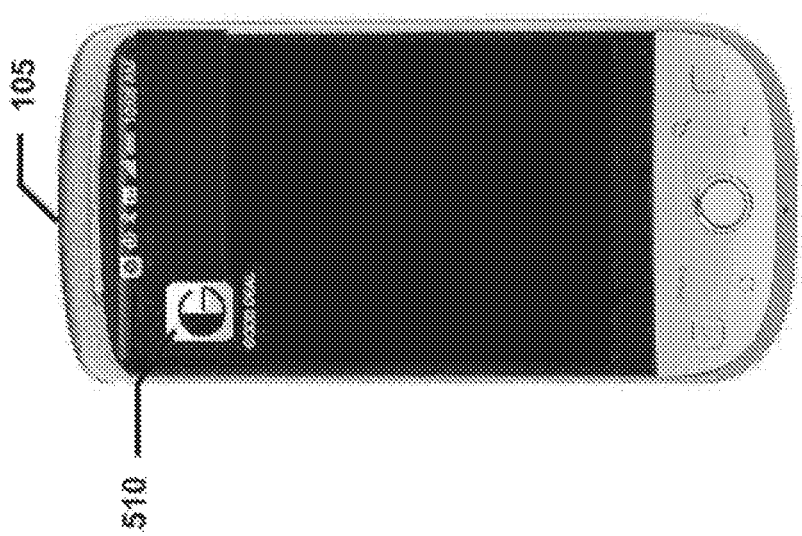
Figure 5C:
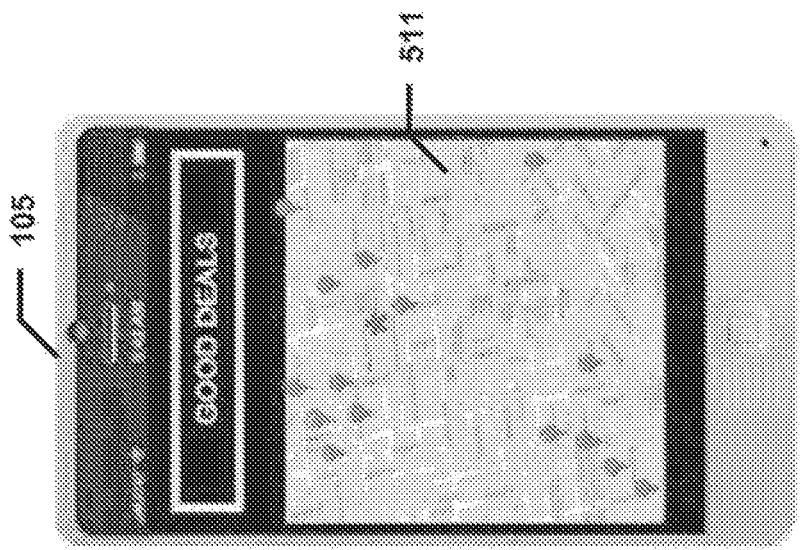

FIG. 5 comprises FIGS. 5A-5I, and represents a flowchart 500 (FIG. 5A) and associated exemplary screen shots (FIGS. 5B-5I) that illustrate a COUPONS function 505 (FIG. 3J) for enabling the user mobile device 105 to retrieve and claim coupons, using the mobile transaction platform 200 of FIGS. 1 and 2. The COUPONS function may include a GOOD DEAL function 510 (FIG. 5B).

A user using a mobile station or device, e.g., 105, starts the process 500, at step 502 of FIG. 5A, by logging in to his or her PayGeo user account, using any one or more security levels, as preset by the user in the activation process that was explained earlier in connection with FIG. 3. The user may then, at step 504 of FIG. 5A, initialize the COUPONS/GOOD DEAL application 510 of FIG. 5B, by selecting the COUPONS/GOOD DEAL function 505 of the function selection screen 377 (FIG. 3J).

At step 506, the VIEW-LOAD COUPONS/GOOD DEAL application 510 (FIG. 5B) provides the user with a means of identifying and searching for products, services, coupons, or commodities of interest (collectively referred to herein as "products"). When the user selects the "VIEW-LOAD COUPONS/GOOD DEAL" function 505, the mobile user device 105 uploads the GOOD DEAL application 510 and optionally automatically shows a map 511 (FIG. 5C) that shows various "good deals" on products that are available to the user in proximity to the user's location, as hyperlink colored icons. It should be clear that the user may change the coordinates (i.e., country, state, province, county, city) of interest, which enables the user to either search for, retrieve, or scan the products of interest.

Figure 5D:
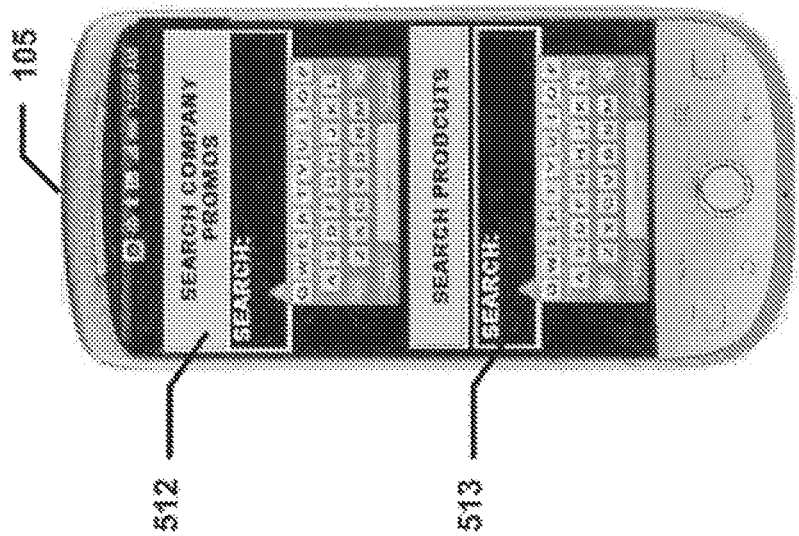

FIG. 5D provides the user with search fields 512, 513 that allow the user with the option to search by, for example, a company name, a product category, and/or a coupon of interest. In response to the user's inquiry, the user mobile station 105 provides the user with the search result and access to the resulting products. In addition, the user has the ability to search newspapers, magazines, the Internet, TV commercials, radio commercials, etc. In other terms, the PayGeo service is not limited to paper coupons, but also includes digital coupons.

Figure 5E:
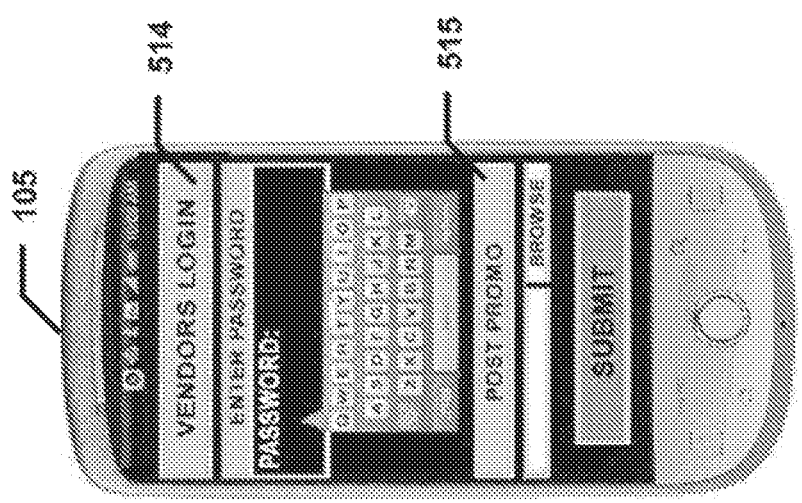

FIG. 5E, allows the user to access and login to the vendor's web site (514). In addition to retrieving the advertisements posted by third party vendors, the user has the ability to post his/her own advertisement or comment on PayGeo's mobile transaction platform 200, and to make the same available to other users (members or non members, with priority to members).

Figure 5F:
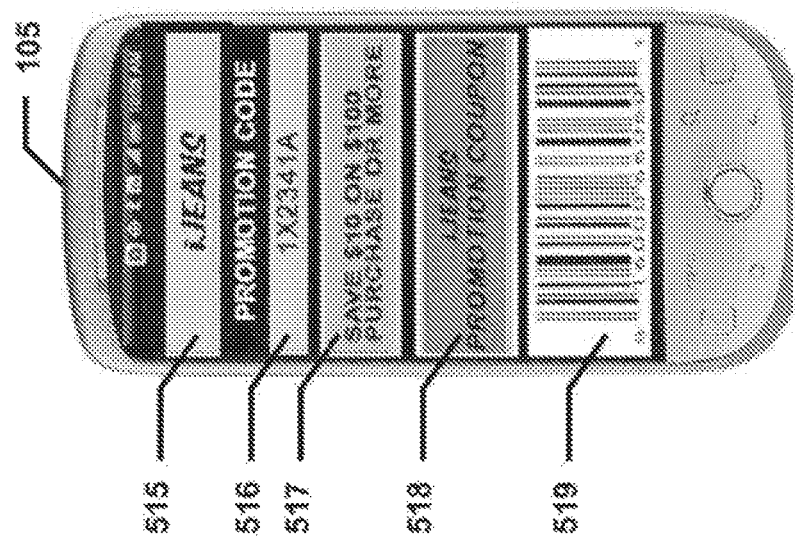
Figure 5G:
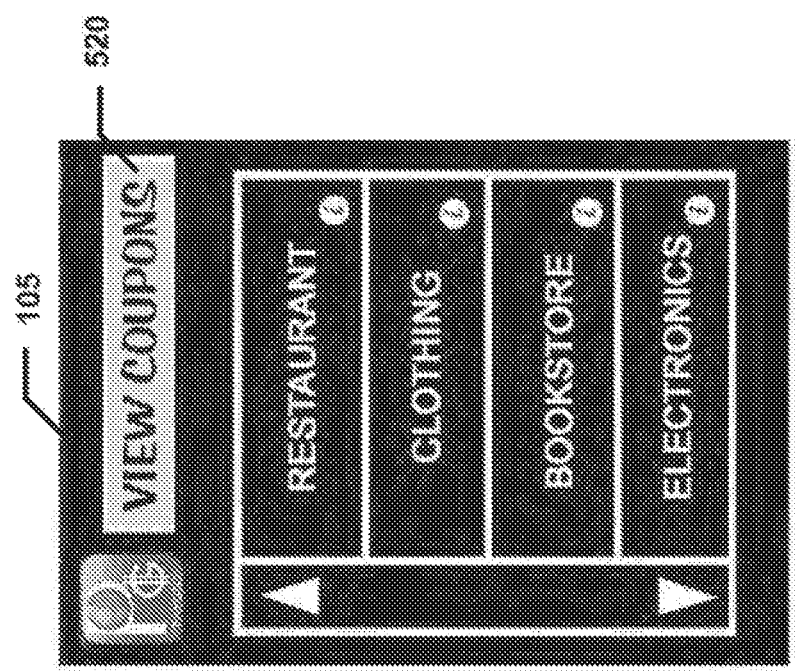

At step 508 of FIG. 5A, and as further illustrated in FIG. 5F, the user mobile station 105 displays the selected product of interest 515, as well as associated useful information, such as the promotion code 516, and promotion terms 517, and the promotion coupon 518 or scannable code 519 (that is scannable by a register as described earlier in connection with scannable code 477). Alternatively, the user mobile station 105 allows the user to select coupons by product category, such as restaurant, clothing, bookstore, electronics, etc. 520.

Figure 5H:
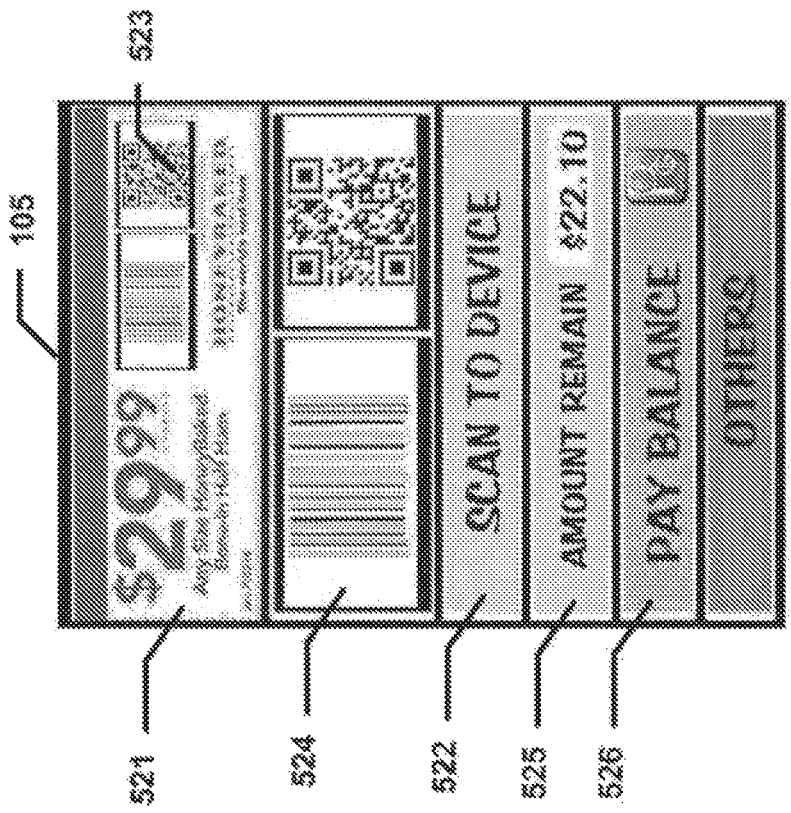

With reference to FIG. 5H, upon downloading the desired coupon 521 to the user mobile station 105, the user has the option to scan 522 a physical coupon (or transfer or download a digital coupon) 521 the coupon information (or bar code) 523, along with the bar code 524 of the product of interest to the user mobile station 105. The user mobile station 105 then automatically calculates the remaining balance 525 after the coupon amount has been deducted (and local tax calculated where appropriate). The user can then pay the balance (526) automatically by using the "PAY" function as described earlier. Other payment methods or options may alternatively be selected by the user.

Figure 5I:
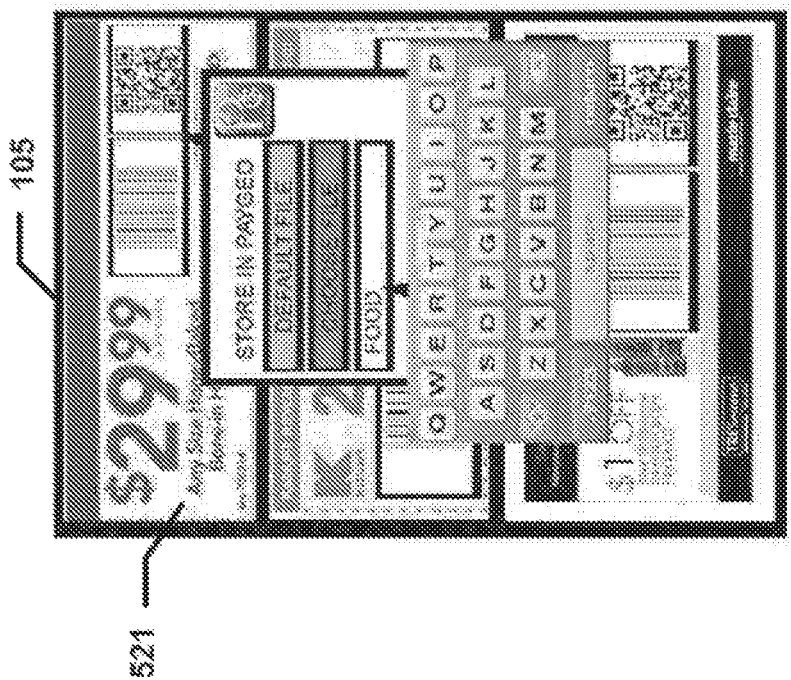

Alternatively, if the user does not wish to make a purchase, he/she has the ability to store the coupon 521 on the user mobile station 105 on the mobile transaction platform 200 for later recall and use (FIG. 5I). In one embodiment, the downloaded coupons, advertisements, or commercials are stored based on keywords or categories.

In addition to downloading the coupon ad 521 from third parties, PayGeo Service can generate its own coupons, discounts, prepaid cards, and cash cards. For example, PayGeo can make special, lucrative deals with vendors and can make these deals available to its users, worldwide. PayGeo's prepaid cards that are downloaded or scanned on the user mobile station 105 can be used, for example, at specific stores that honor PayGeo's credit to make purchases. PayGeo's cash cards that are similarly downloaded on the user mobile station 105 can be used as cash alternative.

Figure 6A:
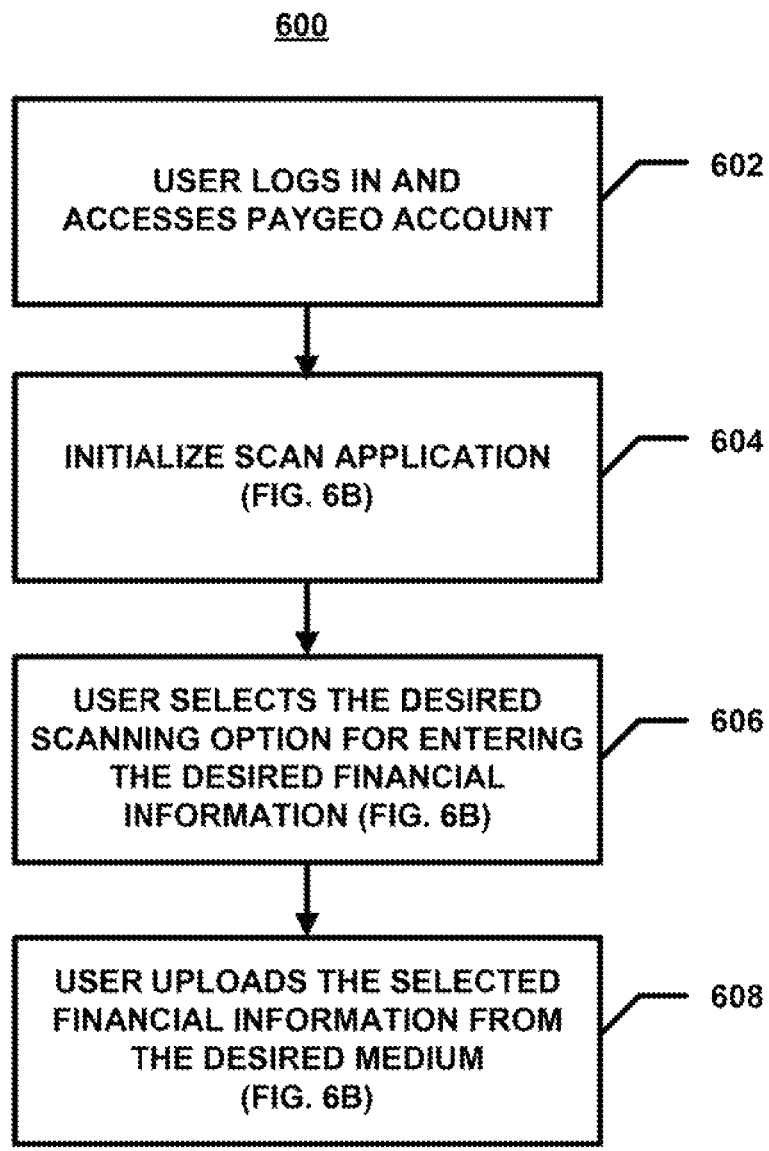
FIG. 6 comprises FIGS. 6A-6B, and represents a flowchart and associated exemplary screen shots, that illustrate a SCAN function for enabling the user mobile device to input financial information, using the mobile transaction platform of FIG. 1.
Figure 6B:
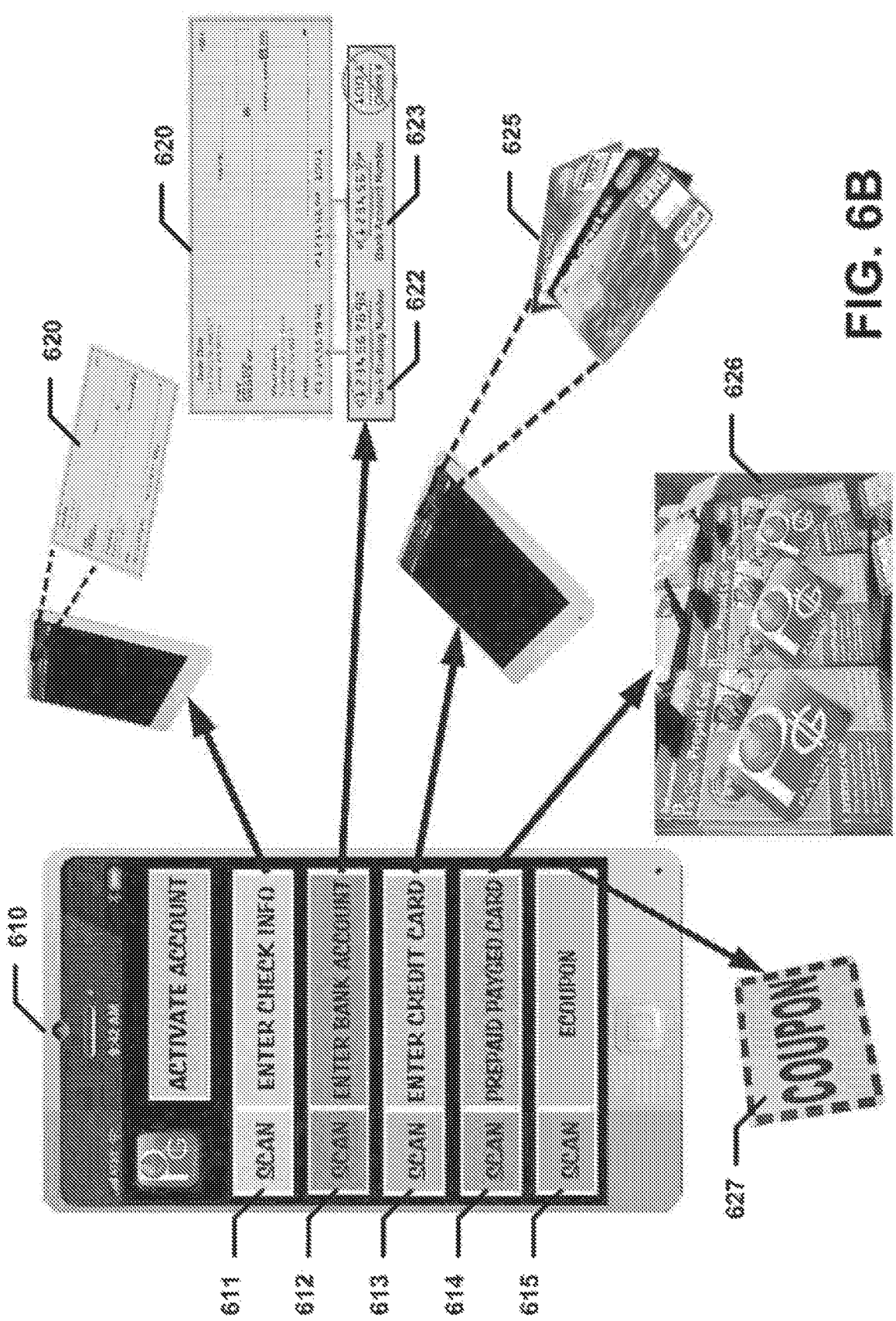

FIG. 6 comprises FIGS. 6A-6B, and represents a flowchart 600 (FIG. 6A) and associated exemplary screen shot (FIG. 6B) that illustrate a SCAN function 605 (FIG. 3J) for enabling the user mobile device 105 to input financial information, using the mobile transaction platform 200 of FIGS. 1 and 2.

A user using a mobile station or device, e.g., 105, starts the process 600, at step 602 of FIG. 6A, by logging in to his or her PayGeo user account, using any one or more security levels, as preset by the user in the activation process that was explained earlier in connection with FIG. 3. The user may then, at step 604 of FIG. 6A, initialize the SCAN application, as illustrated by screen shot 610 of FIG. 6B, by selecting the SCAN function 605 of the function selection screen 377 (FIG. 3J).

At step 606, the SCAN application 610 (FIG. 6B) provides the user with a means of inputting the user's and his/her contacts' financial information. When the user selects the SCAN function 605, the mobile user device 105 uploads the SCAN application 610 and automatically displays at least one of the five scanning options 611, 612, 613, 614, 615 that are shown in FIG. 5B. It should be understood that, as a default, the user mobile station 105 can be programmed to display one or more scanning options, and that additional scanning are available to the user.

At step 608, the user uploads the selected information from the desired medium. The first exemplary scanning option is the "Enter Check Info" option 611, which enables the user to enter financial information from the check 620 by scanning (or taking a photo) of the check 620. The user mobile station 105 then performs optical character reading (OCR) on the captured image of the check 620, to retrieve the desired financial information. This financial information includes, for example, the payor's name and address, the payee's name (and possibly the payee's address and additional identification), the number, date and amount of the check 620, the bank's name and address, and the memo information identifying the purpose of the check 620. Other relevant information may also be retrieved or optionally associated/hyperlinked to or from the user's address book or from PayGeo service.

The user mobile station 105 may, automatically, proceed to the next step of scanning the bank information, or the entry of such information may be selected manually by the user 612, as described earlier in connection with the entry of the check information 611. The bank account information includes such information as the bank routing number 622 and/or the bank account number 623.

The "Enter Credit Card" scan function 613 of FIG. 6B enables the user to scan his/her credit cards or identification card, for example 625 of FIG. 6B, or 473 of FIG. 4G, by either capturing a picture of the credit card or ID 625 or by using a scanner 472 (FIG. 4G).

The "Prepaid PayGeo Card" scan function 614 of FIG. 6B enables the user to enter, scan, or otherwise capture the information on a prepaid PayGeo cash card (or telephone card, or any other magnetically or electronically encoded card, chip, or medium) 626, as described herein.

The "eCoupon" scan function 615 of FIG. 6B enables the user to enter, scan, or otherwise capture the information on a physical or electronic coupon 627. The user mobile station 105 can read various barcode types from mobile advertisements and save them for later use. The user has the options to store coupons under various accounts and to recall them, as needed, when making live or online purchases. The PayGeo service may charge a processing fee for the use of this service.

Figure 7A:
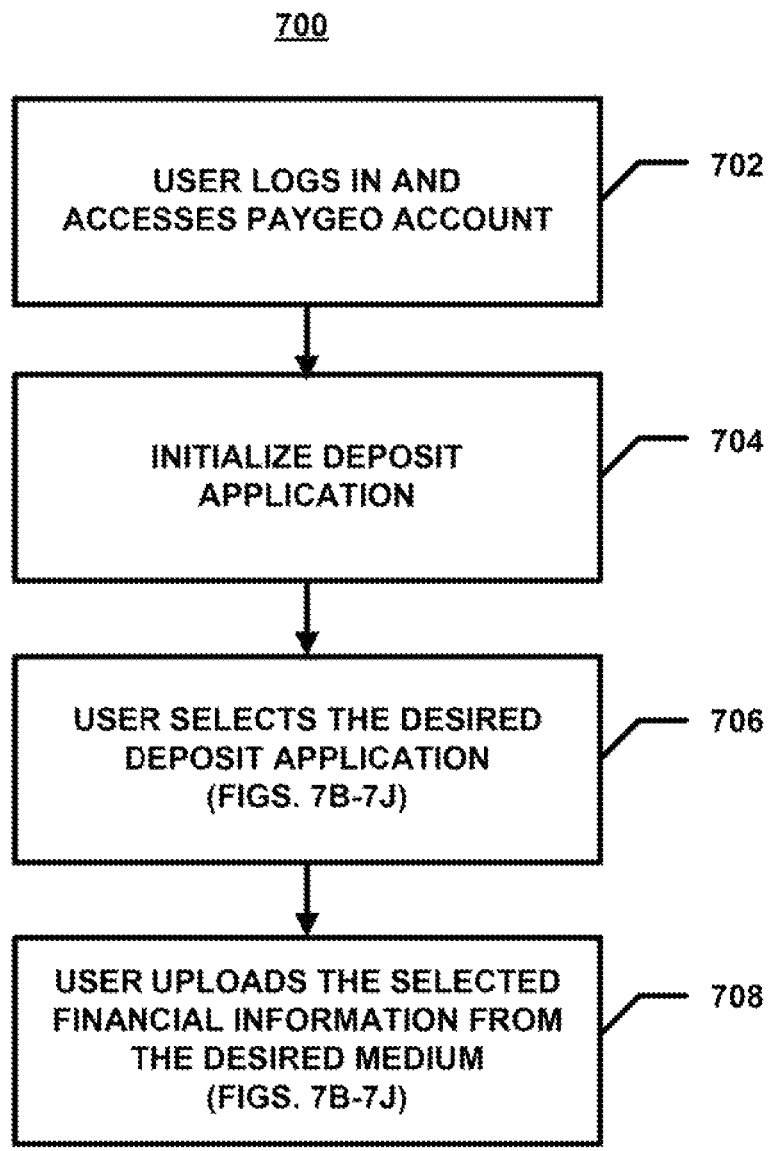
FIG. 7 comprises FIGS. 7A-7I, and represents a flowchart and associated exemplary screen shots, that illustrate a DEPOSIT function for enabling the user mobile device to deposit funds or other commodities in his/her or someone else's PayGeo account or a financial institution's account, using the mobile transaction platform of FIG. 1.
Figures 7D, 7E:
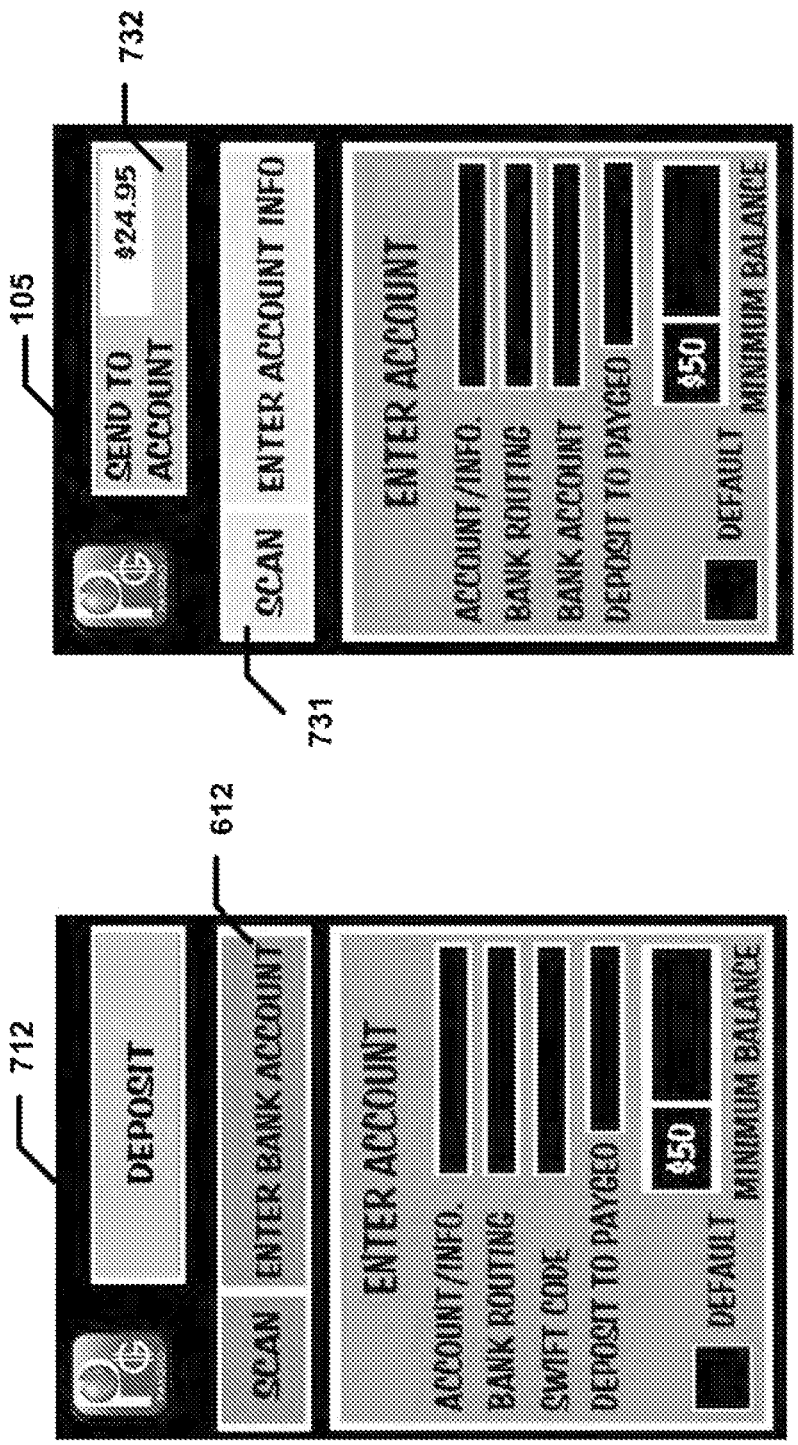
Figures 7H, 7I:
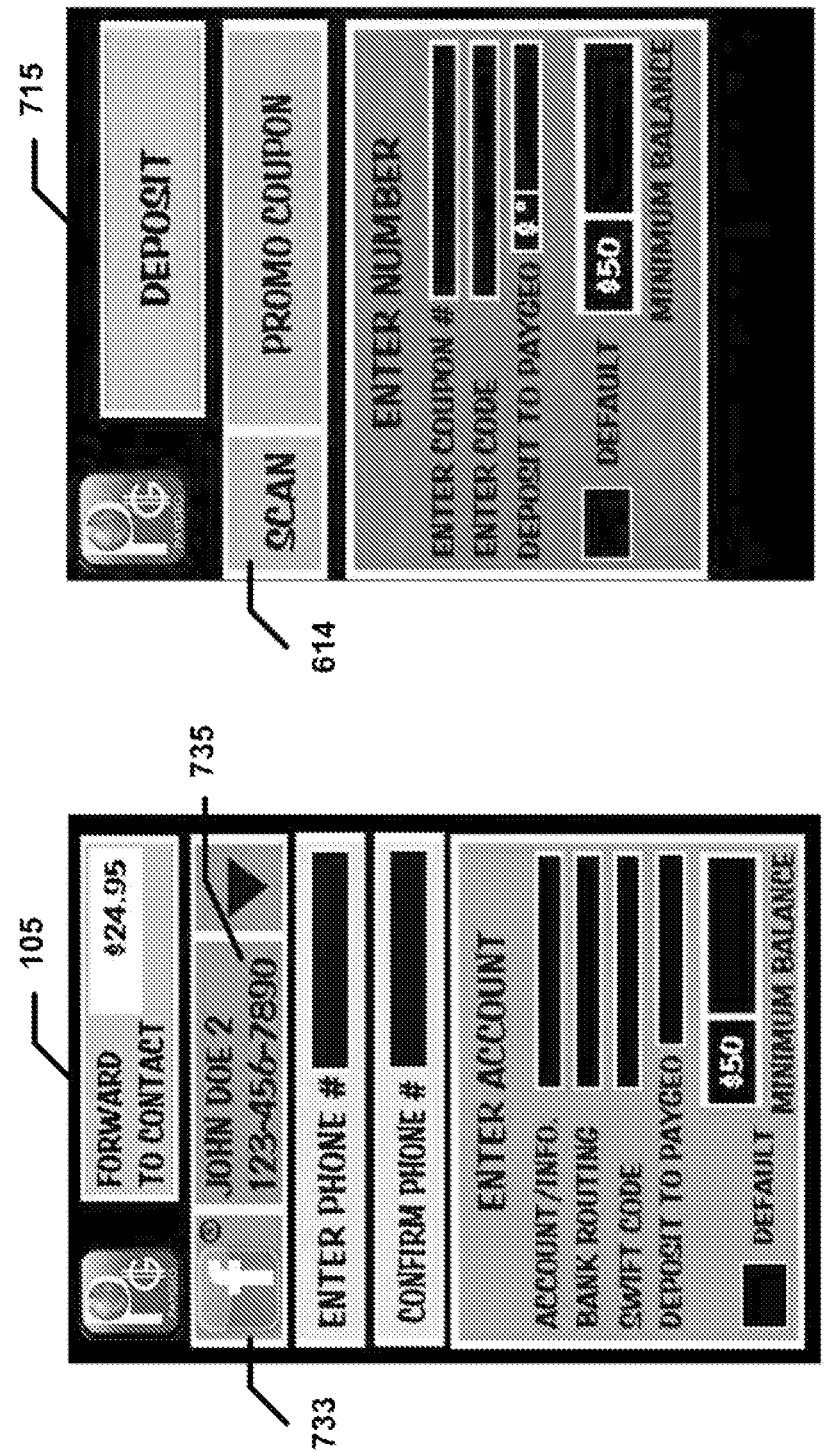

FIG. 7 comprises FIGS. 7A-7I, and represents a flowchart 700 (FIG. 7A) and associated exemplary screen shots (FIGS. 7B-7I) that illustrate a DEPOSIT function 705 (FIG. 3J) for enabling the user mobile device 105 to input financial information, using the mobile transaction platform 200 of FIGS. 1 and 2.

A user using a mobile station or device, e.g., 105, starts the process 700, at step 702 of FIG. 7A, by logging in to his or her PayGeo user account, using any one or more security levels, as preset by the user in the activation process that was explained earlier in connection with FIG. 3. The user may then, at step 704 of FIG. 7A, initialize the DEPOSIT application, as illustrated by the exemplary screen shots of FIGS. 7B-7I, by selecting the DEPOSIT function 705 of the function selection screen 377 (FIG. 3J).

At step 706, the DEPOSIT function 705 provides the user with a means of making various deposits of funds or commodities to the benefit of third parties, himself, or a financial institution, using the mobile transaction platform 200 of FIGS. 1 and 2. At step 708, the user selects and uploads the desired DEPOSIT application of interest. As an example, if the user selects to deposit or replenish his/her PayGeo account (or a third party's account) either manually or by scanning a check 620, he/she can do so as described earlier in connection with the "SCAN Enter Check Info" application 611 of FIG. 6B, as shown by the screen shot 711 of FIG. 7B. The user can use his/her checking account as a default payment method 730 to make subsequent transfers, such as wire transfers (FIG. 7C).

Once the users deposit in his/her PayGeo account dropped below a predetermined minimum balance, such as $50, the user is able to replenish his/her account by entering a different user account 731 at a third party financial institution, such as a bank, and by specifying the amount of deposit/transfer 732 (FIG. 7D).

Similarly, if the user selects to deposit or replenish his/her PayGeo account (or a third party's account) either manually or by scanning a check 620, he/she can do so as described earlier in connection with the "SCAN Enter Bank Account" application 612 of FIG. 6B, as shown by the screen shot 712 of FIG. 7E.

If the user selects to deposit or replenish his/her PayGeo account (or a third party's account) either manually or by scanning a credit card 625, he/she can do so as described earlier in connection with the "SCAN Enter Credit Card" application 613 of FIG. 6B, as shown by the screen shot 713 of FIG. 7F.

If the user selects to deposit or replenish his/her PayGeo account (or a third party's account) either manually or by scanning a prepaid PayGeo Card 626, he/she can do so as described earlier in connection with the "SCAN Prepaid PayGeo Card" application 614 of FIG. 6B, as shown by the screen shot 714 of FIG. 7G.

If the user selects to deposit or replenish his/her PayGeo account (or a third party's account) either manually or by scanning a promotional coupon (physical or digital) 627, he/she can do so as described earlier in connection with the "SCAN eCoupon" application 615 of FIG. 6B, as shown by the screen shot 715 of FIG. 7H.

FIG. 7I illustrates a transfer from the user to a payee, John Doe 2, who may or may not be a PayGeo user, using a social network 733, such as Facebook, Twitter, eBay, myspace.com, or a similar network. Alternatively, the user may make a direct transfer or deposit to the payee, using the payee's contact information such as a telephone number 735, from the user's address book.

Figure 8A:
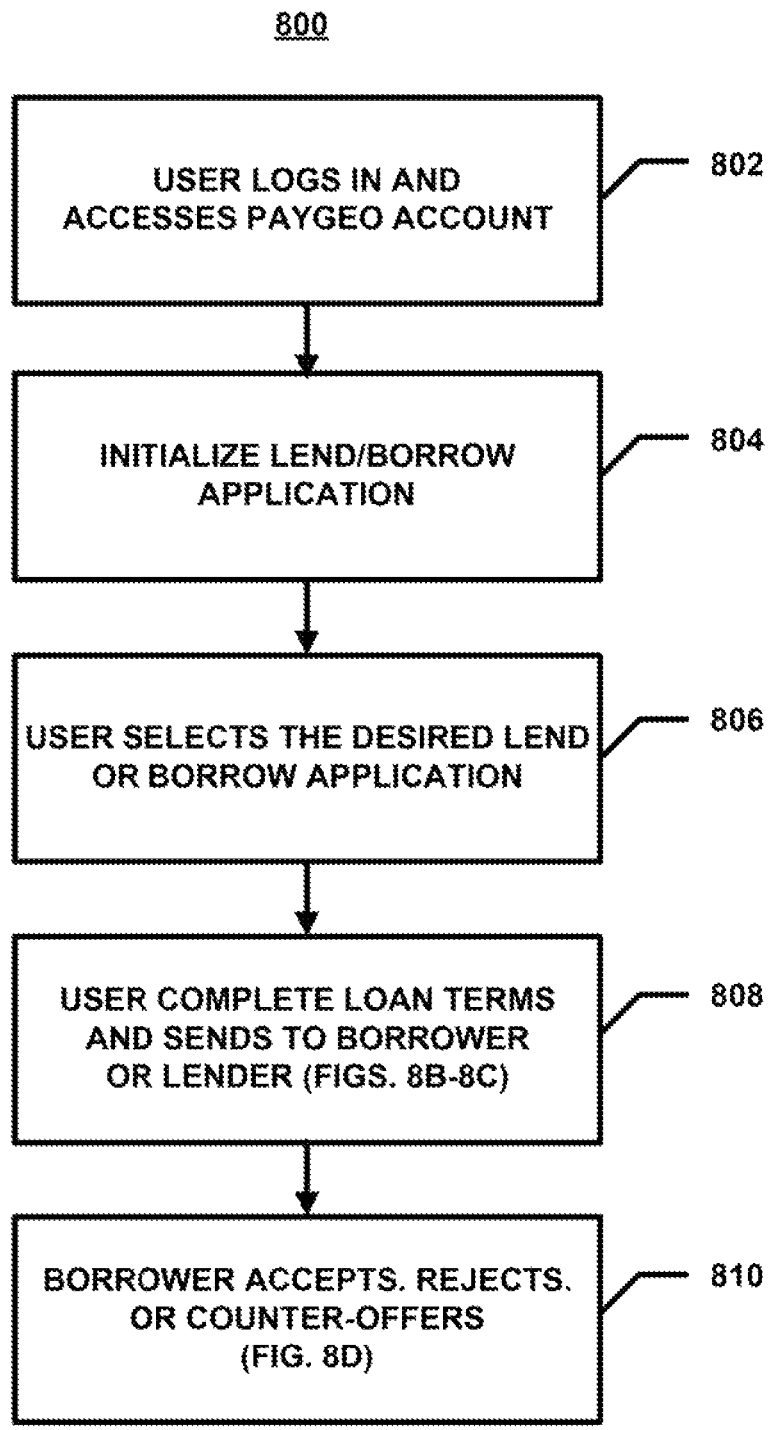
FIG. 8 comprises FIGS. 8A-8E, and represents a flowchart and associated exemplary screen shots, that illustrate a LEND/BORROW function for enabling the user mobile device to lend funds to other users or financial institutions, or to borrow funds from other users or financial institutions, using the mobile transaction platform of FIG. 1.
Figure 8B:
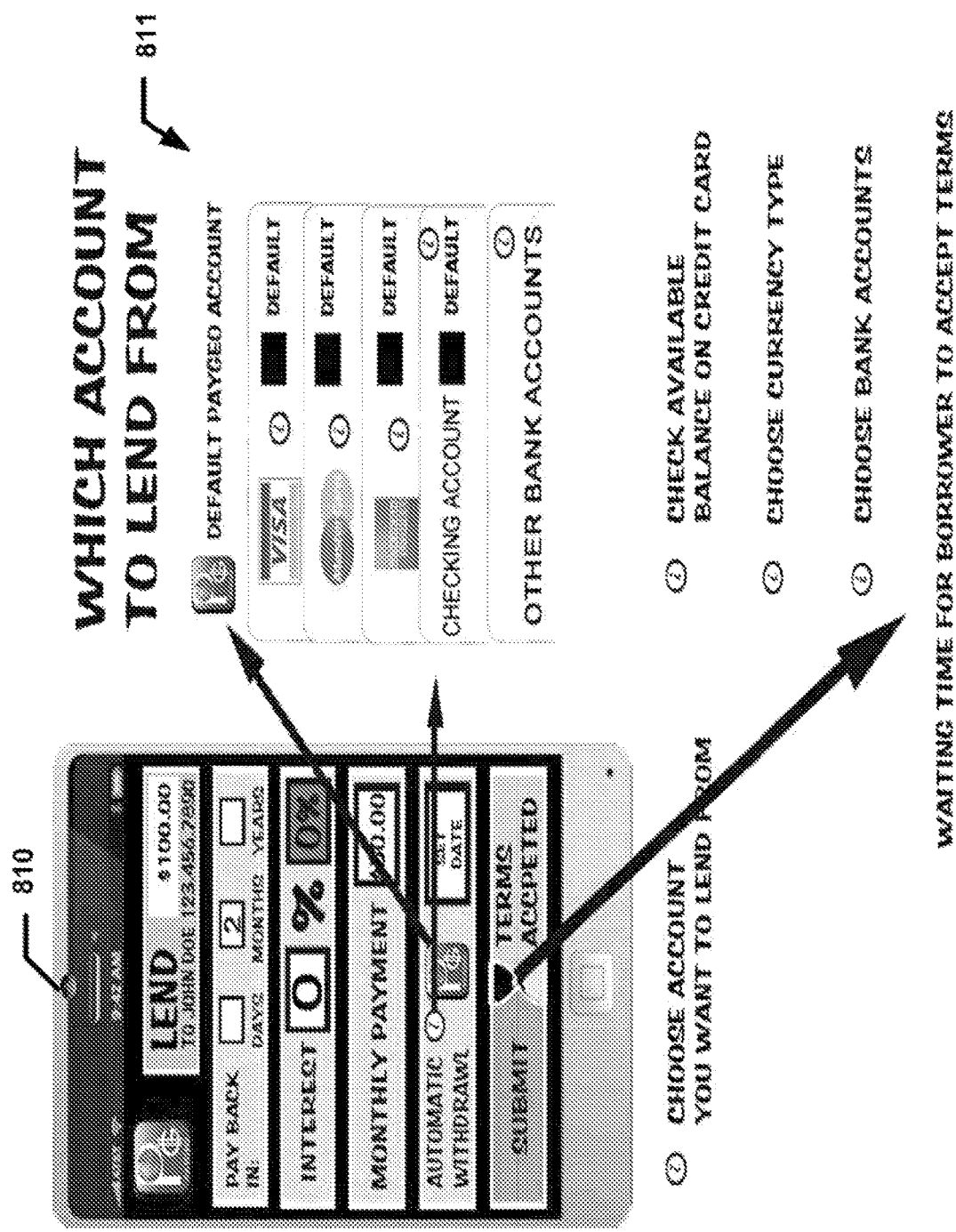
Figure 8C:
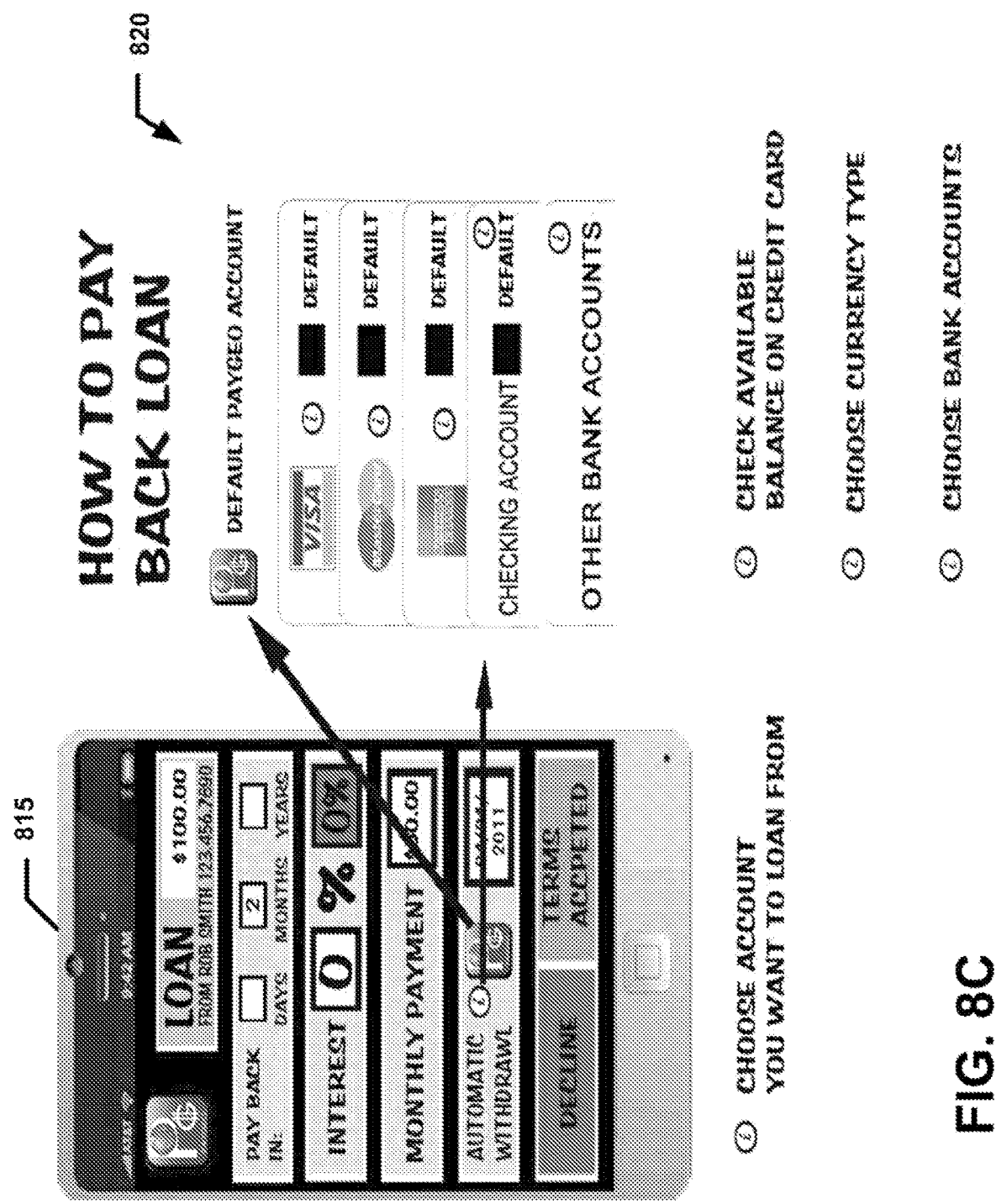

FIG. 8 comprises FIGS. 8A-8E, and represents a flowchart 800 and associated exemplary screen shots (FIGS. 8B-8E), that illustrate a LEND/BORROW function 805 for enabling the user mobile device 105 to lend funds to other users or financial institutions, or to borrow funds from other users or financial institutions, using the mobile transaction platform of FIGS. 1 and 2.

The user of the mobile station or device 105 starts the process 800, at step 802 of FIG. 8A, by logging in to his or her PayGeo user account, using any one or more security levels, as preset by the user in the activation process that was explained earlier in connection with FIG. 3. The user may then, at step 804 of FIG. 8A, initialize the LEND/BORROW application, as illustrated by screen shot 810 of FIG. 8B, by selecting the LEND/BORROW function 805 of the function selection screen 377 (FIG. 3J).

Figures 8D, 8E:
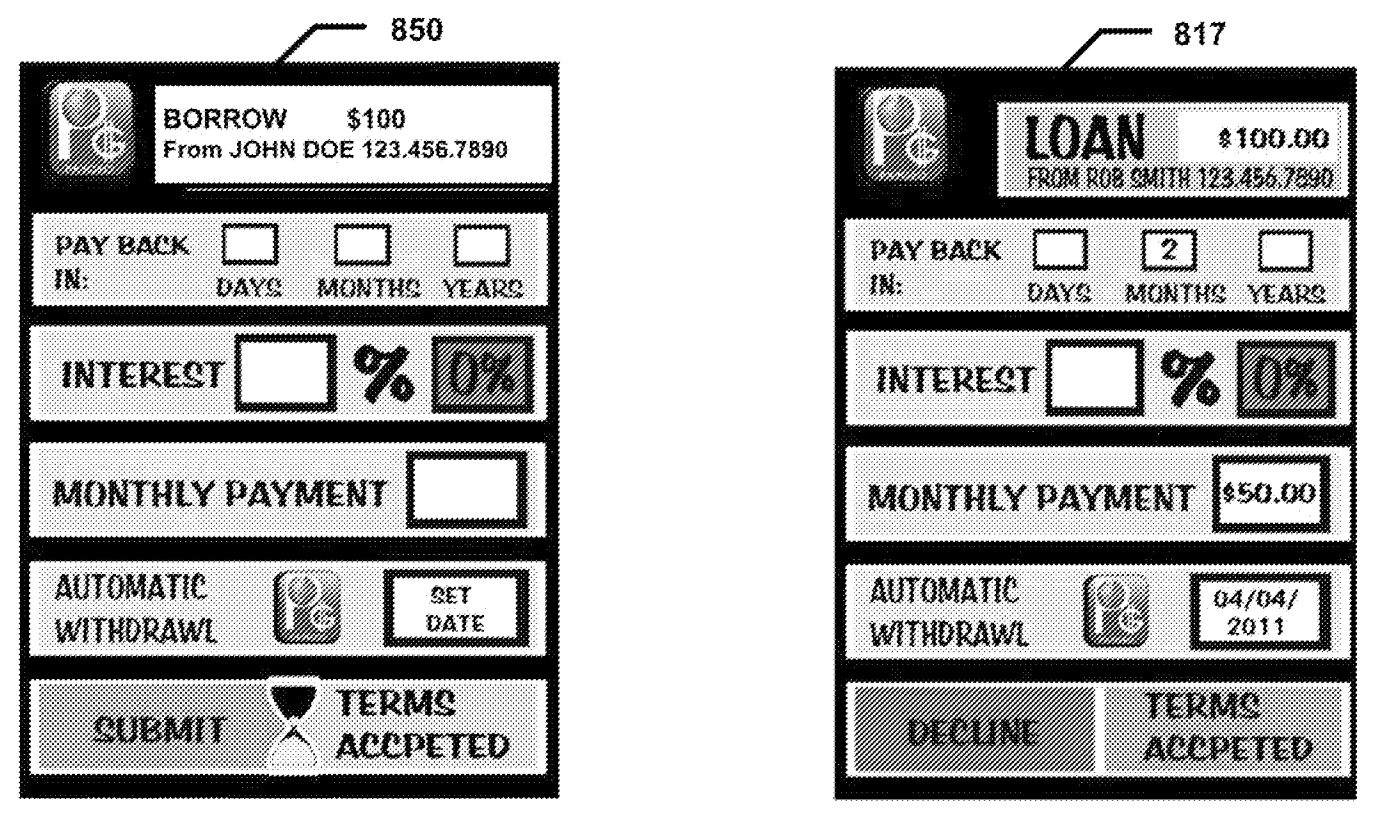

At step 806, when the user selects the LEND/BORROW function 805, the mobile user device 105 automatically uploads a screen that allows the user to select the desired action, either to lend funds, or the LEND application 810 (FIG. 8B), or the BORROW application 850 (FIG. 8E). The LEND application 810 provides the user with the detailed financial information (or terms) for lending funds or commodities to another PayGeo registered member, a non-member, or to an institution, while The BORROW application 850 provides the user with generally similar detailed financial terms for borrowing funds or commodities from another PayGeo registered member, a non-member, or to an institution.

At step 808 of FIG. 8A, the user (or the lender) completes the loan terms and sends them to the borrower using the user mobile station 105. The user (or the lender) then awaits the borrower's acceptance of the loan terms (or counter-offer).

The LEND application 810 (FIG. 8B) enables a PayGeo user to lend funds or commodities from one or more accounts or sources 811, such as the user's credit card, bank account, PayGeo account, or any other suitable or available account, to a borrower. The borrower may or may not be a PayGeo member. The user enters the desired financial information, such as the loan amount (i.e., $100) and the borrower's name, i.e., John Doe, and the user mobile station 105 retrieves other financial data related to this specific borrower from either the user mobile station 105 or the mobile transaction platform 200 (as a service provided by the mobile transaction platform 200, referred to herein as PayGeo or PayGeo service). The user mobile station 105 may propose reasonable lending terms to the user, giving the user the opportunity to revise the terms, as appropriate under the circumstances. The loan terms include, for instance, the payback date, i.e., 2 months, the interest rate, the monthly payment (including automatic withdrawal from the borrower's account), and the payment method, i.e., from a PayGeo account or from a different account belonging to the borrower.

The proposed payment method is further illustrated in FIG. 8C, as screen shot 815. In this particular example, the interest rate is set to 0% with the understanding that a different rate can also be selected. The monthly payment is calculated by the user mobile station 105 or the PayGeo service and the user/lender can either dictate the terms of the automatic payment, such as by credit card, bank account, PayGeo account, etc. 820, or he/she might allow the borrower to decide on the method of payment.

At step 810, the borrower reviews the lender's terms that are displayed on the borrower's user mobile station 105 or computer as screen shot 817 (FIG. 8D), awaiting the borrower's acceptance; rejection, or counter-offer. Communication between the lender and the borrower continues until such time as the terms are acceptable to both parties, and the borrower accepts the loan terms. The borrower's user mobile station 105 (or PayGeo application that is downloaded to the borrower's computer), captures the lender's and borrower's signatures, and finalizes the loan agreement with the terms that have been agreed upon. The loan agreement becomes a legal document and is stored by the PayGeo service. PayGeo may also set the automatic payment of the loan, as agreed upon, using the parties' signatures and other security information that is securely stored by the PayGeo service. In addition, the PayGeo service may trigger the automatic payment upon maturity and transfer the payment from the borrower to the lender pursuant to the loan agreement. Upon default, the PayGeo service may notify the parties in order to take corrective action.

The BORROW application 850 (FIG. 8E) operates in a similar but reverse way as the LEND application 810 (FIG. 8B).

Figure 9A:
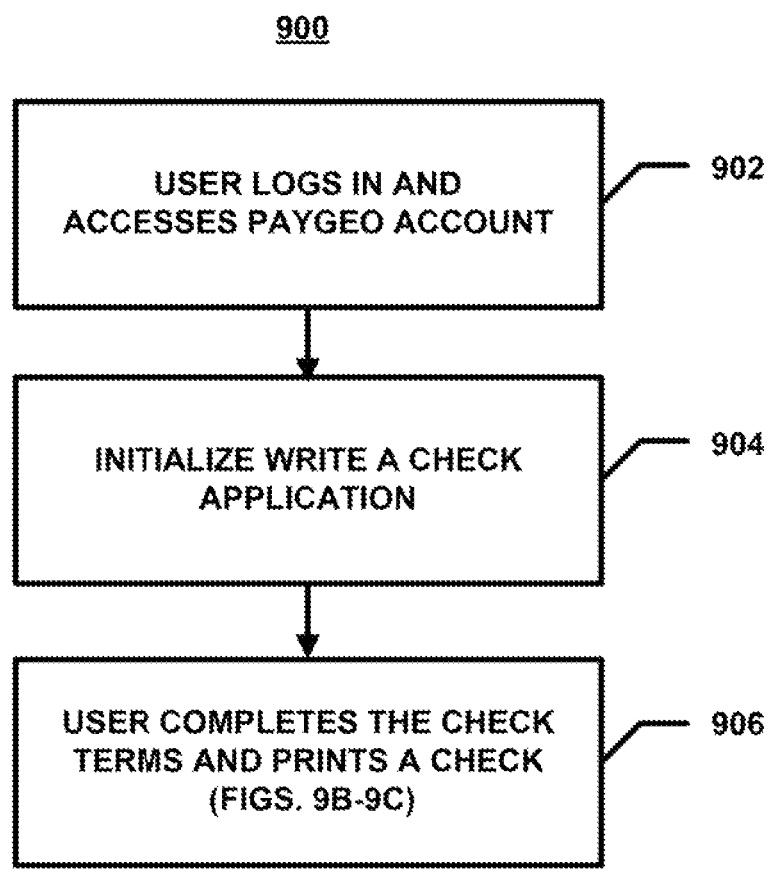
FIG. 9 comprises FIGS. 9A-9C, and represents exemplary screen shots that illustrate a WRITE A CHECK function for enabling the user mobile device to write a check to other users, non-PayGeo members, or to financial institutions, using the mobile transaction platform of FIG. 1.
Figure 9B:
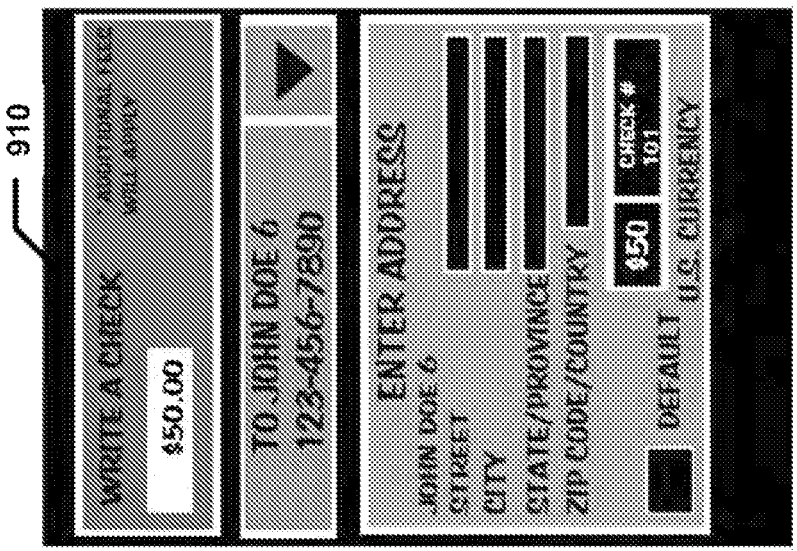
Figure 9C:
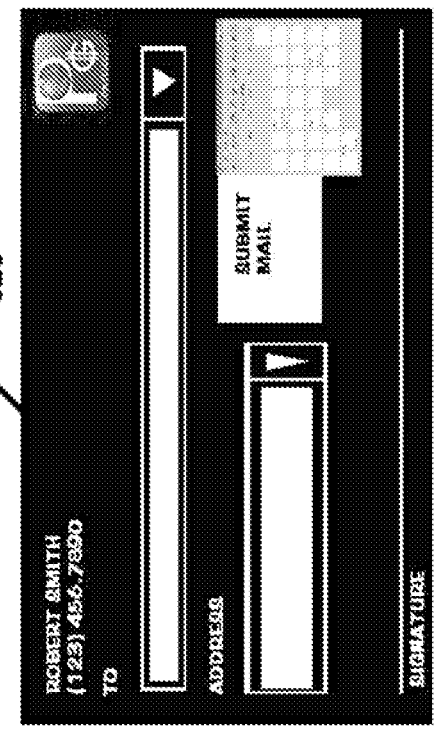

FIG. 9 comprises FIGS. 9A-9C and represents a flowchart 900 and associated exemplary screen shots (FIGS. 9B-9C), that illustrate a CHECK function 905 for enabling the user mobile device 105 to write a check to other users, non-PayGeo members, or to financial institutions, using the mobile transaction platform 200 of FIGS. 1 and 2

The user of the mobile station or device 105 starts the process 900, at step 902 of FIG. 9A, by logging in to his or her PayGeo user account, using any one or more security levels, as preset by the user in the activation process that was explained earlier in connection with FIG. 3. The user may then, at step 904 of FIG. 9A, initialize the WRITE A CHECK application, as illustrated by screen shot 910 of FIG. 9B, by selecting the WRITE A CHECK function 905 of the function selection screen 377 (FIG. 3J).

At step 906, the user enters or retrieves the desired information to write a check 620, such as the payee's name (and possibly the payee's address and additional identification), the number, date and amount of the check 620 (FIG. 9C), and the memo information identifying the purpose of the payment. The user then either prints the check 620 and mails it to the recipient, or electronically sends the check to the recipient with a digital signature that could be authenticated by the PayGeo Service.

While four exemplary organizers 440, 450, 460, and 470, have been described earlier in connection with the PAY function 405 (FIGS. 4D, 4E, 4F, and 4G, respectively), the user mobile station 105 or the mobile transaction platform 200 can also provide additional organization functions to provide financial organization and support to the user. FIG. 10 comprises FIGS. 10A-10D and represents exemplary screen shots 1001, 1002, 1003, 1004 that illustrate an ORGANIZE function for enabling the user to organize his/her financial sheets or statements and to file his/her tax returns, using the mobile transaction platform 200 of FIGS. 1 and 2.

Figure 10A:
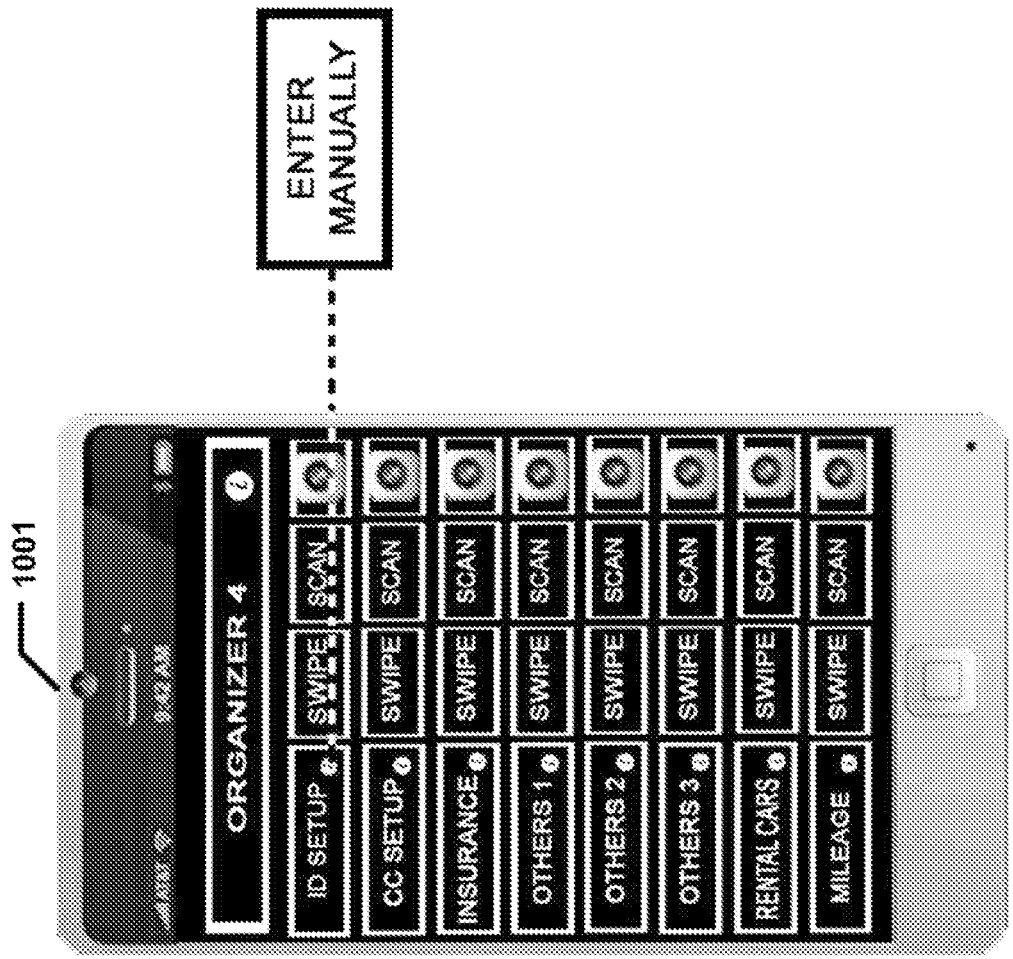
FIG. 10 comprises FIGS. 10A-10D, and represents exemplary screen shots that illustrate an ORGANIZE function for enabling the user mobile device to organize his/her finances and money/cash liquidity position, using the mobile transaction platform of FIG. 1.

The organizer 1001 of FIG. 10A enables the user to use the user mobile station 105 as a financial hub. The user starts by logging in and setting up his/her username and password, and by inputting, either manually, by swiping the magnetic cards (including credit cards, insurance cards, drivers license, etc.) as described herein, or by synchronizing the user station with the user's account on PayGeo's server, or the user's computer. As a result, when the user wishes to use the information in other applications, including but not limited to those illustrated in FIG. 3J, the user mobile station 105 automatically retrieves the information entered in the financial hub or organizer 1001. As an example, if the user gets in a car accident, the user mobile station 105 automatically retrieves the information related to the user's identification, driver license, and car insurance and connects to the mobile transaction platform 200, which in turn, generates a report to the insurance company and starts a step-by-step protocol to guide the user through the accident reporting process.

Figure 10B:
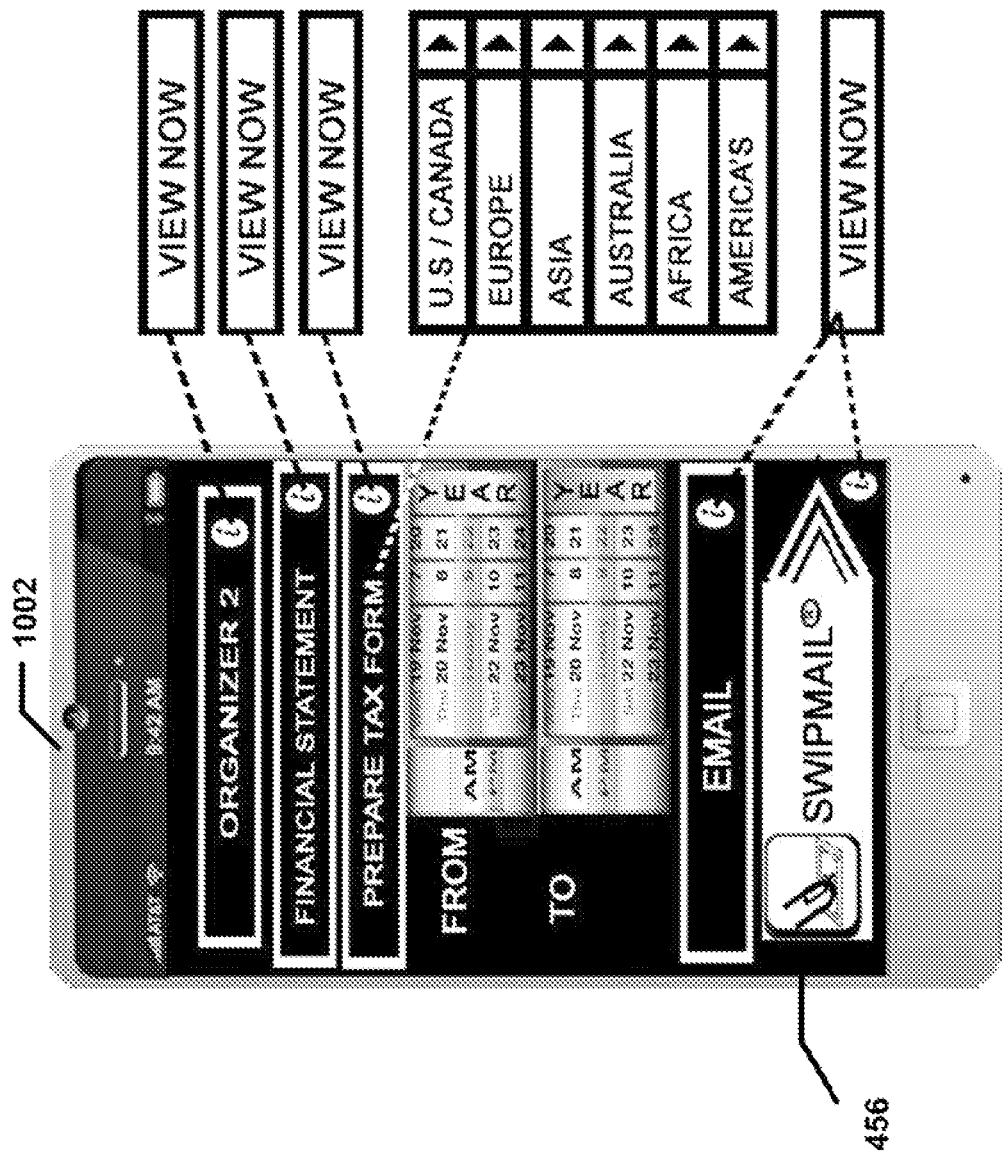

By turning the user mobile station 105 into a financial hub for the user, the financial organizer 1002 further provides the user with the ability to organize and prepare tax forms and returns in various countries, as illustrated in FIG. 10B. The user selects the country of interest and the user mobile station 105 submits the user's request to the mobile transaction platform 200. In turn, the mobile transaction platform 200 contacts corresponding companies (that might be contracted with the PayGeo service), governmental entities or websites, to retrieve the desired tax forms.

Once the tax forms are downloaded to the user mobile station 105 (or the user's computer), the user mobile station 105 retrieves the related financial information that have been entered in various organizers, and prepares the tax forms, either in full or in part. Should additional information be required, the user mobile station 105 notifies the user to complete the tax forms. Once the tax forms are completed, the user instructs the user mobile station 105 to file the tax forms with the corresponding tax authorities, with a directional swipe of a finger, using the Swipay feature 456, as described earlier.

Figure 10C:
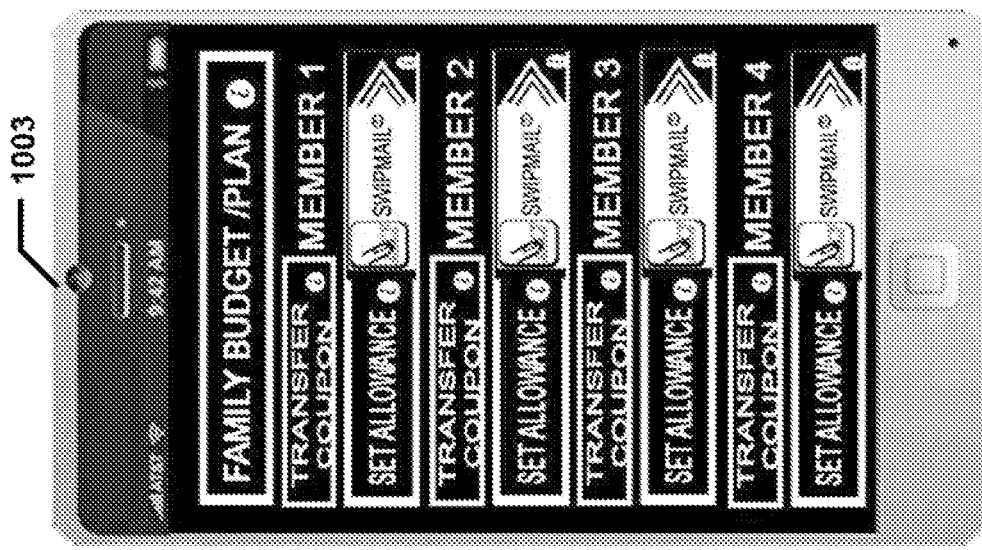

The organizer 1003 of FIG. 10C enables the user, such as the head of a family, to set allowances for, or transfer coupons to each member of his/her family individually, with a single swipe of a finger, using the Swipmail feature 456, as described earlier. In this illustration, the swiping action sends the information regarding the coupons or allowance to family member 1, allowing member 1 to receive the transfer and to dispose of it as member 1 sees fit. For instance, member 1 may deposit the transfer in his/her PayGeo account, as described herein.

Figure 10D:
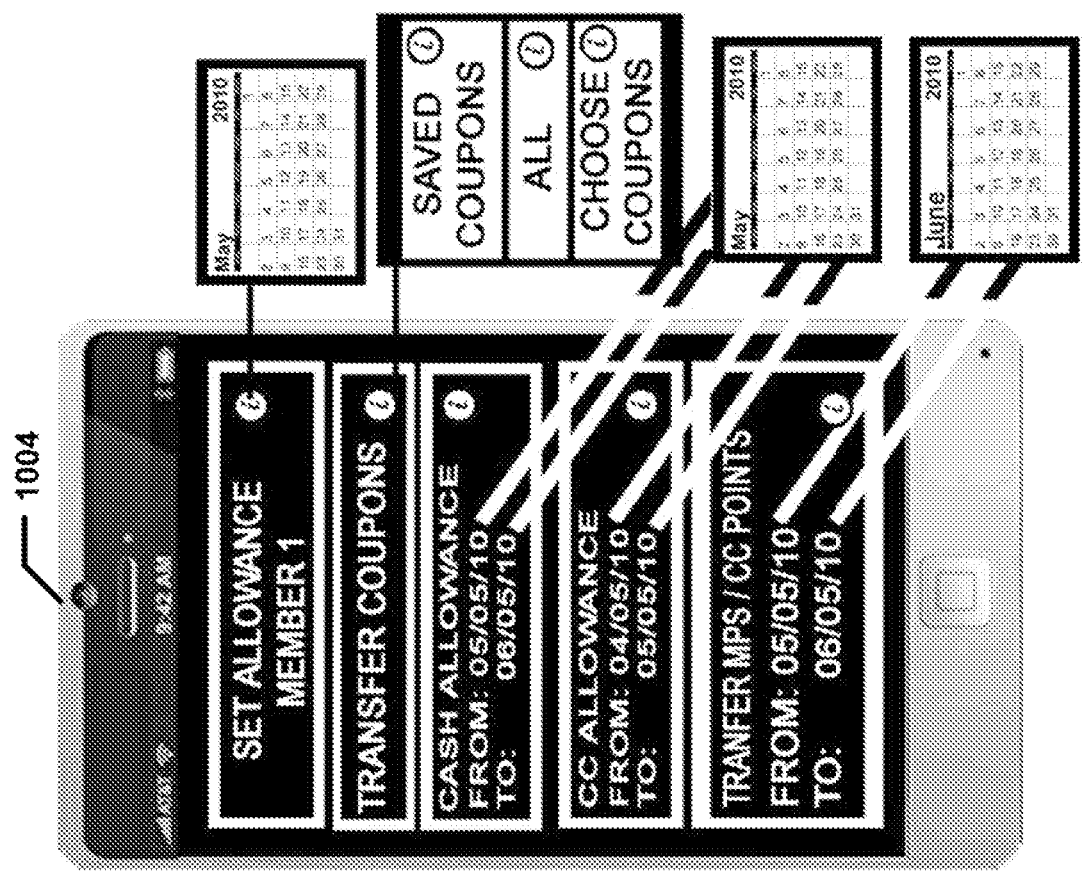

In addition to the transfer of allowances or coupons to the family members as described in connection with FIG. 10C, the user is also able to transfer the points he/she accumulated by using the PayGeo service, using the point organizer 1004 of FIG. 10D (possible with the Swipmail function 456). These minute points (MPS), adding the total time that the application is used or turned ON, credit card promotional points (CCP) that are accumulated outside PayGeo can be used as alternative to cash.

The present system provides numerous commercial advantages, some of which are listed herein. The present system provides a platform that enables members to transfer, receive, or otherwise exchange cash in various international denominations and commodities, such as precious metals (e.g., gold, silver, etc.), in a mobile highly secured telecommunications environment using DNA verification method.

The present system is capable of delivering cash instantly between two or more users by allowing the exchange of secure transactions between system and cash dispensing machines (ATMs).

The present system may be a banking institution or an entity holding escrow type accounts at various institutions. The users are allowed to become members by depositing money into the system by means of scanning, manual entry, credit cards, accumulated bonus points, promotional codes, direct ATM cash deposits, or from existing users' bank or institutions' accounts.

The present system is expected to replace paper cash and coins.

The present system will be used by various banking and financial institutions. Users' deposits may be kept in a "master" account or individual accounts at banks, private companies, public, or government institutions. The users may pay, receive, exchange, deposit, transfer, pay bills, exchange currency, retrieve cash, deposit cash and create accounts based on the mobile phone number or a system generated number (or code).

The present system is capable of tracking transaction amounts and prompting users to replenish accounts when transactions have exceeded the minimum allowed balance.

The users and vendors can download applications on their respective mobile application platforms or directly from a server or cloud.

The present system is capable of generating codes that are readable by different scanner types and allow scanners compatibility with mobile devices and environment.

The present system can charge users a certain fee that is based on: per transaction, transaction amount, additional service requested, commodity storage, commodity cash exchange fee.

The present system is capable of saving rebate or discount coupons and receipts, while keeping track of points that accumulate for future use or redemption.

It is to be understood that the specific embodiments of the invention that have been described are merely illustrative of certain application of the principle of the present invention. Numerous modifications may be made to the present system and method described herein without departing from the spirit and scope of the present invention. Moreover, while the present invention is described for illustration purpose in relation to the Internet or online communications, it should also be clear that the invention is applicable as well to transfers shared electronically over any type of electronic or wireless network. It should also be clear that the present invention, including the applicable software application, could be integrated with available devices or systems, such as, for example only, Apple Computer, Inc.'s iPhones, iPods, and iPads.

The invention claimed is:

1. A system, comprising:
memory storing program code associated with a service provided by a third-party entity to a plurality of members who register with the service provided by the third-party entity; and
one or more hardware processors configured to execute the program code, the program code including
a first communication interface configured to communicate with a first device associated with a credit card company on behalf of the plurality of members;
a second communication interface configured to communicate with a second device associated with a financial institution on behalf of the plurality of members;
a third communication interface configured to communicate with a third device associated with the third-party entity;
login interface code configured to request security credentials from a first member of the plurality of members before the first member can access the service, the first member having previously registered with the service;
first interface code configured to assist the first member to register a set of one or more payment sources for a future transaction, the first interface code configured to assist the first member to register a credit card account issued by the credit card company in the set of one or more payment sources, and configured to assist the first member to register a financial account associated with the financial institution in the set of one or more payment sources, the third-party entity being different than the financial institution and different than the credit card company;
second interface code configured to enable the first member to select a payment function identifier from a set of function identifiers to navigate to a payment function, the payment function configured to assist the first member to request sending a payment amount to a payee account, the payee account being a third-party account associated with the third-party entity and belonging to a second member of the plurality of members, the second member having previously registered with the service;
third interface code configured to enable the first member to select a payee identifier identifying the payee account;
fourth interface code configured to enable the first member to select a payment source identifier from a set of one or more payment source identifiers, the set of one or more payment source identifiers identifying a particular set of one or more payment sources, the fourth interface code capable of presenting in the set of one or more payment source identifiers a financial account identifier identifying a particular financial account associated with the financial institution, a credit card identifier identifying a particular credit card account issued by the credit card company, and a third-party account identifier identifying a third-party account associated with the third-party entity and belonging to the first member;

fifth interface code configured to enable the first member to identify the payment amount to be transferred to the payee account;

control code configured to select the first communication interface as a particular communication interface and to establish a communication link between the first communication interface and the first device associated with the credit card company on behalf of the first member when the particular payment source is the credit card account issued by the credit card company, configured to select the second communication interface as the particular communication interface and to establish a communication link between the second communication interface and the second device associated with the financial institution on behalf of the first member when the particular payment source is the financial account associated with the financial institution, and configured to select the third communication interface as the particular communication interface and to establish a communication link between the third communication interface and the third device associated with the third-party entity when the particular payment source is the third-party account, and configured to request electronic transfer of the payment amount from the particular payment source to the payee account using the selected particular communication interface; and notification code configured to generate a notification indicating an electronic transfer to the second member, and configured to transmit the notification over a communication network to a computing device associated with the second member in real time.

2. The system of claim 1, wherein the system is a mobile device, and the program code is an application on the mobile device.

3. The system of claim 1, wherein the system is a server, and the program code is server code on the server.

4. The system of claim 1, wherein the first interface code is further configured to assist the first member to register a loan account, an international account or a commodity account.

5. The system of claim 1, wherein the second member is the first member, the particular payment source is one of the financial account associated with the financial institution or the credit card account issued by the credit card company, and the payee account is the third-party account associated with the third-party entity and belonging to the first member.

6. The system of claim 1, wherein the payee identifier is a telephone number.

7. The system of claim 1, wherein the payee identifier is a contact from an address book.

8. A method, comprising:

storing program code associated with a service provided by a third-party entity to a plurality of members who register with the service provided by the third-party entity, the program code including a first communication interface configured to communicate with a first device associated with a credit card company on behalf of the plurality of members, including a second communication interface configured to communicate with a second device associated with a financial institution on behalf of the plurality of members, and including a third communication interface configured to communicate with a third device associated with the third-party entity;

presenting a login interface to request security credentials from a first member of the plurality of members before the first member can access the service, the first member having previously registered with the service;

presenting a first interface to assist the first member to register a set of one or more payment sources for a future transaction, including to register a credit card account issued by the credit card company in the set of one or more payment sources and to register a financial account associated with the financial institution in the set of one or more payment sources, the third-party entity being different than the financial institution and different than the credit card company;

presenting a second interface to enable the first member to select a payment function identifier from a set of function identifiers to navigate to a payment function, the payment function configured to assist the first member to request sending a payment amount to a payee account, the payee account being a third-party account associated with the third-party entity and belonging to a second member of the plurality of members, the second member having previously registered with the service;

presenting a third interface to enable the first member to select a payee identifier identifying the payee account;

presenting a fourth interface to enable the first member to select a payment source identifier from a set of one or more payment source identifiers, the set of one or more payment source identifiers identifying a particular set of one or more payment sources, the particular set of payment source identifiers capable of including a financial account identifier identifying a particular financial account associated with the financial institution, a credit card identifier identifying a particular credit card account issued by the credit card company, and a third-party account identifier identifying a third-party account associated with the third-party entity and belonging to the first member;

presenting a fifth interface to enable the first member to identify the payment amount to be transferred to the payee account;

selecting the first communication interface as a particular communication interface and establishing a communication link between the first communication interface and the first device associated with the credit card company on behalf of the first member when the particular payment source is the credit card account issued by the credit card company;

selecting the second communication interface as the particular communication interface and establishing a communication link between the second communication interface and the second device associated with the financial institution on behalf of the first member when the particular payment source is the financial account associated with the financial institution;

selecting the third communication interface as the particular communication interface and establishing a communication link between the third communication interface and the third device associated with the third-party entity when the particular payment source is the third-party account;

requesting electronic transfer of the payment amount from the particular payment source to the payee account using the selected particular communication interface;

generating a notification indicating an electronic transfer to the second member; and transmitting the notification over a communication network to a computing device associated with the second member in real time.

9. The method of claim 8, wherein the method is performed by a mobile device executing an application on the mobile device.

10. The method of claim 8, wherein the method is performed by a server executing server code on the server.

11. The method of claim 8, wherein the presenting the first interface includes assisting the first member to register a loan account, an international account, or a commodity account.

12. The method of claim 8, wherein the second member is the first member, the particular payment source is one of the financial account associated with the financial institution or the credit card account issued by the credit card company, and the payee account is the third-party account associated with the third-party entity and belonging to the first member.

13. The method of claim 8, wherein the payee identifier is a telephone number.

14. The method of claim 8, wherein the payee identifier is a contact from an address book.

\* \* \* \* \*